(12) United States Patent
Park et al.

(10) Patent No.: US 12,603,539 B2
(45) Date of Patent: Apr. 14, 2026

(54) HEAT EXCHANGER AND ENERGY CONVERSION DEVICE ASSEMBLY INCLUDING THE SAME

(71) Applicants: Bum Yong Park, Suwon-si (KR); Ji Su Park, Suwon-si (KR)

(72) Inventors: Bum Yong Park, Suwon-si (KR); Ji Su Park, Suwon-si (KR)

( * ) Notice: Subject to any disclaimer, the term of this patent is extended or adjusted under 35 U.S.C. 154(b) by 171 days.

(21) Appl. No.: 17/928,282

(22) PCT Filed: May 27, 2021

(86) PCT No.: PCT/KR2021/006596
§ 371 (c)(1),
(2) Date: Nov. 29, 2022

(87) PCT Pub. No.: WO2021/246717
PCT Pub. Date: Dec. 9, 2021

(65) Prior Publication Data
US 2023/0208246 A1 Jun. 29, 2023

(30) Foreign Application Priority Data

Jun. 5, 2020 (KR) ........................ 10-2020-0068575
Jul. 28, 2020 (KR) ........................ 10-2020-0094104
(Continued)

(51) Int. Cl.
*H02K 5/20* (2006.01)
*F28D 1/04* (2006.01)
(Continued)

(52) U.S. Cl.
CPC ........... *H02K 5/203* (2021.01); *F28D 1/0417* (2013.01); *F28D 1/0426* (2013.01);
(Continued)

(58) Field of Classification Search
CPC ..... H02K 5/203; F28D 1/0417; F28D 1/0426; F28D 1/0473; F28D 2021/0028; F28D 2021/004
See application file for complete search history.

(56) References Cited

U.S. PATENT DOCUMENTS 9,397,536 B2 7/2016 Cimatti
2006/0124273 A1 6/2006 Kim et al.
(Continued)

FOREIGN PATENT DOCUMENTS

CN 109391074 A 2/2019
DE 102009055273 A1 * 6/2011 ............... H02K 9/08
(Continued)

OTHER PUBLICATIONS

EPO, European Search Report issued for European Patent Applicant No. EP21816851, Jun. 7, 2024.
(Continued)

*Primary Examiner* — Terrance L Kenerly
(74) *Attorney, Agent, or Firm* — Nicholas Park

(57) ABSTRACT

Provided is a heat exchanger to perform heat exchange with a predetermined apparatus, the heat exchanger including a heat exchange channel construction configured to form a heat exchange area for heat exchange with the apparatus and to perform heat exchange through a flow of a heat transfer medium. The heat exchange channel construction includes a plurality of heat exchange channels each in a spiral shape, and the heat exchange channel construction includes an independent channel heat exchange area in which one of a first heat exchange channel and a second heat exchange channel included in the plurality of heat exchange channels independently performs heat exchange in a structure that includes at least one of a single channel structure and a branch channel structure and an interlocked heat exchange area in which the first heat exchange channel and the second (Continued)

heat exchange channel perform heat exchange through interlocking.

9 Claims, 38 Drawing Sheets

(30)        Foreign Application Priority Data

Nov. 20, 2020    (KR) ........................ 10-2020-0157101
Nov. 23, 2020    (KR) ........................ 10-2020-0157418

(51) Int. Cl.
   *F28D 1/047*          (2006.01)
   *F28D 21/00*          (2006.01)
(52) U.S. Cl.
   CPC .... *F28D 1/0473* (2013.01); *F28D 2021/0028*
              (2013.01); *F28D 2021/004* (2013.01)

(56)              References Cited

U.S. PATENT DOCUMENTS

| | | | |
|---|---|---|---|
| 2013/0285485 A1 | 10/2013 | Song et al. | |
| 2014/0232218 A1* | 8/2014 | Takano .................. | H02K 5/203 |
| | | | 310/53 |
| 2016/0156251 A1 | 6/2016 | Sakurai et al. | |
| 2019/0006908 A1 | 1/2019 | Scharlach | |
| 2019/0207457 A1 | 7/2019 | Hamiti et al. | |

FOREIGN PATENT DOCUMENTS

| | | | | |
|---|---|---|---|---|
| DE | 102016110658 A1 | 12/2017 | | |
| DE | 102017208566 A1 * | 11/2018 | ....... | H01L 21/67271 |
| EP | 3422538 A1 | 1/2019 | | |
| FR | 3077939 * | 8/2019 | .............. | H02K 5/20 |
| FR | 3077939 A1 * | 8/2019 | .............. | H02K 5/20 |
| JP | 1981-101358 A | 8/1981 | | |
| JP | 2007-143247 A | 6/2007 | | |
| JP | 2008-190778 A | 8/2008 | | |
| JP | 2012-112556 A | 6/2012 | | |
| JP | 2014-158366 A | 8/2014 | | |
| JP | 2016-176350 A | 10/2016 | | |
| JP | 2019-515642 A | 6/2019 | | |
| KR | 10-0170234 B1 | 3/1999 | | |
| KR | 10-2001-0027166 A | 4/2001 | | |
| KR | 10-2016-0053215 A | 5/2016 | | |
| KR | 10-2018231 B1 | 9/2019 | | |
| WO | 2018-211089 A1 | 11/2018 | | |
| WO | 2019-238365 A1 | 12/2019 | | |

OTHER PUBLICATIONS

WIPO, International Search Report issued for International Patent Application No. PCT/KR2021/006596, Sep. 13, 2021.

* cited by examiner

<Comparative example 1>

<Comparative example 2>

| Classification | Cooling channel structure | Flow of cooling fluid | Stator core | Coil |
|---|---|---|---|---|
| IK-100% (Comparative example) | | Low Temp. fluid / Low Temp. fluid | Both ends Low Temp. | End wiring High Temp. |

25°C ISO Temp.

31°C ISO Temp.

Fig. 36

| Classification | Cooling channel structure | Flow of cooling fluid | Stator core | Coil |
|---|---|---|---|---|
| IK-64% | | | | |

Low Temp. fluid

Low Temp. fluid

Both ends Overcooling

End wiring Overcooling

25°C ISO Temp.

31°C ISO Temp.

HEAT EXCHANGER AND ENERGY CONVERSION DEVICE ASSEMBLY INCLUDING THE SAME

CROSS-REFERENCE TO RELATED APPLICATION

This application is a US National stage Application filed under 35 U.S.C. § 371 of International Application No. PCT/KR2021/006596, filed on May 27, 2021, and designating the United States, the International Application claiming a priority date of Jun. 5, 2020, based on prior Korean Application No. 10-2020-0068575, filed on Jun. 5, 2020, and claiming a priority based on prior Korean Application No. 10-2020-0020802, filed on Feb. 20, 2020, Korean Application No. 10-2020-0094104, filed on Jul. 28, 2020, Korean Application No. 10-2020-0157101, filed on Nov. 20, 2020, and Korean Application No. 10-2020-0157418, filed on Nov. 23, 2020, the disclosure of which is incorporated herein by reference in its entirety.

TECHNICAL FIELD

The present disclosure relates to a heat exchanger and a device assembly including the heat exchanger.

RELATED ART

A thermal management apparatus or a thermal management system has been used to control heat generated from a device, such as, for example, a motor (an electric motor) and a generator. An electric vehicle (EV) needs to be driven using only a motor without using an internal combustion engine. The required power of a motor applied to the EV is relatively very high compared to that of a hybrid vehicle (HV).

As an amount of heat generated from an EV motor increases, a method of controlling/managing the same is required. In the process of designing a motor or a generator, a temperature characteristic of the motor or the generator may vary for each area. However, a conventional heat generator may not provide various heat exchange characteristics for each area.

Accordingly, a temperature of the motor or the generator may locally vary, which may cause the motor or the generator to partially expand or contract and result in mechanical defects. Also, due to the efficiency limit of the conventional heat exchanger, an output capacity of the motor or the generator may be limited.

DETAILED DESCRIPTION

Technical Subject

At least one example embodiment provides a heat exchanger that may appropriately control a heat bias phenomenon and efficiently perform heat exchange although the heat bias phenomenon occurs in a device, such as, for example, a motor (an electric motor) and a generator.

At least one example embodiment also provides a heat exchanger that may perform heat exchange to have a different temperature characteristic for each area of a heating element.

At least one example embodiment also provides a heat exchanger that may efficiently perform heat exchange in a relatively simple structure and may have a configuration and a driving scheme advantageous in terms of environmental issues, manufacturing convenience, and application convenience.

At least one example embodiment also provides a device assembly (e.g., an energy conversion device assembly) including the aforementioned heat exchanger.

Objects to be achieved herein are not limited to the aforementioned objects and other objects not described herein may also be clearly understood by those skilled in the art from the following description.

Solution

According to an aspect, there is provided a heat exchanger to perform heat exchange with a predetermined apparatus, the heat exchanger including a heat exchange channel construction configured to form a heat exchange area for heat exchange with the apparatus and to perform heat exchange through a flow of a heat transfer medium. The heat exchange channel construction includes a plurality of heat exchange channels each in a spiral shape, and the heat exchange channel construction includes an independent channel heat exchange area in which one of a first heat exchange channel and a second heat exchange channel included in the plurality of heat exchange channels independently performs heat exchange in a structure that includes at least one of a single channel structure and a branch channel structure and an interlocked heat exchange area in which the first heat exchange channel and the second heat exchange channel perform heat exchange through interlocking in one of a single channel interlocking structure and a branch channel interlocking structure.

The heat exchange channel construction may include an area 1S in which the first heat exchange channel independently performs heat exchange and an IK area in which the first heat exchange channel and the second heat exchange channel perform heat exchange through interlocking.

The heat exchange channel construction may include an IK area in which the first heat exchange channel and the second heat exchange channel perform heat exchange through interlocking, an area 1S formed at one end of the area IK and in which the first heat exchange channel independently performs heat exchange, and an area 2S formed at the other end of the area IK and in which the second heat exchange channel independently performs heat exchange.

The heat exchange channel construction may include a port that is formed in at least one of the first heat exchange channel and the second heat exchange channel, and the heat exchange channel construction may include an area in which a heat transfer medium flowing into the port proceeds in a first direction and an area in which the heat transfer medium flowing into the port proceeds in a second direction opposite to the first direction.

The heat exchange channel construction may include a plurality of ports, and the heat exchanger may further include at least one link channel configured to enable communication of at least a portion of the plurality of ports; and a flow rate controller configured to control a flow rate of the heat transfer medium that passes through the plurality of ports through connection to the at least one link channel.

The heat exchange channel construction may include an IK area in which the first heat exchange channel and the second heat exchange channel perform heat exchange through interlocking and an area 1S provided at each of both ends of the IK area and in which the first heat exchange channel independently performs heat exchange.

The heat exchanger may further include a cover channel provided inside a cover built with the apparatus, and the cover channel may be configured to connect to the heat exchange channel construction through at least one of a link channel connected to a port formed in the heat exchange channel construction and a radiation channel formed between the cover channel and the heat exchange channel construction.

The heat exchanger may further include an immersion chamber configured to enable heat exchange to be performed in a state in which at least a portion of the apparatus is immersed in the heat transfer medium. The immersion chamber may be configured to connect to the heat exchange channel construction through at least one of a link channel connected to a port formed in the heat exchange channel construction and a radiation channel formed between the immersion chamber and the heat exchange channel construction.

The heat exchanger may further include a yoke channel configured to enable communication between at least one of the first heat exchange channel and the second heat exchange channel and a slot formed between teeth formed in a yoke of a stator unit included in the apparatus.

Effects

According to at least one example embodiment, it is possible to implement a heat exchanger that may appropriately control a heat bias phenomenon and efficiently perform heat exchange although the heat bias phenomenon occurs in a device, such as, for example, a motor (an electric motor) and a generator.

According to at least one example embodiment, it is possible to implement a heat exchanger that may efficiently perform heat exchange in a relatively simple structure and may have a configuration and a driving scheme advantageous in terms of environmental issues, manufacturing convenience, and application convenience.

By applying the heat exchanger according to such example embodiments, it is possible to implement a device assembly (e.g., an energy conversion device assembly) having excellent heat exchange performance.

BRIEF DESCRIPTION OF DRAWINGS

FIG. 23 illustrates a heat exchanger according to still another example embodiment.

FIG. 36 illustrates a simulation result of evaluating a change in a temperature of a coil portion and a stator unit of an energy conversion device by operating of the heat exchanger when the heat exchanger according to the example embodiment of FIGS. 2A and 2B is applied to the energy conversion device.

BEST MODE

Figure 1A:
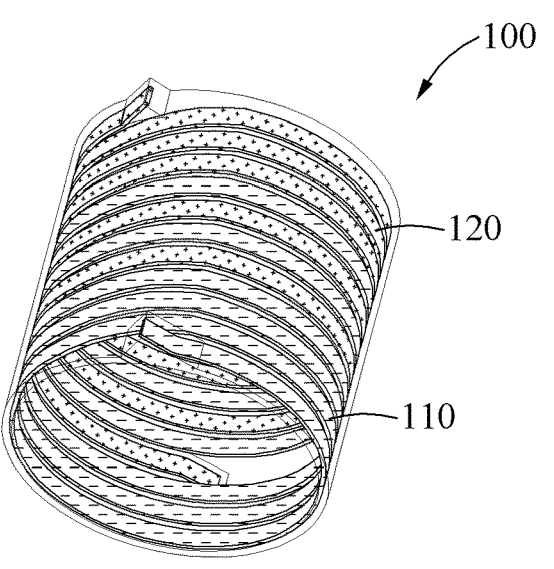
FIGS. 1A and 1B illustrate an example of a heat exchanger according to an example embodiment.

Hereinafter, example embodiments are described with reference to the accompanying drawings.

The following example embodiments are provided to further clearly explain the present disclosure to those skilled in the art and the scope of the present disclosure is not limited by the following example embodiments and the following example embodiments may be variously modified.

The terms used herein are simply used to explain a specific example embodiment and not intended to limit the present disclosure. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. Also, the term "connect" used herein may represent that some members are directly connected and may also represent that the members are indirectly connected by providing another member therebetween.

In addition, when the present specification describes that a single member is provided "on" another member, it may include a case in which the member is in contact with the other member and also include a case in which still another member is present between the two members. The term "and/or" used herein may include one and all combinations of at least one of corresponding listed items. Also, the terms, such as "about" and "substantially," used herein are used in a range of numerical values or degrees or a meaning closed thereto into consideration of inherent manufacturing and material tolerance and used to prevent an infringer from improperly using the state disclosure in which accurate or absolute numerical values provided to help the understanding of the present application are described.

Hereinafter, the example embodiments are further described with reference to the accompanying drawings. Sizes or thicknesses of areas or parts illustrated in the accompanying drawings may be exaggerated for clarity of the specification and convenience of description. Like reference numerals refer to like elements throughout.

A heat exchanger according to an example embodiment may perform heat exchange with a predetermined apparatus. A heat exchange channel construction 100 may perform heat exchange using a heat transfer medium that flows through its interior. Here, the heat transfer medium may include, for example, water and oil for heat transfer. However, a type of the heat transfer medium is not limited to the above-described fluid and may be changed with another fluid.

Figure 1B:
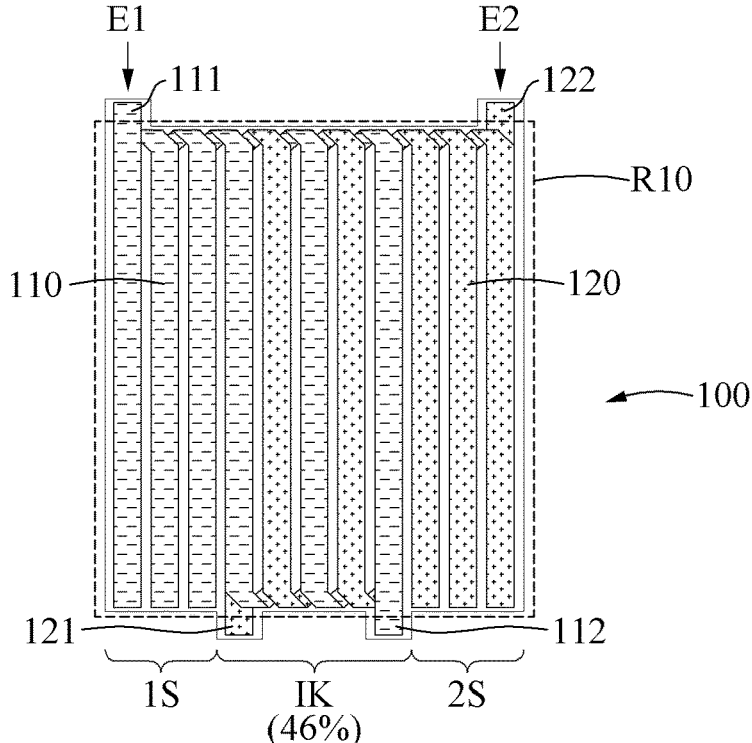

The heat exchange channel construction 100 may include a plurality of heat exchange channels. Although FIGS. 1A and 1B illustrate an example in which the heat exchange channel construction 100 includes a first heat exchange channel 110 and a second heat exchange channel 120, it is provided as an example only. For example, the heat exchange channel construction 100 may include at least three heat exchange channels. Each of the first heat exchange channel 110 and the second heat exchange channel 120 may be in a spiral structure. The first heat exchange channel 110 may spirally extend from a first end E1 to a second end E2 of the heat exchange channel construction 100. The second heat exchange channel 120 may spirally extend from the second end E2 to the first end E1 of the heat exchange channel construction 100.

The heat exchange channel construction 100 may form a heat exchange area R10. An area in which the first and second heat exchange channels 110 and 120 form a spiral shape may be defined as the heat exchange area R10. The first heat exchange channel 110 and the second heat exchange channel 120 in the spiral shape in the heat exchange area R10 may perform heat exchange with respect to an apparatus that generates heat. The first heat exchange channel 110 and the second heat exchange channel 120 may be separate from each other outside the heat exchange area R10 and may mutually independently transfer the heat transfer medium in the heat exchange area R10 and thus, may be regarded as different channels. As described below, when a single channel is branched into at least two flow paths within the heat exchange area R10, the branched flow paths may be regarded as a branch structure of the same channel.

The first heat exchange channel 110 and the second heat exchange channel 120 may be formed along the inner circumferential surface or the outer circumferential surface of an apparatus that is a heat exchange target. For example, when the apparatus 20 is an inner wheel motor, the first heat exchange channel 110 and the second heat exchange channel 120 may be formed along the outer circumferential surface of a stator of the inner wheel motor. As another example, when the apparatus is an outer wheel motor, the first heat exchange channel 110 and the second heat exchange channel 120 may be formed along the inner circumferential surface of a stator of the outer wheel motor. The first heat exchange channel 110 and the second heat exchange channel 120 may not be in direct contact with the apparatus 20 that is a heat exchange target. For example, another member may be further present between the first heat exchange channel 110 and the second heat exchange channel 120, and the apparatus. However, it is provided as an example only. The first heat exchange channel 110 and the second heat exchange channel 120 may be in direct contact with the surface of the apparatus 20 that is a heat exchange target.

The first heat exchange channel 110 and the second heat exchange channel 120 may be configured to engage with each other, that is, to be interlocked not in an entire area but in a partial area of the heat exchange channel construction 100. That the first heat exchange channel 110 and the second heat exchange channel 120 are interlocked may represent, for example, a state in which the first heat exchange channel 110 is extended with providing (insertion) of the second heat exchange channel 120 or a state in which the second heat exchange channel 120 is extended with providing (insertion) of the first heat exchange channel 110. Herein, an area in which the first heat exchange channel 110 and the second heat exchange channel 120 are interlocked, that is, an interlocked heat exchange area is marked with a reference symbol IK. In the interlocked heat exchange area IK, a unit portion of the first heat exchange channel 110 and a unit portion of the second heat exchange channel 120 may be alternately provided along a longitudinal direction (that is, a direction parallel to a central axis) of the heat exchange channel construction 100. However, it is provided as an example only. For example, as described below, when the first heat exchange channel 110 and the second heat exchange channel 120 are branched into at least two branch channels, the branched channels may engage with each other, that is, interlock. In this case, a unit portion of each of the branch channels may be alternately provided in the interlocked heat exchange area IK. In the interlocked heat exchange area IK, a heat exchange action may be performed by the first heat exchange channel 110 and the second heat exchange channel 120 in a state in which the first heat exchange channel 110 and the second heat exchange channel 120 are substantially evenly mixed.

That the first heat exchange channel 110 and the second heat exchange channel 120 are interlocked may be represented as that the first heat exchange channel 110 and the second heat exchange channel 120 are mutually "overlapped" or may be represented as that the first heat exchange channel 110 and the second heat exchange channel 120 are mutually "crossed." Therefore, the interlocked heat exchange area IK (also, referred to as an area IK) may be referred as an "overlapping area" or a "crossing area." The first heat exchange channel 110 may not be interlocked with the second heat exchange channel 120 in a remaining area (a left area of the interlocked heat exchange area) excluding the interlocked heat exchange area IK. The second heat exchange channel 120 may not be interlocked with the first heat exchange channel 110 in a remaining area (a right area of the interlocked heat exchange area) excluding the interlocked heat exchange area IK. The heat exchange channel construction 100 may include an independent channel heat exchange area in which one of the first heat exchange channel 110 and the second heat exchange channel 120 independently perform heat exchange. In the independent channel heat exchange area, the first heat exchange channel 110 or the second heat exchange channel 120 may include at least one of a single channel structure and a branch channel structure.

According to the example embodiments of FIGS. 1A and 1, an area (hereinafter, an area 1S) in which the first heat exchange channel 110 independently performs heat exchange may be provided at one side of the interlocked heat exchange area IK and an area (hereinafter, an area 2S) in which the second heat exchange channel 120 performs heat exchange may be provided at the other side of the interlocked heat exchange area IK. That is, an area in which the first heat exchange channel 110 without providing of the second heat exchange channel 120 is wound (rotated) twice or more may be present in an area adjacent to the first end E1 of the heat exchange channel construction 100 and an area in which the second heat exchange channel 120 without providing of the first heat exchange channel 110 is wound (rotated) twice or more may be present in an area adjacent to the second area E2 of the heat exchange channel construction 100. In general, heat exchange by the first heat exchange channel 110 may be performed on the one side of the interlocked heat exchange area IK and heat exchange by the second heat exchange channel 120 may be performed on the other side of the interlocked heat exchange area IK.

The first heat exchange channel 110 may include a (1-1)-th port 111 and a (1-2)-th port 112 for flow of a first heat transfer medium and the second heat exchange channel 120 may include a (2-2)-th port 122 and a (2-1)-th port 121 for flow of a second heat transfer medium. The (1-1)-th port 111 may be provided at the first end E1 and the (2-2)-th port 122 may be provided at the second end E2. The (1-2)-th port 112 may be provided between the (2-2)-th port 122 and the (2-1)-th port 121, and the (2-1)-th port 121 may be provided between the (1-1)-th port 111 and the (1-2)-th port 112. The (1-2)-th port 112 may be provided to be close to a central portion (a central portion in a longitudinal direction) of the heat exchange channel construction 100 compared to the (2-2)-th port 122. Likewise, the (2-1)-th port 121 may be provided to be close to the central portion of the heat exchange channel construction 100 compared to the (1-1)-th port 111. The first heat exchange channel 110 and the second heat exchange channel 120 may be provided to interlock in an area between the (1-2)-th port 112 and the (2-1)-th port 121. That is, the area between the (1-2)-th port 112 and the (2-1)-th port 121 may be defined as the interlocked heat exchange area IK.

The first heat transfer medium may be injected into the (1-1)-th port 111 of the first heat exchange channel 110 present at the first end E1 of the heat exchange channel construction 100 and pass through the first heat exchange channel 110 and then be discharged to the (1-2)-th port 112. The second heat transfer medium may be injected into the (2-2)-th port 122 of the second heat exchange channel 120 present at the second end E2 of the heat exchange channel construction 100 and pass through the second heat exchange channel 120 and then be discharged to the (2-1)-th port 121. Therefore, a travel direction of the first heat transfer medium that passes through the first heat exchange channel 110 and a travel direction of the second heat transfer medium that passes through the second heat exchange channel 120 may be opposite to each other. Two heat exchange channels, that is, the first and second heat exchange channels 110 and 120, are used and heat transfer mediums, that is, the first and second heat transfer mediums, pass through the heat exchange channels in opposite directions, respectively. Therefore, in this aspect, the heat exchange channel construction 100 according to an example embodiment may be regarded to have a so-called "Double and Counter Flow (DC Flow)" configuration/feature.

An example in which heat transfer mediums are injected into ports, for example, the (1-1)-th port 111 and (2-2)-th port 122, present at both ends of the heat exchange channel construction 100 and the heat transfer mediums are discharged through ports, for example, the (1-2)-th port 112 and the (2-1)-th port 121, formed in the middle of the heat exchange channel construction 100 is described with reference to FIGS. 1A and 1B. However, it is provided as an example only. Roles of the ports, for example, the (1-2)-th port 112 and the (2-1)-th port 121, formed in the middle of the heat exchange channel construction 100 and roles of the ports, for example, the (1-1)-th port 111 and (2-2)-th port 122, formed at both ends of the heat exchange channel construction 100 may be interchanged. In this case, the heat transfer mediums may flow through the ports 112 and 121, for example, the (1-2)-th port 112 and the (2-1)-th port 121, formed in the middle of the heat exchange channel construction 100 and the heat transfer mediums may be discharged through the ports, for example, the (1-1)-th port 111 and (2-2)-th port 122, formed at both ends of the heat exchange channel construction 100. A ratio, a position, and a size of the interlocked heat exchange area IK in the heat exchange channel construction 100 may be variously modified based on an application field.

Additionally, each of the first heat exchange channel 110 and the second heat exchange channel 120 may be in a spiral structure. When each of the first heat exchange channel 110 and the second heat exchange channel 120 is in a spiral-tube-shaped channel structure, the heat transfer medium may smoothly flow along a predetermined path (that is, the first heat exchange channel 110 or the second heat exchange channel 120) regardless of a flow rate thereof. However, a structure/shape of the first heat exchange channel 110 and the second heat exchange channel 120 may vary.

Figure 2A:
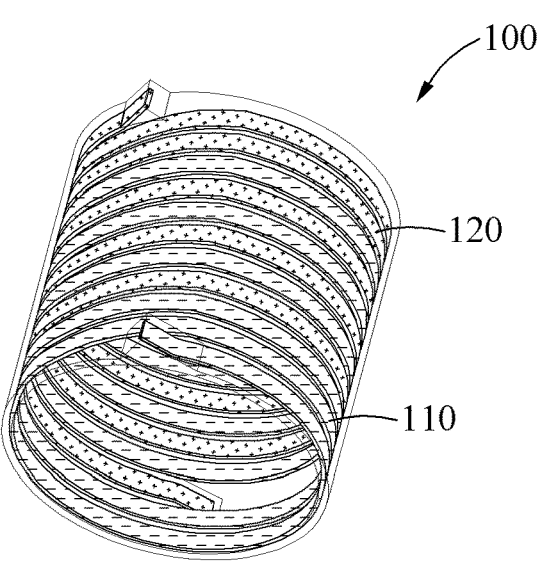
FIGS. 2A and 2B illustrate a case in which a ratio of an interlocked heat exchange area (i.e., an overlapping area) is 64% in the heat exchanger of FIGS. 1A and 1B according to another example embodiment.
Figure 2B:
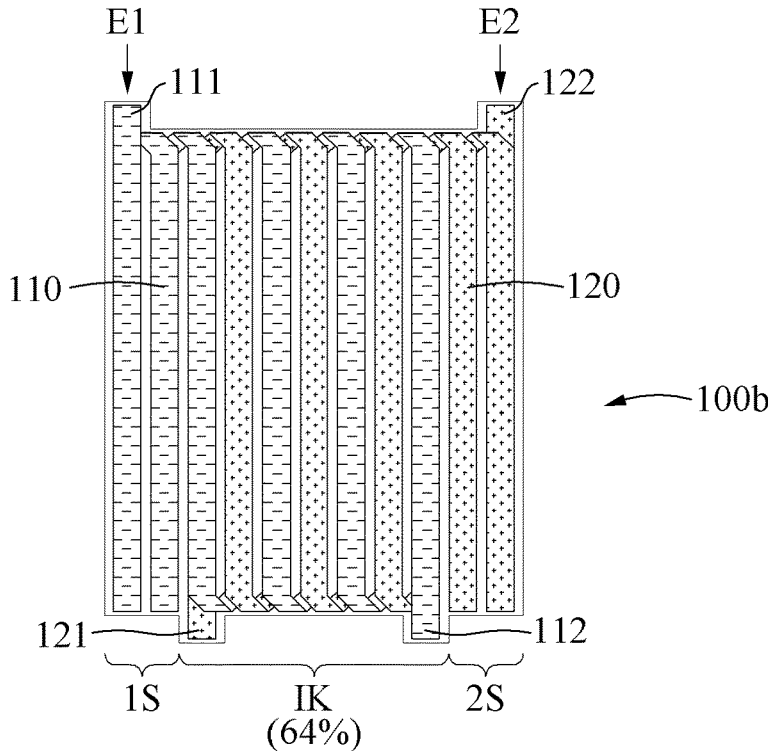

FIGS. 2A and 2B illustrate a case in which a ratio of an interlocked heat exchange area (i.e., an overlapping area) is 64% in the heat exchanger of FIGS. 1A and 1B according to another example embodiment. FIG. 2A is a perspective view of the heat exchanger and FIG. 2B is a side view of the heat exchanger. The heat exchanger of FIGS. 2A and 2B may be regarded to have an IK-64% configuration.

Figure 3A:
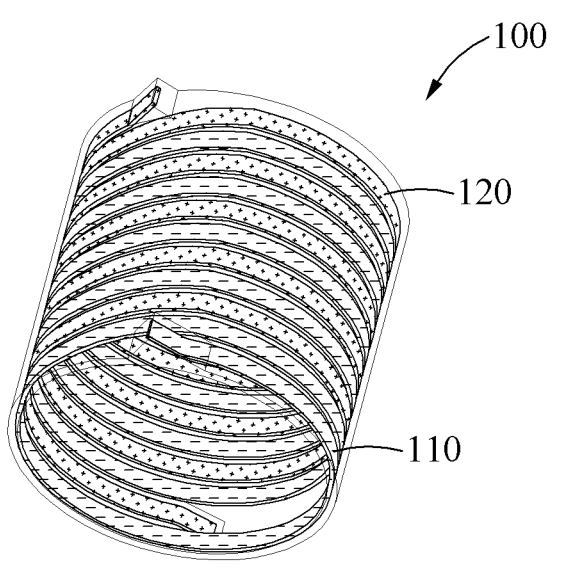
FIGS. 3A and 3B illustrate a case in which a ratio of an interlocked heat exchange area (i.e., an overlapping area) is 82% in the heat exchanger according to another example embodiment.
Figure 3B:
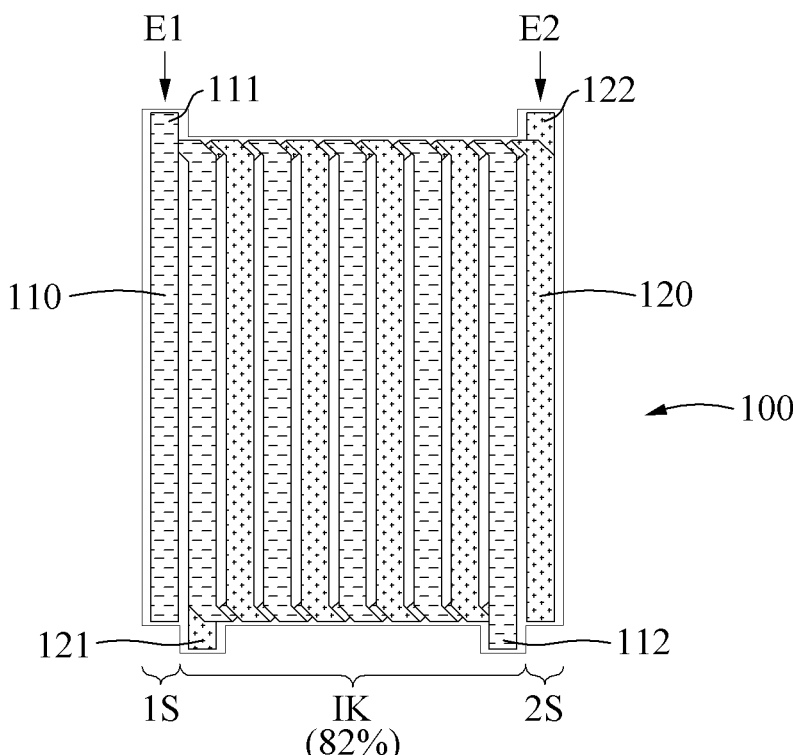

FIGS. 3A and 3B illustrate a case in which a ratio of an interlocked heat exchange area (i.e., an overlapping area) is 82% in the heat exchanger according to another example embodiment. FIG. 3A is a perspective view of the heat exchanger and FIG. 3B is a sideview of the heat exchanger. The heat exchanger of FIGS. 3A and 3B may be regarded to have an IK-82% configuration.

Figure 4A:
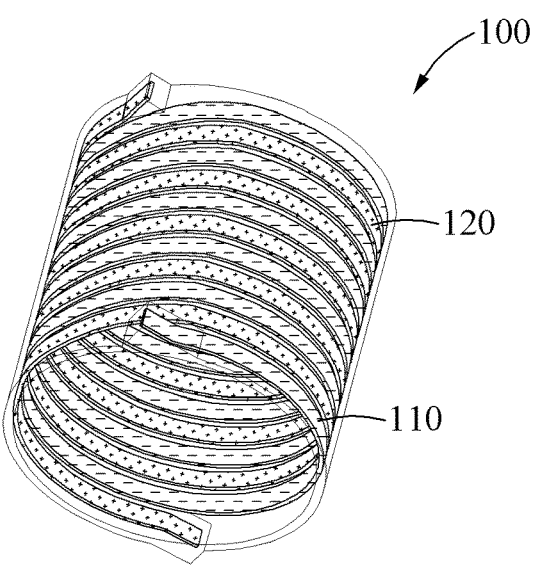
FIG. 4A is a perspective view of a heat exchanger and FIG. 4B is a side view of the heat exchanger according to a first comparative example.
Figure 4B:
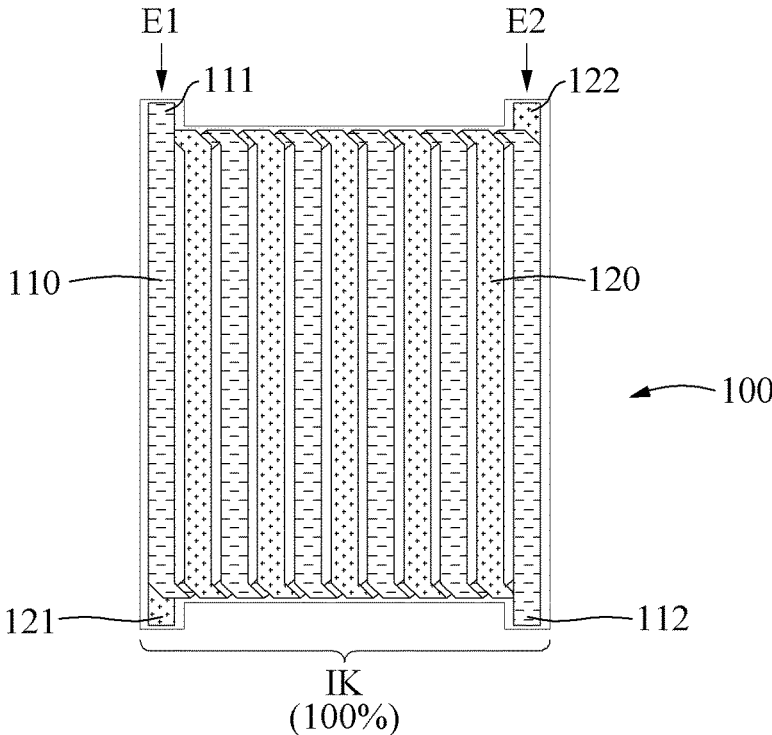

FIG. 4A is a perspective view of a heat exchanger and FIG. 4B is a side view of the heat exchanger according to a first comparative example.

Referring to FIGS. 4A and 4B, the heat exchanger according to the first comparative example may include the heat exchange channel construction 100, and the heat exchange channel construction 100 may include the first heat exchange channel 110 and the second heat exchange channel 120. The first heat exchange channel 110 and the second heat exchange channel 120 may be provided to be engaged with each other, that is, interlocked in the entire area of the heat exchange channel construction 100. That is, the first heat exchange channel 110 and the second heat exchange channel 120 may be engaged with each other, that is, interlocked over the entire area from the first end E1 to the second end E2 of the heat exchange channel construction 100. Therefore, a ratio of the interlocked heat exchange area IK is 100%. The heat exchanger according to the first comparative example of FIG. 4 may be regarded to have an IK-100% configuration.

Figure 5A:
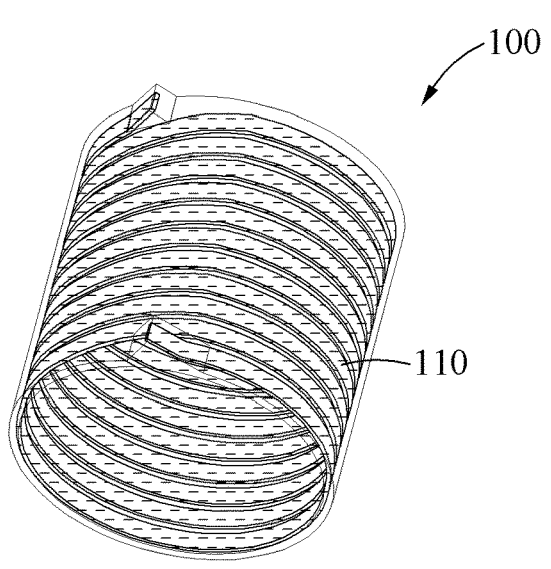
FIG. 5A is a perspective view of a heat exchanger and FIG. 5B is a side view of the heat exchanger according to a second comparative example.
Figure 5B:
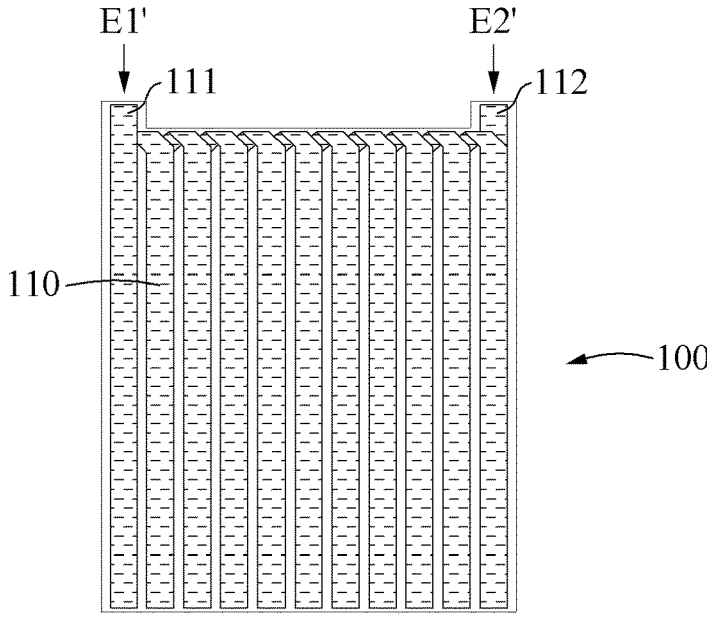

FIG. 5A is a perspective view of a heat exchanger and FIG. 5B is a side view of the heat exchanger according to a second comparative example.

Referring to FIGS. 5A and 5B, the heat exchanger according to the second comparative example may include the heat exchange channel construction 100, and the heat exchange channel construction 100 may include a single heat exchange channel 110. The (1-1)-th port 111 for injecting a heat transfer medium may be provided at one end of the heat exchange channel 110 and the (1-2)-th port 112 for discharging a heat transfer medium may be provided at the other end of the heat exchange channel 110. The one end of the heat exchange channel 110 may correspond to a first end E1' of the heat exchange channel construction 100 and the other end of the heat exchange channel 110 may correspond to a second end E2' of the heat exchange channel construction 100. The heat exchanger according to the second comparative example of FIGS. 5A and 5B may be regarded to have an S-100% configuration. Here, S denotes single.

According to a comparative example that refers to FIGS. 4A and 4B, the heat exchange channel construction 100 includes only the interlocked heat exchange area IK and does not include an area in which either the first heat exchange channel 110 or the second heat exchange channel 120 performs heat exchange. In this case, compared to the example embodiments of FIGS. 1A and 1B to 3A and 3B, when a calorific value or a temperature characteristic for each area of an apparatus is uneven, the heat exchange performance of the heat exchange channel construction 100 may be degraded. Also, according to a comparative example that refers to FIGS. 5A and 5B, the heat exchange channel construction 100 may include only a single heat exchange channel 110. In this case, as a heat transfer medium flowing into the (1-1)-th port 111 of the heat exchange channel 110 proceeds to the (1-2)-th port 112, a temperature of the heat transfer medium gradually varies. Therefore, a temperature of an apparatus (not shown) becomes uneven, which may lead to degrading the overall heat exchange performance.

Figure 6:
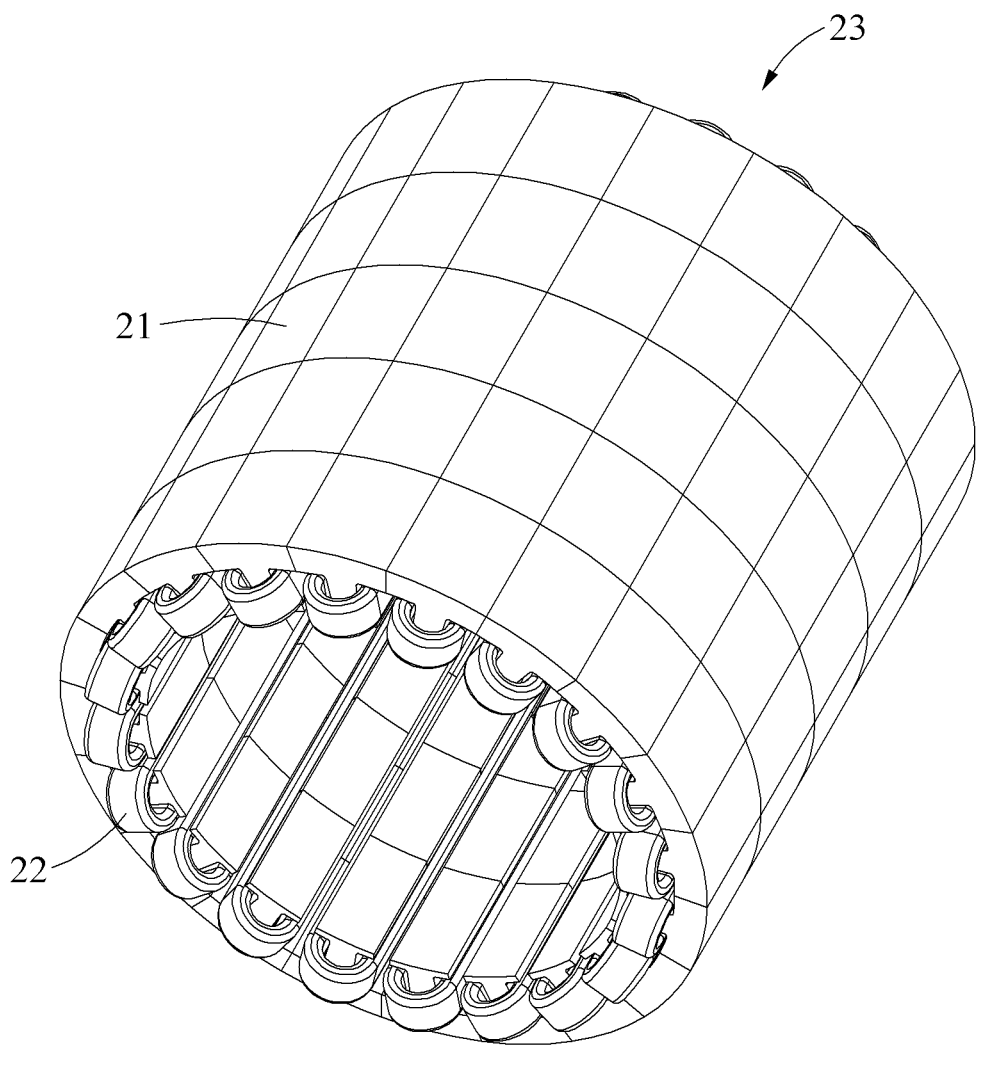
FIG. 6 is a perspective view illustrating an energy conversion device to which a heat exchanger is applicable according to an example embodiment.
Figure 7:
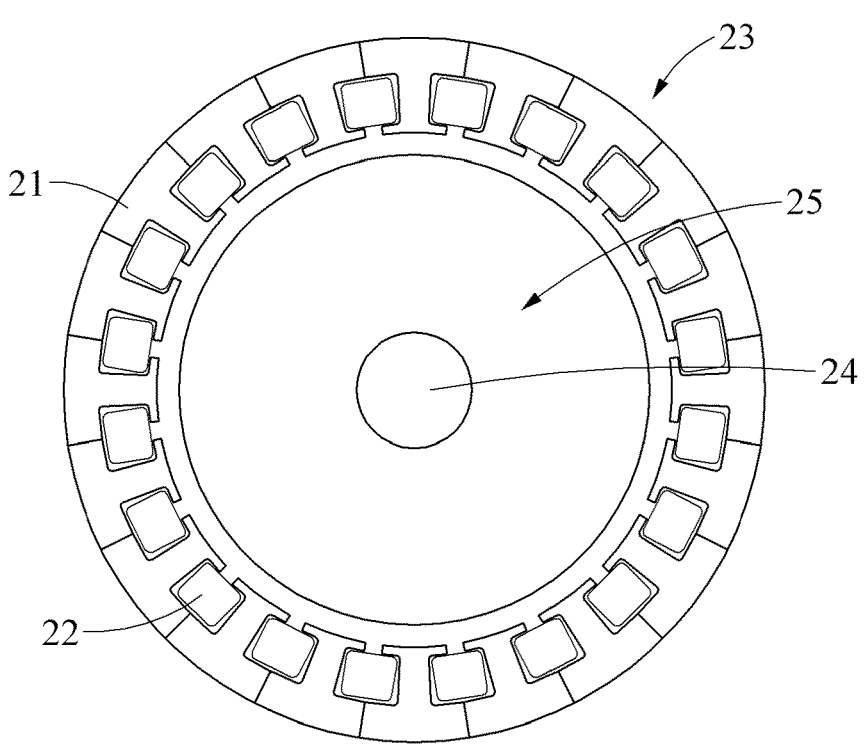
FIG. 7 is a cross-sectional view illustrating an energy conversion device to which a heat exchanger is applicable according to the example embodiment.

FIG. 6 is a perspective view of the apparatus 20 that may be a heat exchange target by a heat exchanger according to an example embodiment and FIG. 7 is a cross-sectional view of the apparatus 20.

Although FIGS. 6 and 7 illustrate an example in which a coiler portion 22 is provided inside a stator unit 23, it is provided as an example only. The coiler portion 22 may be provided outside the stator unit 23.

Referring to FIGS. 6 and 7, the apparatus 20 may include the stator unit 23 and a rotator unit 25. The stator unit 23 may include a yoke 21 and the coiler portion 22 provided between teeth of the yoke 21. A slot may be provided between the teeth of the yoke 21. The yoke 21 may be in a cylindrical shape with a hollow portion. A plurality of teeth may be formed on the inner circumferential surface of the yoke 21. The coiler portion 22 may be provided between the plurality of teeth. The coiler portion 22 may be a winding coil that is regularly wound along the plurality of teeth.

The plurality of teeth may be formed in the yoke 21 and the coiler portion 22 may be positioned between the plurality of teeth. The rotator unit 25 may be provided in the hollow portion defined inside the stator unit 23. The rotator unit 25 may include a rotation shaft 24 at its center. Also, the rotator unit 25 may include a permanent magnet or a semi-permanent magnet. The heat exchanger may perform heat exchange with the apparatus 20 by flow of heat transfer medium in heat exchange channels that are formed along the outer circumferential surface or the inner circumferential surface of the apparatus 20.

In the case of a motor (an electric motor) or a generator of a vehicle, if a temperature decreases by increasing the heat exchange performance, performance and energy efficiency may be greatly improved. If the temperature decreases, a parameter, such as density of a magnetic field inside the motor or the generator, may be improved and the energy efficiency may be enhanced. Also, prevention of overheating and control of an appropriate temperature may play an important role in preventing thermal damage to the motor or the generator and extending a lifespan thereof.

Figure 8:
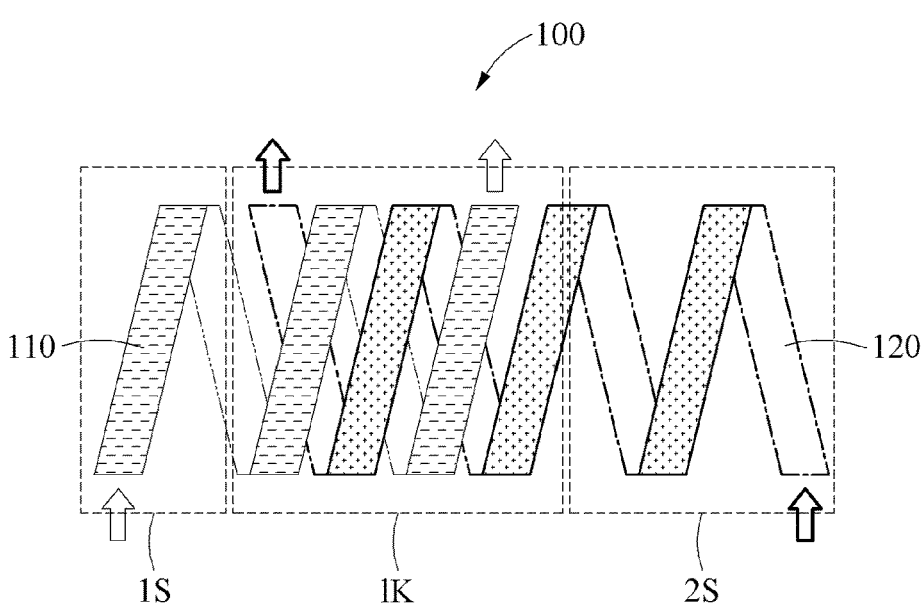
FIG. 8 illustrates a heat exchanger according to still another example embodiment.

FIG. 8 illustrates a heat exchanger according to still another example embodiment.

Referring to FIG. 8, the first heat exchange channel 110 and the second heat exchange channel 120 may be engaged with each other, that is, interlocked in the interlocked heat exchange area IK. The first heat exchange channel 110 may not be interlocked with the second heat exchange channel 120 in the area 1S. The second heat exchange channel 120 may be interlocked with the first heat exchange channel 110 in the interlocked heat exchange area IK. The second heat exchange channel 120 may not be interlocked with the first heat exchange channel 110 in the area 2S. In FIG. 8, a size of the area 1S and a size of the 2S may differ from each other, which differs from FIG. 1. Although FIG. 1 illustrates an example in which the size of the area 1S is greater than the size of the area 2S, it is provided as an example only. For example, the size of the area 1S may be less than the size of the area 2S.

In the example embodiment of FIG. 8, the size of the area 1S in which the first heat exchange channel 110 independently performs heat exchange and the size of the area 2S in which the second heat exchange channel 120 independently performs heat exchange may differ from each other. That is, the heat exchange channel construction 100 may be in an asymmetric shape. The heat exchange channel construction 100 of FIG. 8 may be used for heat exchange of an apparatus in which heat is asymmetrically generated.

Figure 9:
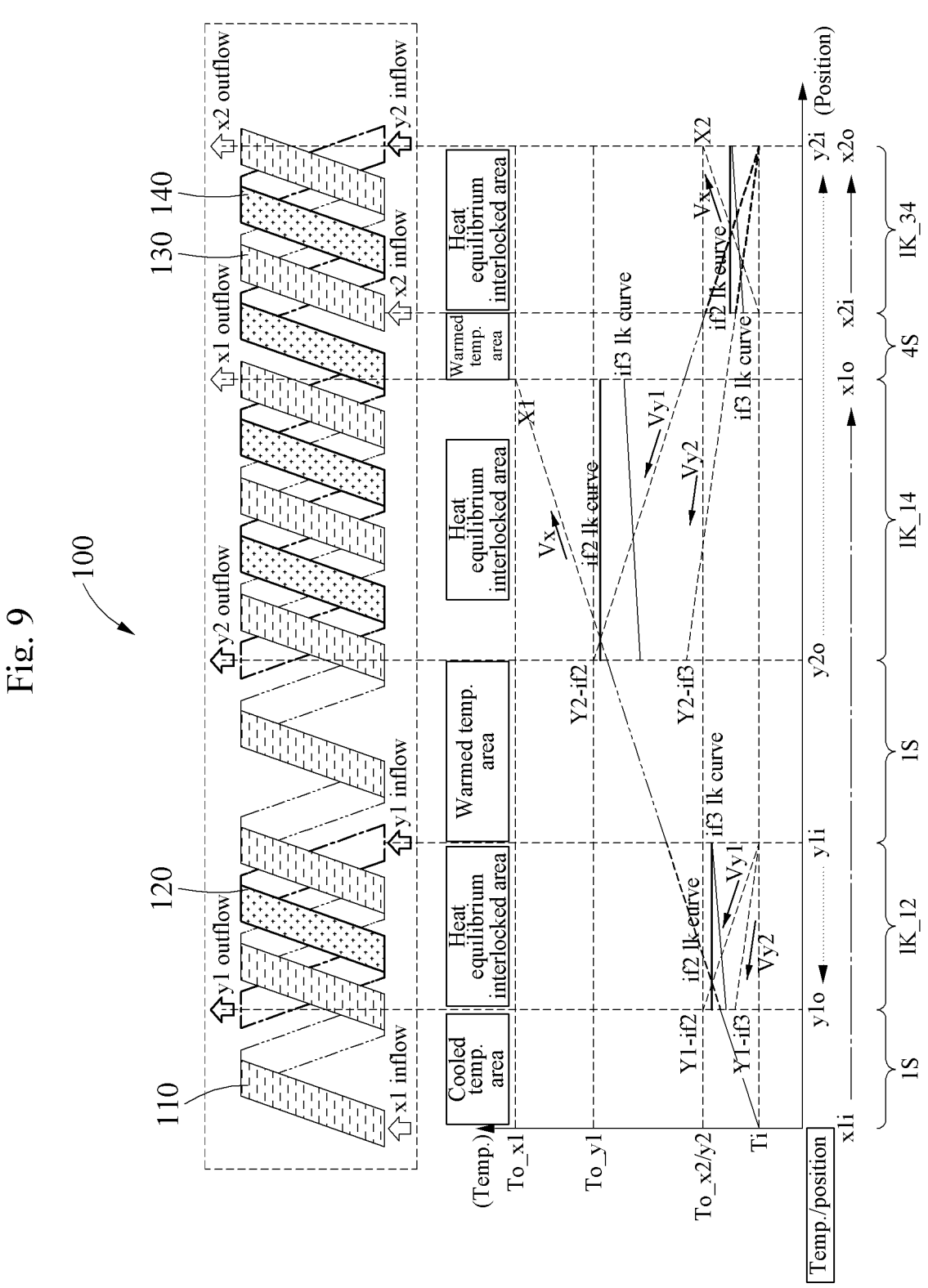
FIG. 9 illustrates a heat exchanger according to still another example embodiment.

FIG. 9 illustrates a heat exchanger according to still another example embodiment.

The heat exchange channel construction 100 may include four heat exchange channels 110, 120, 130, and 140. In interlocked heat exchange areas IK_12 and IK_34 of the heat exchange channel construction 100, at least two of the heat exchange channels 110, 120, 130, and 140 may be interlocked. In a remaining area excluding the interlocked heat exchange areas IK_12 and IK_34 in the heat exchange channel construction 100, a single heat exchange channel may independently perform heat exchange. Here, independently perform heat exchange may represent that a single heat exchange channel performs heat exchange without interlocking with another heat exchange channel.

A first heat transfer medium may flow into the first heat exchange channel 110 at a coordinate x1$i$ and may be discharged from the first heat exchange channel 110 at a coordinate x1$o$. When it is assumed that the heat exchange channel construction 100 performs heat exchange to decrease a temperature of an apparatus, a temperature of the first heat transfer medium may increase while the first heat transfer medium proceeds from the coordinate x1$i$ to the coordinate x1$o$. Therefore, in the area 1S, a temperature of the heat exchange channel construction 100 may increase as going toward the right.

A second heat transfer medium may flow into the second heat exchange channel 120 at a coordinate y1$i$ and may be discharged from the second heat exchange channel 120 at a coordinate y1$o$. Therefore, in the interlocked heat exchange area IK_12, a travel direction of the first heat transfer medium and a travel direction of the second heat transfer medium may be opposite to each other. When it is assumed that the heat exchange channel construction 100 performs heat exchange to decrease a temperature of an apparatus, a temperature of the second heat transfer medium may increase while the second heat transfer medium proceeds from the coordinate y1$i$ to the coordinate y1$o$. In the interlocked heat exchange area IK_12, the temperature of the first heat transfer medium may increase as going toward the right and the temperature of the second heat transfer medium may increase as going toward the left. Therefore, the temperature in the interlocked heat exchange area IK_12 may be maintained to be in equilibrium or may vary at a relatively small change rate compared to the area 1S.

A fourth heat transfer medium may flow into the fourth heat exchange channel 140 at a coordinate y2$i$ and may be discharged from the fourth heat exchange channel 140 at a coordinate y2$o$. In an area 4S in which the fourth heat exchange channel 140 independently performs heat exchange, the temperature of the heat exchange channel construction 100 may increase as going toward the left. In an interlocked heat exchange area IK_14, a travel direction of the first heat transfer medium and a travel direction of the fourth heat transfer medium may be opposite to each other. When it is assumed that the heat exchange channel construction 100 performs heat exchange to decrease a temperature of an apparatus, a temperature of the fourth heat transfer medium may increase while the fourth heat transfer medium proceeds from the coordinate y2$i$ to the coordinate y2$o$. In the interlocked heat exchange area IK_14, the temperature of the first heat transfer medium may increase as going toward the right and the temperature of the fourth heat transfer medium may increase as going toward the left. Therefore, the temperature of the interlocked heat exchange area IK_14 may be maintained to be in equilibrium or may vary at a relatively small change rate compared to the area 1S.

A third heat transfer medium may flow into the third heat exchange channel 130 at a coordinate x2$i$ and may be discharged from the third heat exchange channel 130 at a coordinate x2$o$. In the interlocked heat exchange area IK_34, a travel direction of the third heat transfer medium and a travel direction of the fourth heat transfer medium may be opposite to each other. When it is assumed that the heat exchange channel construction 100 performs heat exchange to decrease a temperature of an apparatus, a temperature of the third heat transfer medium may increase as the third heat transfer medium proceeds from the coordinate x2$i$ to the coordinate x2$o$. In the interlocked heat exchange area IK_34, the temperature of the third heat transfer medium may increase as going toward the right and the temperature of the fourth heat transfer medium may increase as going toward the left. Therefore, the temperature of the interlocked heat exchange area IK_34 may be maintained to be in equilibrium or may vary at a relatively small change rate compared to the area 1S or the area 4S.

According to the example embodiment of FIG. 9, while the temperature of the heat exchange channel construction 100 varies based on a change in a position in an area, for example, the area 1S and the area 4S, in which heat exchange is performed by a single heat exchange channel, the temperature of the heat exchange construction 100 may not vary or may vary at a small change rate in the interlocked heat exchange areas IK_12, IK_14, IK_34. In this manner, various temperature characteristics may be applied for each area of the apparatus.

Figure 10:
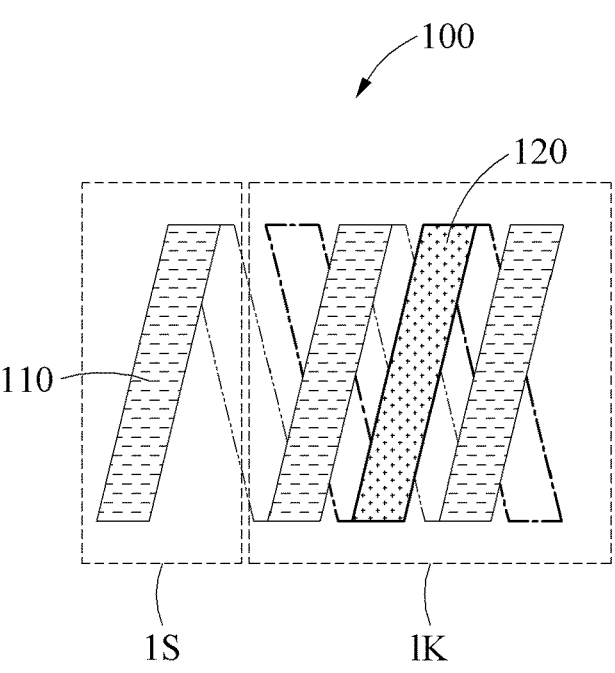
FIG. 10 illustrates a heat exchanger according to still another example embodiment.

FIG. 10 illustrates a heat exchanger according to still another example embodiment.

Referring to FIG. 10, the entire second heat exchange channel 120 may be interlocked with the first heat exchange channel 110. In contrast, a partial area, for example, the area 1S, of the first heat exchange channel 110 may not be interlocked with the second heat exchange channel 120. That is, the first heat exchange channel 110 may include the area IK in which the first heat exchange channel 110 is interlocked with another heat exchange channel and the area 1S in which the first heat exchange channel 110 is not interlocked with another heat exchange channel. In a substantially entire area, the second heat exchange channel 120 may be interlocked with the first heat exchange channel 110. Although FIG. 10 illustrates an example in which the interlocked heat exchange area IK is positioned on the right, it is provided as an example only. For example, the interlocked heat exchange area IK may be positioned on the left. Also, dissimilar to the example embodiment of FIG. 10, the entire area of the first heat exchange channel 110 may be interlocked with the second heat exchange channel 120 and a portion of the second heat exchange channel 120 may not be interlocked with the first heat exchange channel 110.

Figure 11:
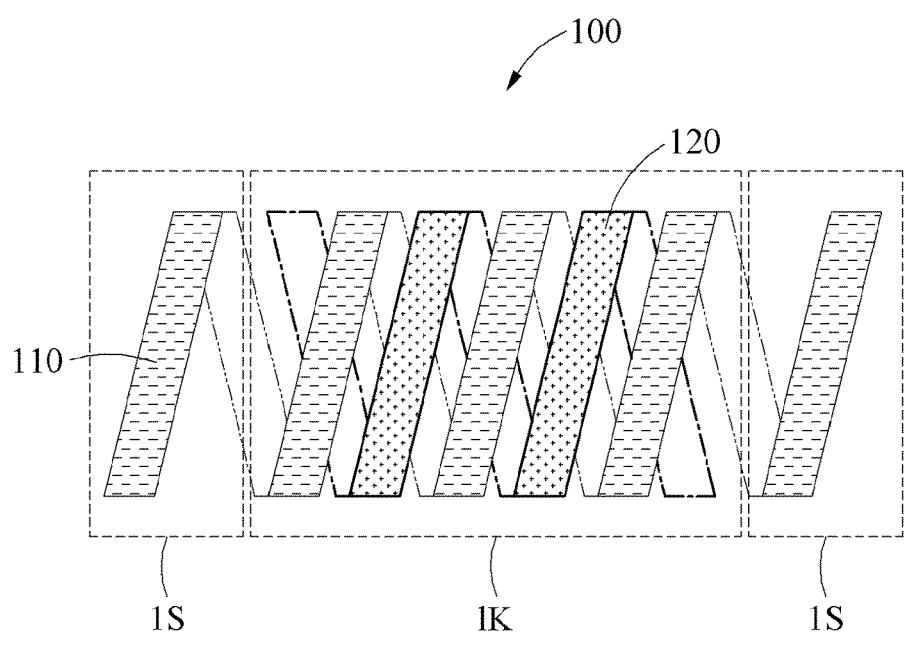
FIG. 11 illustrates a heat exchanger according to still another example embodiment.

FIG. 11 illustrates a heat exchanger according to still another example embodiment.

Referring to FIG. 11, the entire second heat exchange channel 120 may be interlocked with the first heat exchange channel 110. In contrast, two edge areas (1S) of the first heat exchange channel 110 may not be interlocked with another heat exchange channel. Dissimilar to the example embodiment of FIG. 10, the second heat exchange channel 120 may be present at the center of the first heat exchange channel 110 without being biased to either side. Therefore, the edge areas 1S of the first heat exchange channel 110 may not be interlocked with the second heat exchange channel 120. The two edge areas (1S) may have the same size. Therefore, the heat exchange channel construction 100 may be in a symmetrical structure. However, it is provided as an example only. For example, the two edge areas (1S) may have different sizes. In this case, the heat exchange channel construction 100 may be in an asymmetrical structure.

The two areas 1S_1 and 1S_2 may have different sizes, which differs from FIG. 11. Therefore, the heat exchange channel construction 100 may be in an asymmetrical structure.

Figure 12:
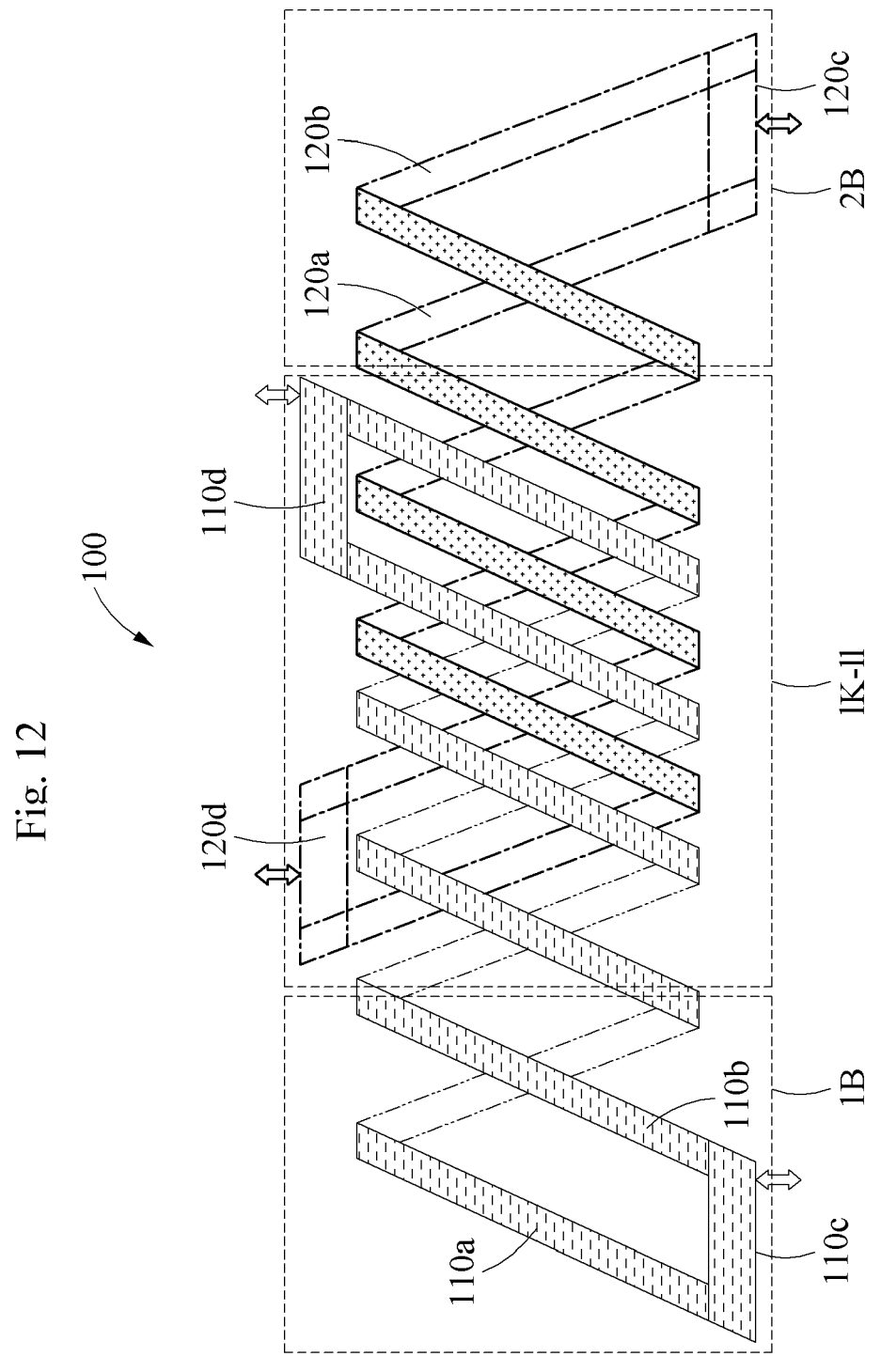
FIG. 12 illustrates a heat exchanger according to still another example embodiment.

FIG. 12 illustrates a heat exchanger according to still another example embodiment.

Referring to FIG. 12, the heat exchange channel construction 100 may include a first heat exchange channel and a second heat exchange channel. The first heat exchange channel may include at least two branch channels 110*a* and 110*b*. The branch channels 110*a* and 110*b* may be in a port branch structure branched from ports 110*c* and 110*d*. Ports of a heat transfer medium may be formed in the ports 110*c* and 110*d*. The heat transfer medium may be injected into the first heat exchange channel through one of the ports 110*c* and 110*d* and may be discharged from the first heat exchange channel through the other one of the ports 110*c* and 110*d*. For example, the heat transfer medium may be injected through the port 110*c* and the heat transfer medium may be discharged through the port 110*d*. As another example, the heat transfer medium may be injected through the port 110*d* and the heat transfer medium may be discharged through the port 110*c*.

By allowing the first heat exchange channel to include the plurality of branch channels 110*a* and 110*b*, the heat transfer medium injected into the first heat exchange channel may be distributed to the branch channels 110*a* and 110*b* and thereby flow. Through this, a parameter, such as a resistance to the heat transfer medium, in the first heat exchange channel may be adjusted.

Likewise, the second heat exchange channel may include at least two branch channels 120*a* and 120*b*. The branch channels 120*a* and 120*b* may communicate with each other through ports 120*c* and 120*d*. The heat transfer medium may be injected into the second heat exchange channel through one of the ports 120*c* and 120*d* and may be discharged from the first heat exchange channel through the other one of the ports 120*c* and 120*d*. For example, the heat transfer medium may be injected through the port 120*c* and the heat transfer medium may be discharged through the port 120*d*. As another example, the heat transfer medium may be injected through the port 120*d* and the heat transfer medium may be discharged through the port 120*c*.

By allowing the second heat exchange channel to include the plurality of branch channels 120*a* and 120*b*, the heat transfer medium injected into the second heat exchange channel may be distributed to the branch channels 120*a* and 120*b* and thereby flow. Through this, a parameter, such as a resistance to the heat transfer medium, in the second heat exchange channel may be adjusted.

FIG. 12 illustrates an example in which each of the first heat exchange channel and the second heat exchange channel includes at least two branch channels. However, it is provided as an example only. For example, one of the first heat exchange channel and the second heat exchange channel may include at least two branch channels and the other one thereof may include a single channel. Here, in an area IK-II, each of the two heat exchange channels may include branch channels or may include a single channel.

Figure 13:
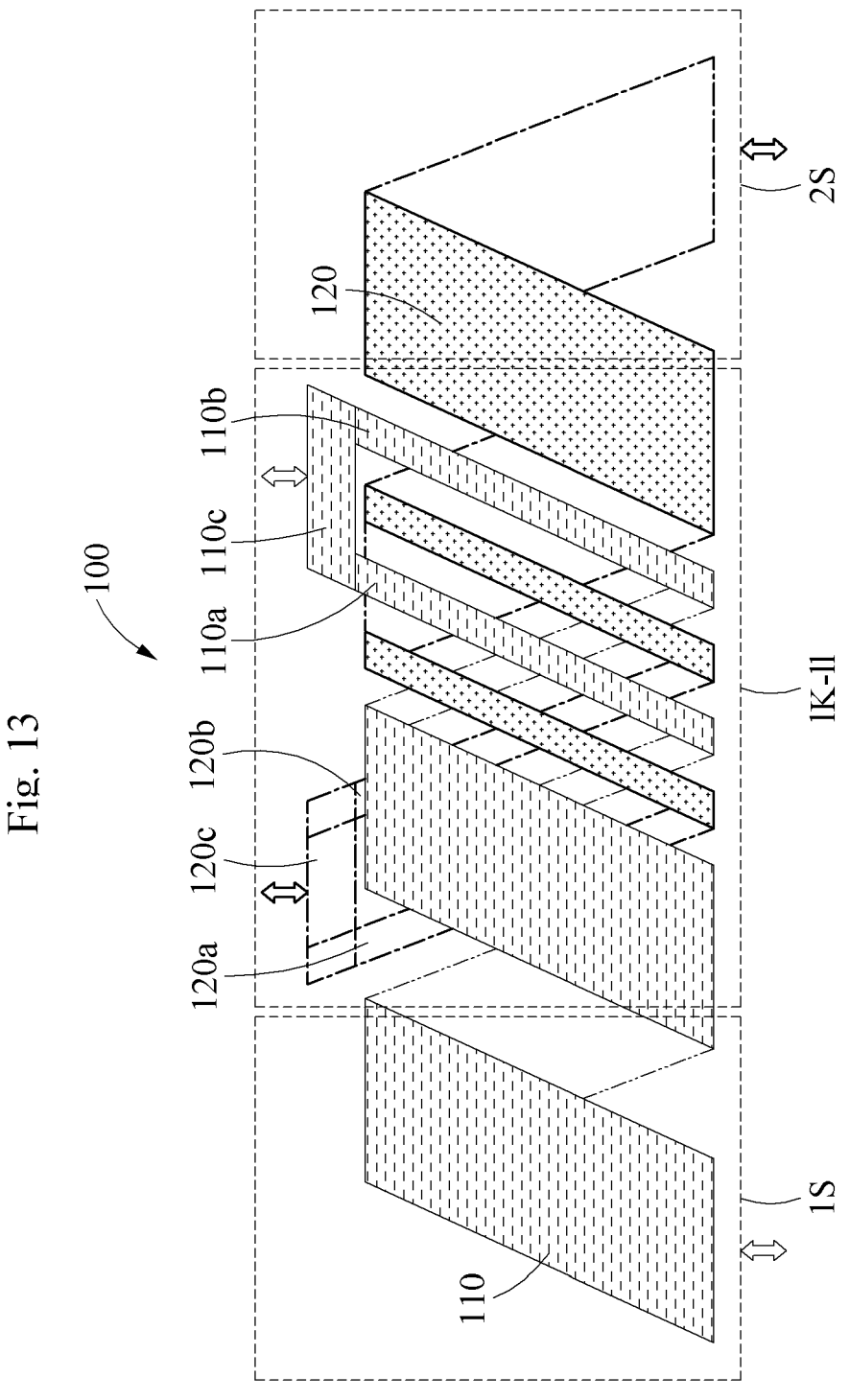
FIG. 13 illustrates a heat exchanger according to still another example embodiment.

FIG. 13 illustrates a heat exchanger according to still another example embodiment.

Referring to FIG. 13, the first heat exchange channel 110 and the second heat exchange channel 120 may be interlocked in an interlocked heat exchange area IK-II. The first heat exchange channel 110 may not be interlocked with the second heat exchange channel 120 in an area 1S. The second heat exchange channel 120 may not be interlocked with the first heat exchange channel 110 in an area 2S.

In the area 1S, the first heat exchange channel 110 may include a single channel. Likewise, in the area 2S, the second heat exchange channel 120 may include a single channel. In the interlocked heat exchange area IK-II, the first heat exchange channel 110 may be branched into two branch channels 110*a* and 110*b*. Each of the branch channels 110*a* and 110*b* may be in a port branch structure branched from the port 110*c*. Likewise, in the interlocked heat exchange area IK-II, the second heat exchange channel 120 may be branched into two branch channels 120*a* and 120*b*. Each of the branch channels 120*a* and 120*b* may be in a port branch structure branched from the port 120*c*. Referring to FIG. 13, in the interlocked heat exchange area IK-II, each of the first heat exchange channel 110 and the second heat exchange channel 120 is branched into a plurality of branch channels such that a resistance of each channel in an area, for example, the area 1S and the area 2S, in which two channels are not interlocked and a resistance of each channel in the interlocked heat exchange area IK-II may differ from each other.

Although FIG. 13 illustrates an example in which the area 1S and the area 2S have the same size, it is provided as an example only. For example, the area 1S and the area 2S may have different sizes. That is, the heat exchange channel construction 100 may be not in a symmetrical structure but in an asymmetrical structure. Also, although FIG. 13 illustrates an example in which each of the first heat exchange channel 110 and the second heat exchange channel 120 is branched into at least two branch channels in the interlocked heat exchange area IK-II, it is provided as an example only. For example, only one of the first heat exchange channel 110 and the second heat exchange channel 120 may be branched into at least two branch channels in the interlocked heat exchange area IK-II.

Figure 14:
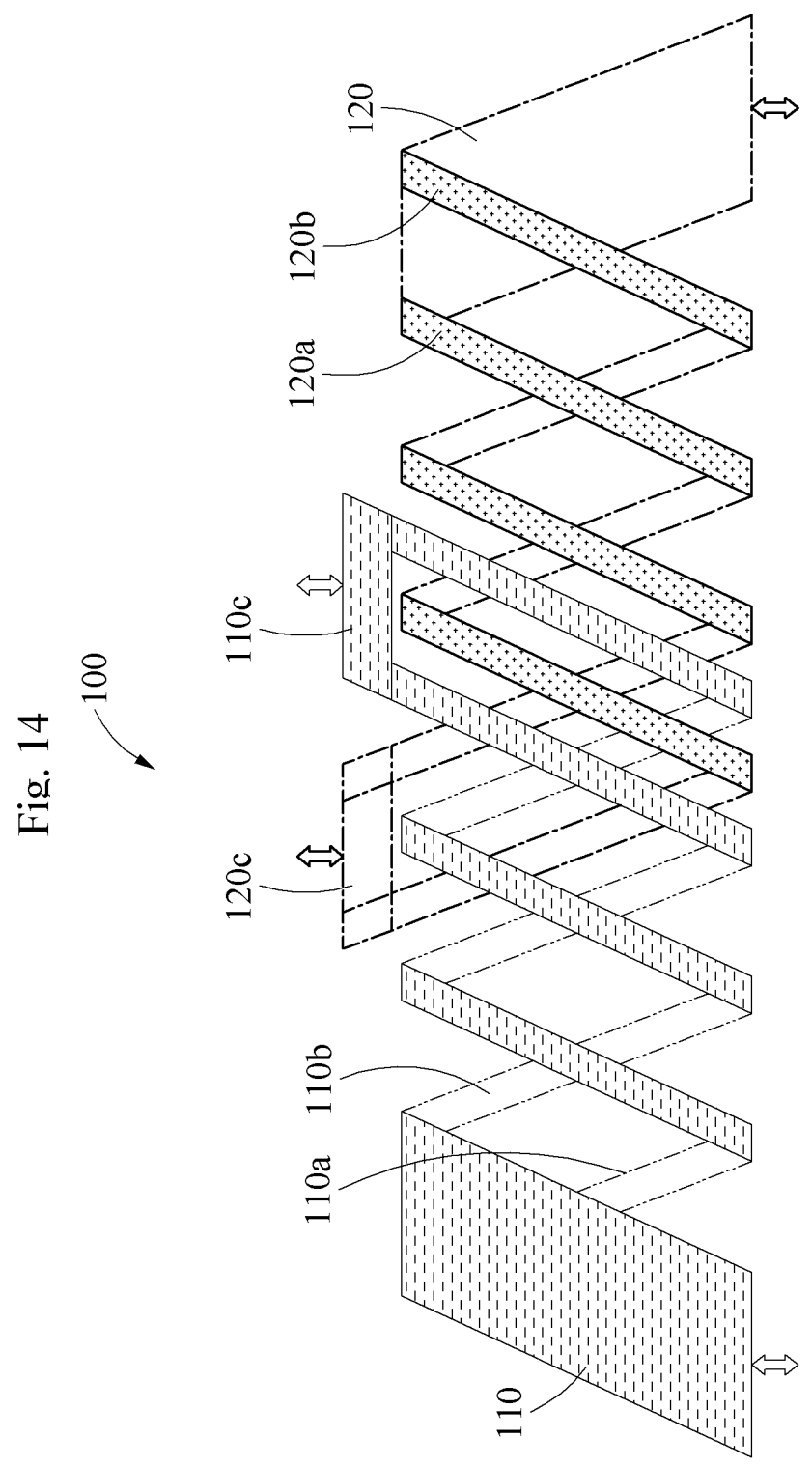
FIG. 14 illustrates a heat exchanger according to still another example embodiment.

FIG. 14 illustrates a heat exchanger according to still another example embodiment.

Referring to FIG. 14, the heat exchange channel construction 100 according to still another example embodiment may include the first heat exchange channel 110 and the second heat exchange channel 120. The first heat exchange channel 110 may be branched into a (1-1)-th heat exchange channel and a (1-2)-th heat exchange channel corresponding to the branch channels 110a and 110b. The (1-1)-th heat exchange channel and the (1-2)-th heat exchange channel may be in a port branch structure branched from the port 110c. The second heat exchange channel 120 may be branched into a (2-1)-th heat exchange channel and a (2-2)-th heat exchange channel corresponding to the branch channels 120a and 120b. The (2-1)-th heat exchange channel and the (2-2)-th heat exchange channel may be in a port branch structure branched port from the port 120c. The (1-1)-th heat exchange channel, the (1-2)-th heat exchange channel, the (2-1)-th heat exchange channel, and the (2-2)-th heat exchange channel may perform heat exchange through interlocking in the middle of a heat exchange area.

The heat exchanger according to the example embodiment may be modified using various methods. For example, cases in which two heat exchange channels interlock in a partial area may be represented as the following Table 1.

TABLE 1

| Symmetrical or asymmetrical type (area in which each of two channels independently performs heat exchange is provided at each of both ends of an area IK) | Insertion type (area in which the same channel independently performs heat exchange is provided at each of both ends of an area IK) | Deflection (area in which a single channel independently performs heat exchange is provided at one end of an area IK) |
|---|---|---|
| SIS (1S + IK + 2S) | sIS (1S + IK + 1S) | SI (1S + IK) |
| SIIS (1S + IK-II + 2S) | sIIS (1S + IK-II + 1S) | SII (1S + IK-II) |
| SIIB (1S + IK-II + 2B) | sIIB (1S + IK-II + 1B) | |
| BIIB (1B + IK-II + 2B) | bIIB (1B + IK-II + 1B) | BII (1B + IK-II) |
| SBIIS (1S + 1B + IK-II + 2S) | sbIIS (1S + 1B + IK-II + 1S) | |
| SBIIB (1S + 1B + IK-II + 2B) | sbIIB (1S + 1B + IK-II + 1B) | SBII (1S + 1B + IK-II) |
| SBIIBS (1S + 1B + IK-II + 2B + 2S) | sbIIBS (1S + 1B + IK-II + 1B + 1S) | |

In Table 1, among symbols representing a type of each eat exchange channel construction, "S" represents an area in which heat exchange is performed by a single channel, "B" represents an area in which heat exchange is performed by channels branched from a single channel, "I" represents an area in which two heat exchange channels perform heat exchange through interlocking in a single channel structure, and "II" represents an area in which two heat exchange channels perform heat exchange through interlocking in a branch channel structure. Symbols indicated in parentheses have the same meaning as symbols of the areas used in FIGS. 1 to 14.

In Table 1, although a notation method differs depending on to which structure the first heat exchange channel 110 or the second heat exchange channel 120 corresponds between the single channel structure and the branch channel structure, the notation method may be changed. For example, an independent channel heat exchange area in which the first heat exchange channel 110 or the second heat exchange channel 120 independently performs heat exchange may be represented as the area 1S or 2S without distinguishing a specific channel structure. Also, an interlocked heat exchange area in which the first heat exchange channel 110 and the second heat exchange channel 120 perform heat exchange through interlocking may be represented as the area IK without distinguishing a specific channel structure.

Example embodiments shown in Table 1 are provided as examples only and the present disclosure is not limited thereto. For example, although two heat exchange channels are used in Table 1, at least three heat exchange channels may be included in the heat exchange channel construction, as shown in FIG. 9.

Figure 15:
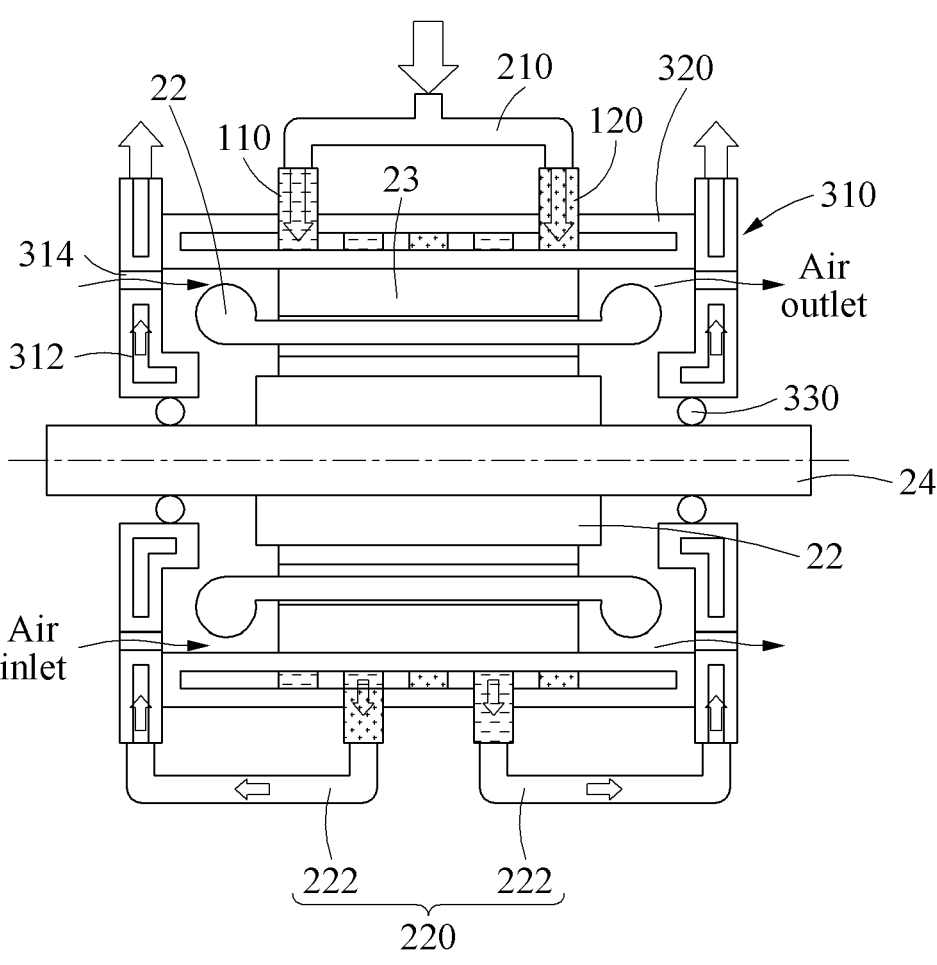
FIG. 15 illustrates a heat exchanger according to still another example embodiment.
Figure 16:
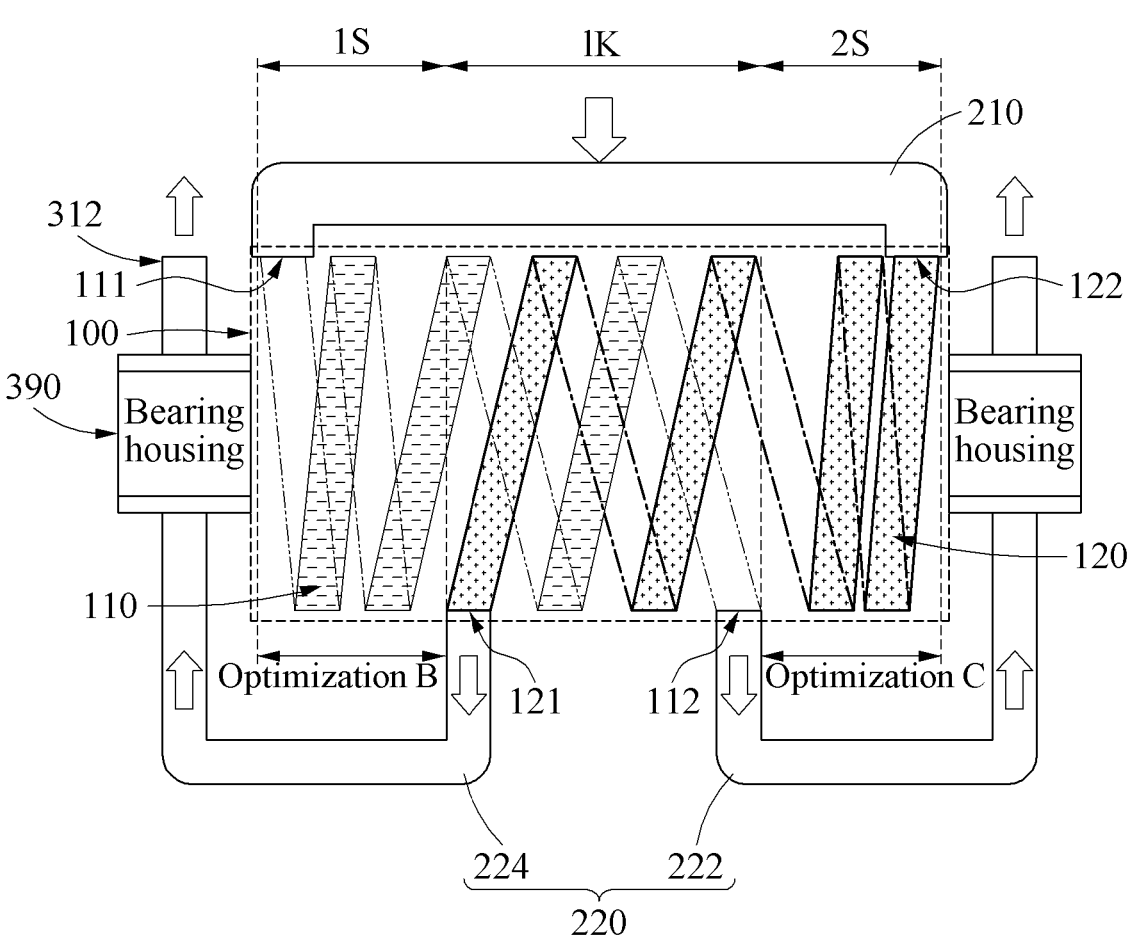
FIG. 16 is a schematic view illustrating a heat exchange principle of a heat exchanger by omitting an electric motor in a structure of FIG. 15.
Figure 17:
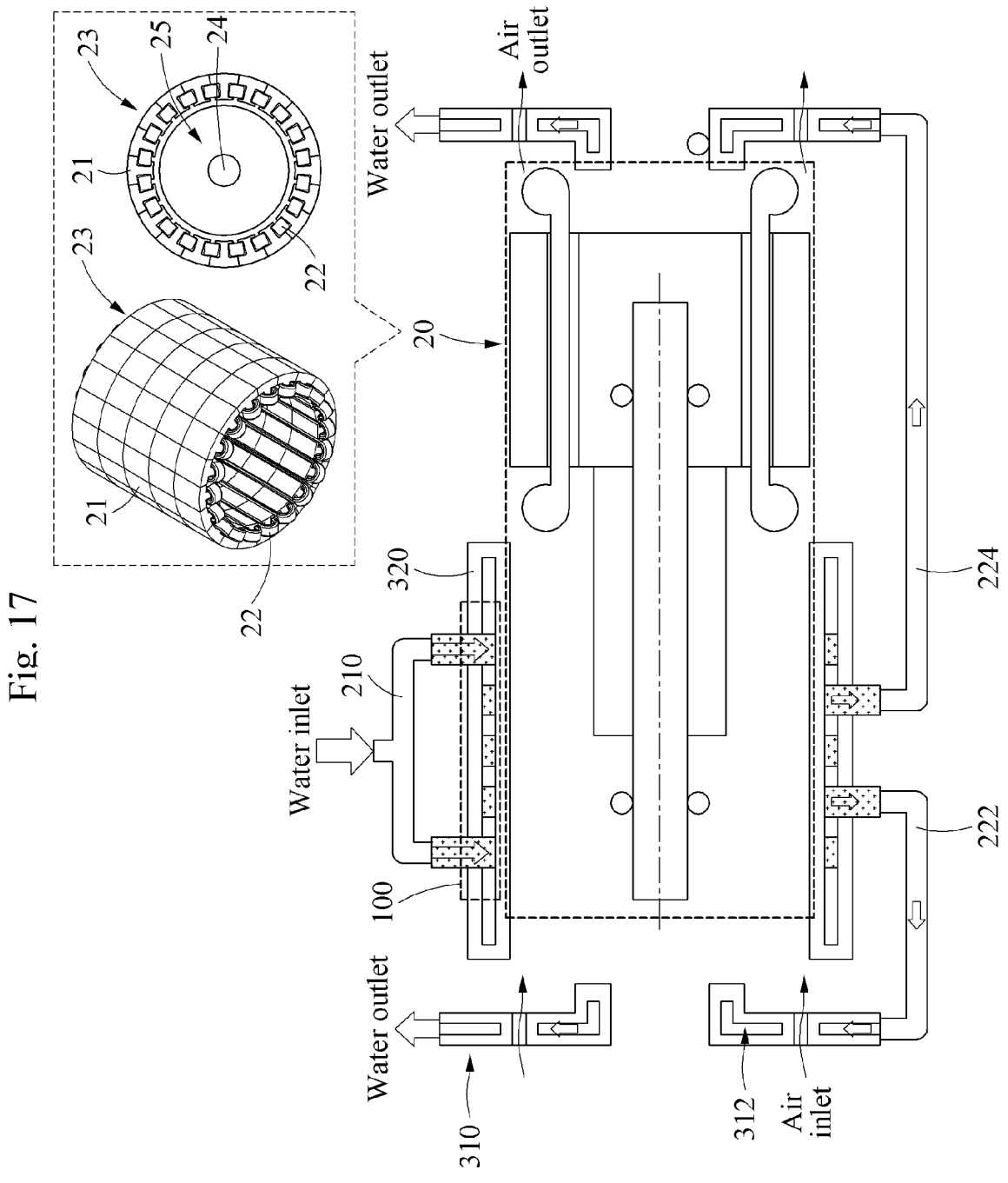
FIG. 17 is an exploded view of the structure of FIG. 15.

FIG. 15 illustrates a heat exchanger according to still another example embodiment. FIG. 16 is a schematic view illustrating a heat exchange principle of a heat exchanger by omitting an electric motor in a structure of FIG. 15. FIG. 17 is an exploded view of the structure of FIG. 15.

Referring to FIGS. 15 to 17, the apparatus 20 that is a heat exchange target may be received in an internal space defined by a cover 310 and a housing 320. The heat exchange channel construction 100 may include the first and second heat exchange channels 110 and 120 each formed in a spiral structure in the internal space of the housing 320. Each of the first heat exchange channel 110 and the second heat exchange channel 120 may be installed in the internal space of the housing 320 and may move a heat transfer medium while forming a spiral shape. The first heat exchange channel 110 and the second heat exchange channel 120 may perform heat exchange with the outer circumferential surface of the stator unit 23 of the apparatus 20 that faces the inner circumferential surface of the housing 320. Also, the first heat exchange channel 110 and the second heat exchange channel 120 may perform heat exchange with an end wiring of the coiler portion 22 through a charged heat dissipation material.

Referring to FIG. 15, the cover 310 may include a surface perpendicular to the rotation shaft 24 of the apparatus 20. A bearing housing 390 for installing a bearing 330 and the rotation shaft 24 may be formed at the center of the cover 310. The bearing 330 may stably maintain a position of the rotation shaft 24 in the bearing housing 390 when the rotation shaft 24 rotates and may reduce a friction loss that occurs due to rotation.

Referring to FIGS. 15 and 17, a chamber space built with the stator unit 23 and the rotator unit 25 of the apparatus 20 may be provided by the cover 310, the housing 320, and the bearing housing 390. In a state in which the stator unit 23 and the rotator unit 25 are built, a free space of a chamber may be present in an area in which an end wiring of the coiler portion 22 is positioned. An air nozzle 314 may be formed in the cover 310 and heat exchange by convection may be performed through an air inlet and an air outlet using the chamber space through the air nozzle 314.

Referring to FIG. 16, the heat exchange channel construction 100 may include the first heat exchange channel 110 and the second heat exchange channel 120. The first heat exchange channel 110 and the second heat exchange channel 120 may form an area 1S, an area IK, and an area 2S. The heat exchanger may include a first link channel 210. The first link channel 210 may connect to the (1-1)-th port 111 of the first heat exchange channel 110 and the (2-2)-th port 122 of the second heat exchange channel 120. The heat transfer medium may be branched from the first link channel 210 and may flow into the first heat exchange channel 110 and the second heat exchange channel 120 through the (1-1)-th port 111 and the (2-2)-th port 122.

The heat exchanger may further include a second link channel 220. The second link channel 220 may include a (2-1)-th link channel 222 connected to a (1-2)-th port 112 and a (2-2)-th link channel 224 connected to a (2-1)-th port 121. The (2-1)-th link channel 222 may connect between the first heat exchange channel 110 and a cover channel 312, and the (2-2)-th link channel 224 may connect between the second heat exchange channel 120 and the cover channel 312.

According to the example embodiments of FIGS. 15 to 17, the heat transfer medium that flows into the heat exchange channel construction 100 may pass through the first heat exchange channel 110 and the second heat exchange channel 120 and then may perform heat exchange one more time in the cover channel 312 through the second link channel 220. Through this, a heat exchange area may increase and heat exchange may be performed even on the surface perpendicular to the rotation shaft 24 of the apparatus 20, which may lead to enhancing the heat exchange efficiency.

Figure 18:
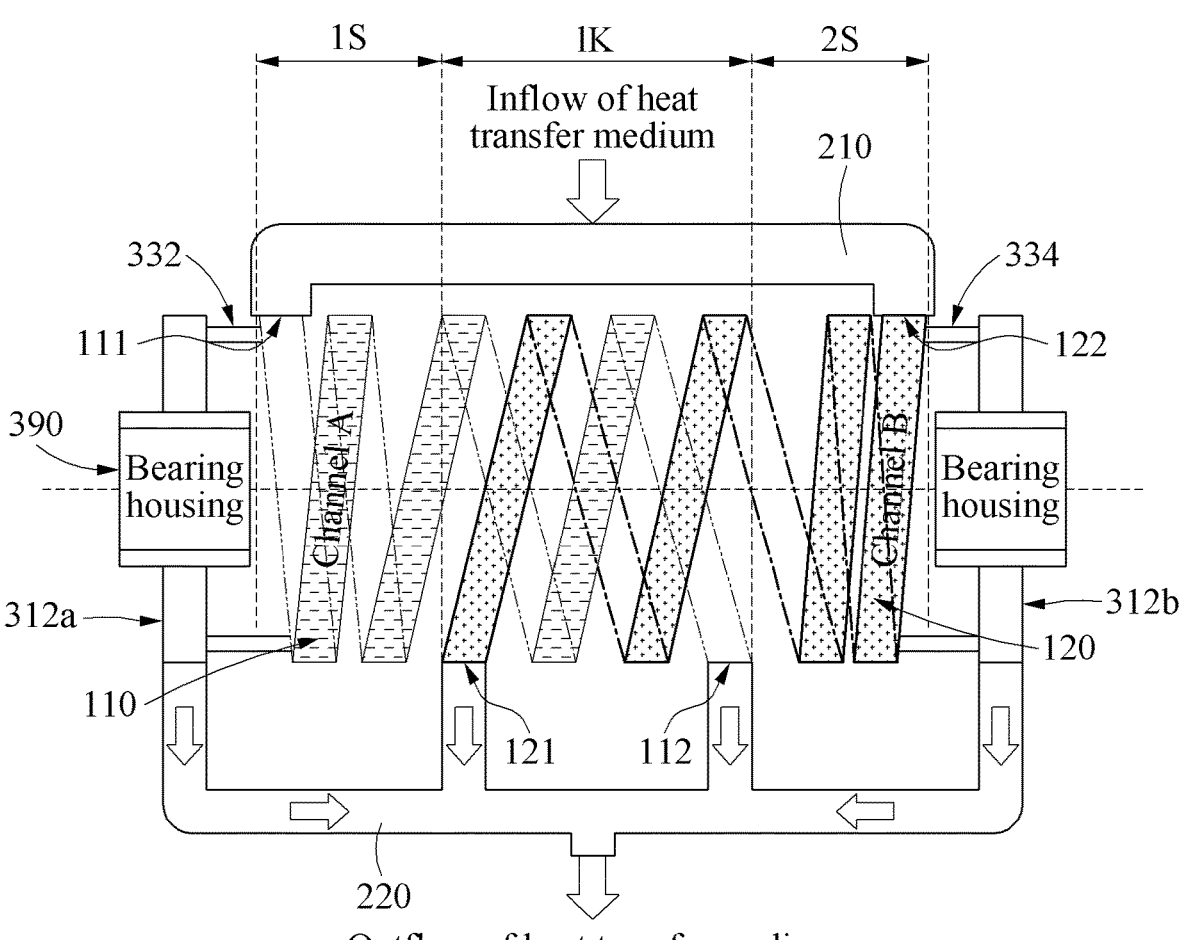
FIG. 18 is a schematic view illustrating a structure of a heat exchanger according to still another example embodiment.

FIG. 18 is a schematic view illustrating a structure of a heat exchanger according to still another example embodiment. Repetitive description made above with reference to FIGS. 16 to 17 is omitted in describing the example embodiment of FIG. 18.

Referring to FIG. 18, a portion of the heat transfer medium flowing into the (1-1)-th port 111 may flow into a first cover channel 312$a$ formed in the cover 310 through a first radiation channel 332. The first radiation channel 332 may connect between an area 1S and the first cover channel 312$a$. A portion of the heat transfer medium of the first heat exchange channel 110 may be discharged to the (1-2)-th port 112 and a remaining portion may flow into the first cover channel 312$a$ through the first radiation channel 332. To this end, a cross-sectional area of the first radiation channel 332 may be less than or equal to that of the first heat exchange channel 110. Here, the cross-sectional area may represent an area of a cross-section through which the heat exchange medium passes in a corresponding channel. The first radiation channel 332 may include a plurality of channels. When a radiation channel includes a plurality of channels, the channels that constitute the radiation channel may be aligned in a radial direction. The cross-sectional area of the first radiation channel 332 may represent a sum of cross-sectional areas of the plurality of channels that constitutes the first radiation channel 332. Since the cross-sectional area of the first radiation channel 332 is less than or equal to that of the first heat exchange channel 110, a flow rate of the heat transfer medium that passes through the first radiation channel 332 may be less than a flow rate of the heat transfer medium flowing into the first heat exchange channel 110. Therefore, a portion of the heat transfer medium flowing into the first heat exchange channel 110 may proceed in the (1-2)-th port 112.

A portion of the heat transfer medium flowing into the (2-2)-th port 122 may flow into a second cover channel 312$b$ through a second radiation channel 334. The second radiation channel 334 may connect between an area 2S and the second cover channel 312$b$. A portion of the heat transfer medium of the second heat exchange channel 120 may be discharged to the (2-1)-th port 121 and a remaining portion thereof may flow into the cover channel 312 through the second radiation channel 334. To this end, a cross-sectional area of the second radiation channel 334 may be less than or equal to that of the second heat exchange channel 120. A portion of the heat transfer medium flowing into the second heat exchange channel 120 may proceed in a direction toward the (2-2)-th port 122 and a remaining portion thereof may proceed in a direction toward the second cover channel 312$b$.

The heat exchanger may include first and second cover channels 312$a$ and 312$b$ and the second link channel 220 connected to the (1-2)-th port 112 and the (2-1)-th port 121. The heat transfer medium discharged from the (1-2)-th port 112, the (2-1)-th port 121, and the first and second cover channels 312$a$ and 312$b$ may be discharged to an outside through the second link channel 220.

Referring to FIG. 18, a portion of the heat transfer medium flowing into the heat exchange channel construction 100 may move inside the heat exchange channel construction 100 (i.e., the first and second heat exchange channels 110 and 120) and a remaining portion thereof may move to the first and second cover channels 312$a$ and 312$b$ through the first and second radiation channels 332 and 334, respectively, thereby performing heat exchange in the first and second cover channels 312$a$ and 312$b$. Through this, compared to a case of FIGS. 15 to 17, the heat transfer medium having a relatively low temperature may flow into the first and second cover channels 312$a$ and 312$b$ and may perform heat exchange.

Figure 19:
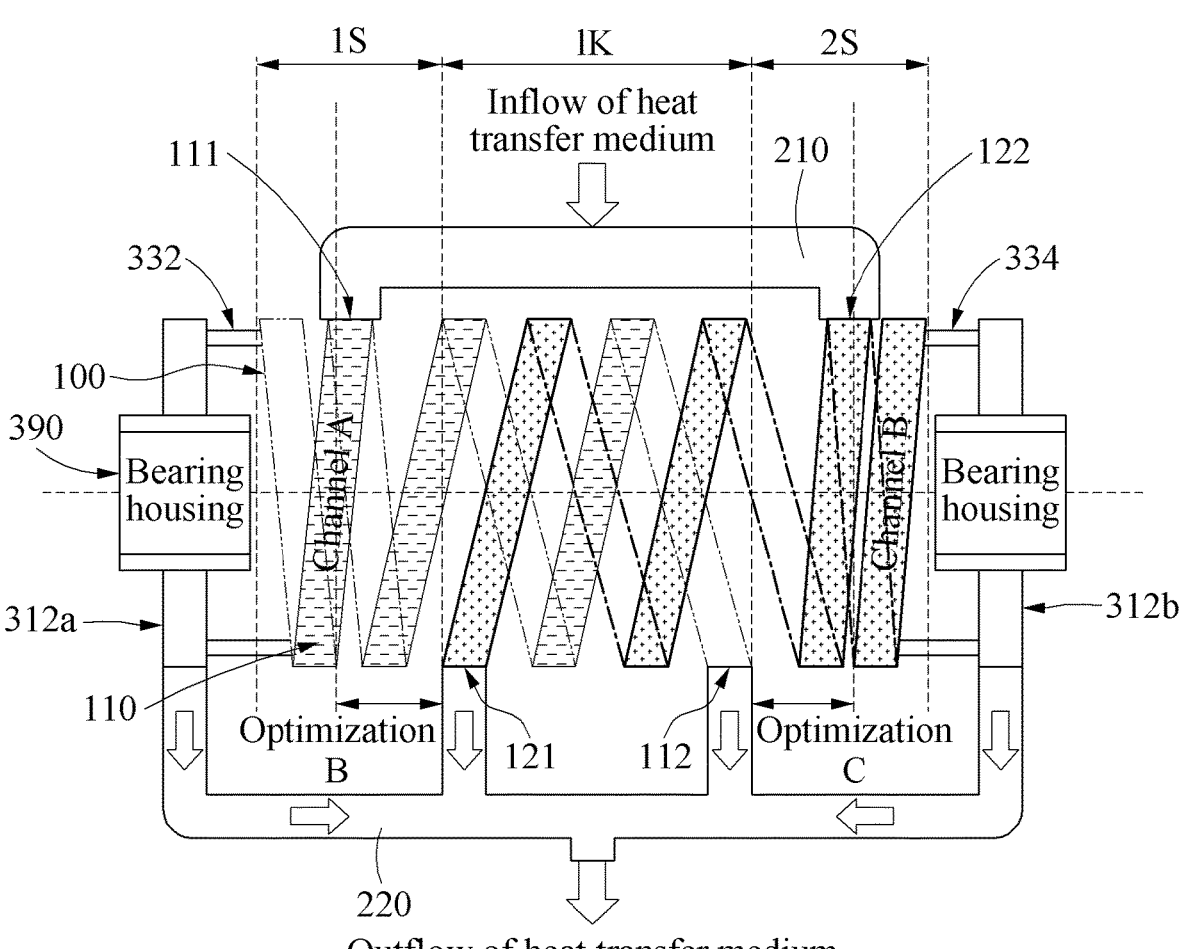
FIG. 19 illustrates a heat exchanger according to still another example embodiment.
Figure 20A:
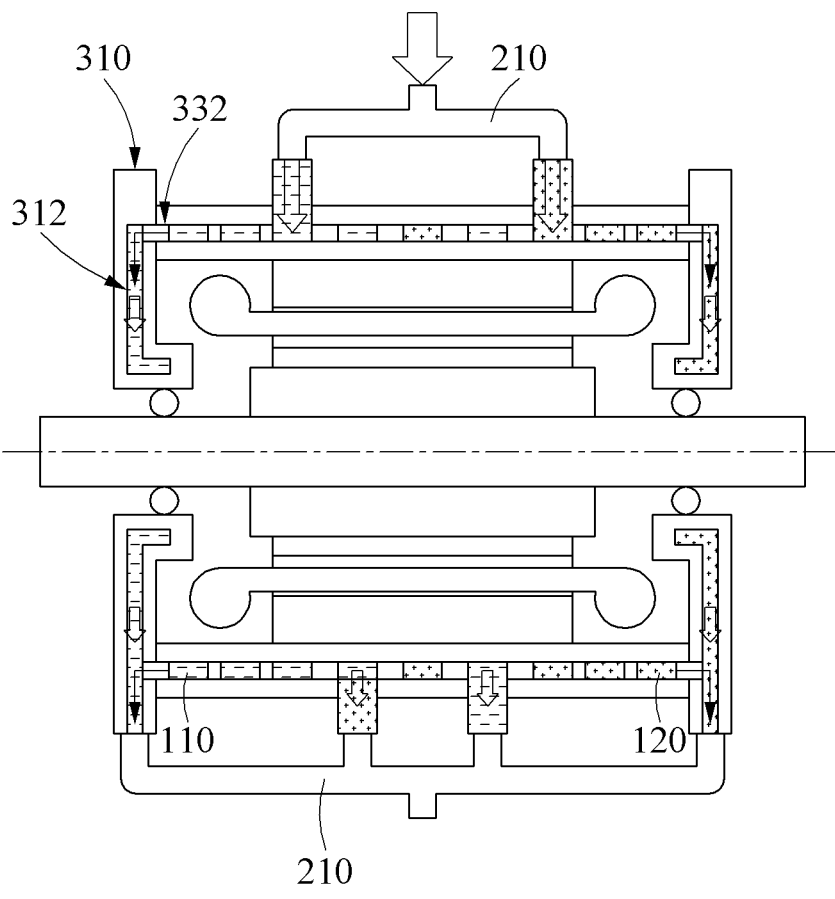
FIGS. 20A and 20B illustrate an example of further describing the example embodiment of FIG. 19.
Figure 20B:
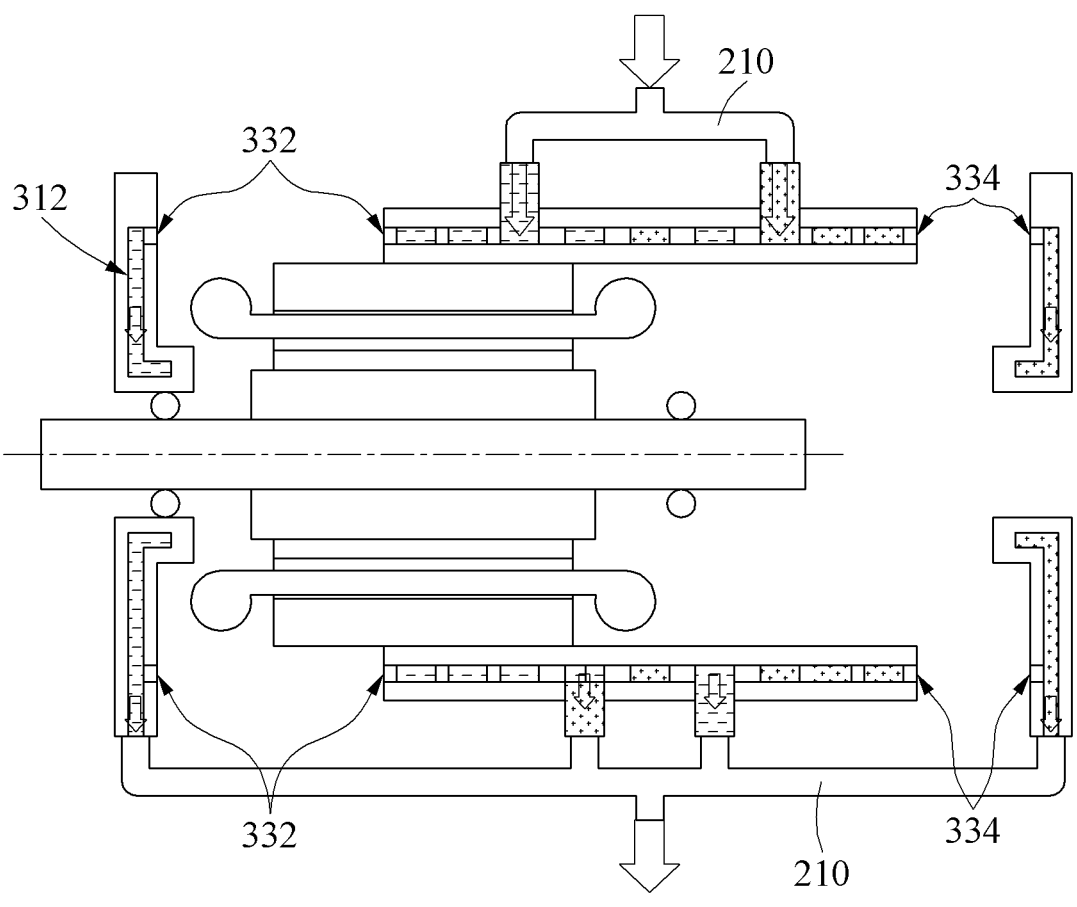

FIG. 19 illustrates a heat exchanger according to still another example embodiment. FIGS. 20A and 20B illustrate an example of further describing the example embodiment of FIG. 19. Repetitive description made above with reference to FIGS. 15 to 17 is omitted in describing the example embodiment of FIGS. 19, 20A, and 20B.

Referring to FIGS. 19, 20A, and 20B, the (1-1)-th port 111 may be formed in the middle of the area 1S instead of being formed at an end of the area 1S. Therefore, the first heat exchange channel 110 may include an area in which a heat transfer medium proceeds in a first direction (to the right) and an area in which the heat transfer medium proceeds in a second direction (to the left). In the middle of the first heat exchange channel 110, the heat transfer medium may proceed in the second direction in an area on the left of the (1-1)-th port 111 and the heat transfer medium may proceed in the first direction on the right of the (1-1)-th port 111.

Also, the (2-2)-th port 122 may be formed in the middle of the area 2S instead of being formed at an end of the area 2S. In the middle of the second heat exchange channel 120, the heat transfer medium may proceed in the second direction in an area on the left of the (2-2)-th port 122 and the heat transfer medium may proceed in the first direction on the right of the (2-2)-th port 122.

In general, when the heat transfer medium proceeds in one direction, a temperature of the heat transfer medium may increase according to proceeding of the heat transfer medium, which may lead to slightly degrading the heat transfer performance. In contrast, referring to FIGS. 19, 20A, and 20B, in the case of forming the (1-1)-th port 111 and the (2-2)-th port 122 in areas present in the middle of the first heat exchange channel 110 and the second heat exchange channel 120, respectively, the heat transfer mediums flowing into the (1-1)-th port 111 and the (2-2)-th port 122 may be branched and proceed in different directions. A heat characteristic of the heat exchanger may be adjusted by adjusting positions of the (1-1)-th port 111 and the (2-2)-th port 122.

Figure 21:
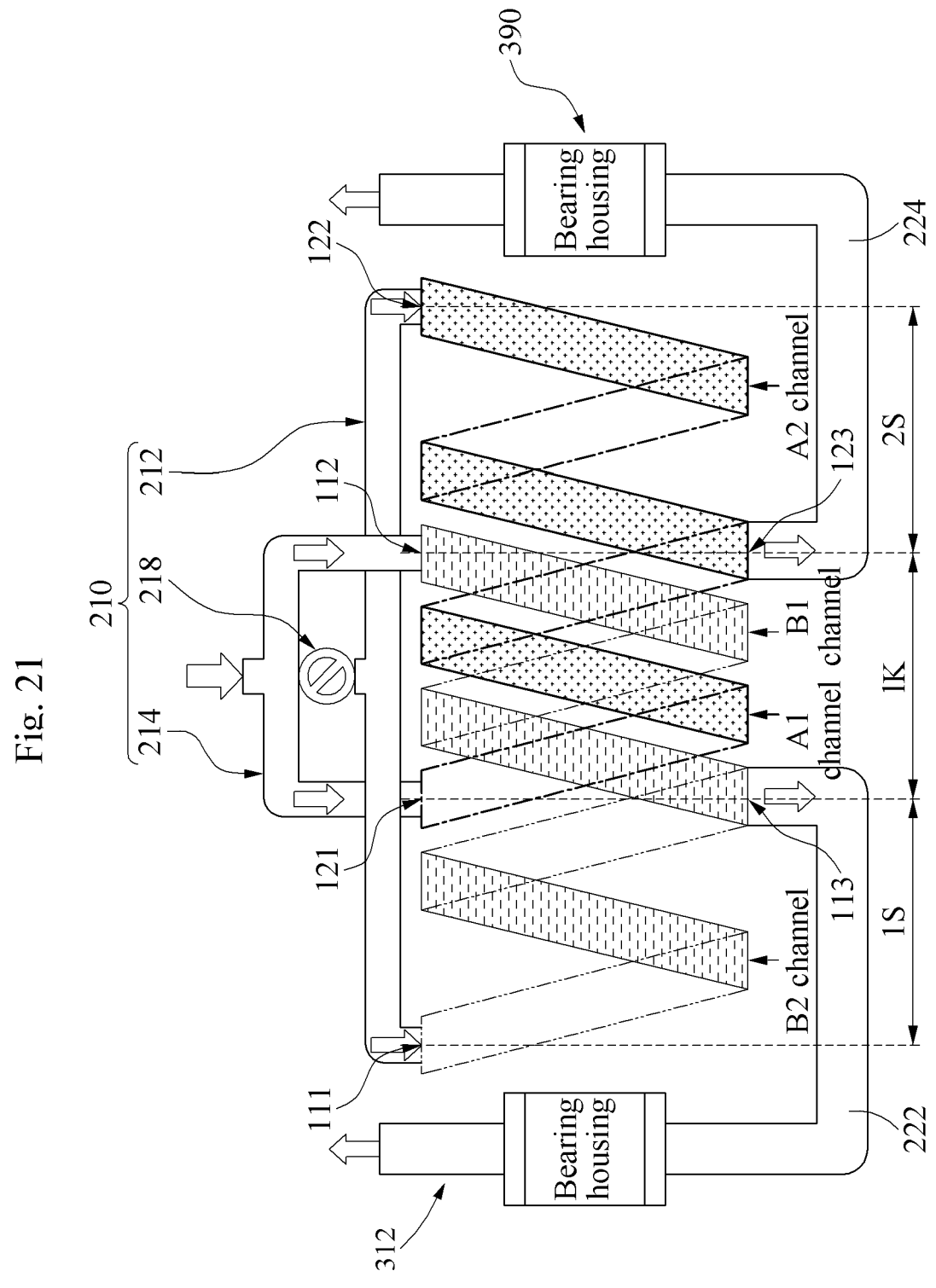
FIG. 21 is a schematic view illustrating a structure of a heat exchanger according to still another example embodiment.

FIG. 21 is a schematic view illustrating a structure of a heat exchanger according to still another example embodiment. Repeated description is omitted in describing the example embodiment of FIG. 21.

Referring to FIG. 21, compared to the example embodiment of FIG. 18, the first link channel 210 may include a (1-1)-th link channel 212, a (1-2)-th link channel 214, and a flow branch controller 218. The flow branch controller 218 may control a transfer flow rate of a heat transfer medium between the (1-1)-th link channel 212 and the (1-2)-th link channel 214. A flow rate of the heat transfer medium transferred by each of the (1-1)-th link channel 212 and the (1-2)-th link channel 214 may be adjusted using the flow branch controller 218. The heat exchanger may allow a different heat transfer characteristic or temperature characteristic to appear for each area of the heat exchange channel construction 100 using the flow branch controller 218. For example, when a heat bias phenomenon is present in a central area of the heat exchange channel construction 100, the heat exchanger may resolve the heat bias phenomenon by decreasing an amount of the heat transfer medium that flows into the (1-1)-th link channel 212 and by increasing an amount of the heat transfer medium that flows into the (1-2)-th link channel 214. When the heat bias phenomenon is present in an edge area of the heat exchange channel construction 100, the heat exchanger may resolve the heat bias phenomenon by decreasing an amount of the heat transfer medium that flows into the (1-2)-th link channel 214 and by increasing an amount of the heat transfer medium that flows into the (1-1)-th link channel 212.

The heat transfer medium flowing through the (1-1)-th port 111 and the (1-2)-th port 112 may be discharged through a (1-3)-th port 113. In the first heat exchange channel 110, the heat transfer medium may proceed in the first direction (to the right) between the (1-1)-th port 111 and the (1-3)-th port 113 and the heat transfer medium may proceed in the second direction (to the left) between the (1-3)-th port 113 and the (1-2)-th port 112.

The heat transfer medium flowing through the (2-1)-th port 121 and (2-2)-th port 122 may be discharged through a (2-3)-th port 123. In the second heat exchange channel 120, the heat transfer medium may proceed in the second direction (to the left) between the (2-2)-th port 122 and the (2-3)-th port 123 and the heat transfer medium may proceed in the first direction (to the right) between the (2-3)-th port 123 and the (2-1)-th port 121.

However, they are provided as examples only and the present disclosure is not limited thereto. For example, a flow direction of the heat transfer medium may be opposite to the aforementioned flow direction. As described above, a heat exchange temperature characteristic of the heat exchange channel construction 100 may be easily changed by increasing a number of ports through which the heat transfer medium enters and exists and by controlling a flow rate between a plurality of link channels using the flow branch controller 218.

The heat exchanger shown in FIG. 21 may further include a first radiation channel (not shown) and a second radiation channel. The first radiation channel (not shown) may connect between the area 1S and the first cover channel 312*a* and the second radiation channel (not shown) may connect between the area 2S and a second cover channel 312*b*. A cross-sectional area of the first radiation channel (not shown) may be less than that of the first heat exchange channel 110. A cross-sectional area of the second radiation channel (not shown) may be less than that of the second heat exchange channel 120.

Figure 22:
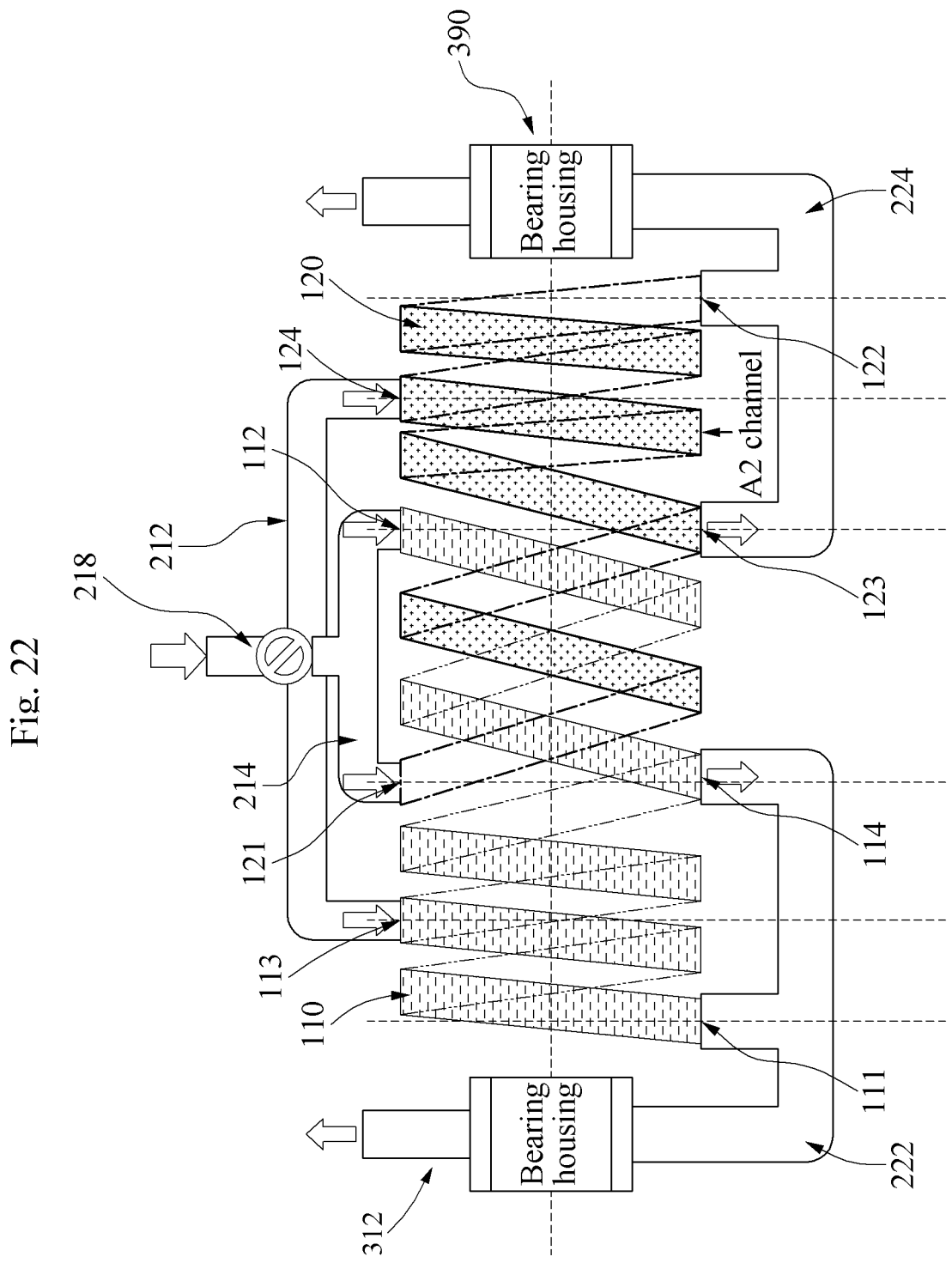
FIG. 22 is a schematic view illustrating a structure of a heat exchanger according to still another example embodiment.

FIG. 22 is a schematic view illustrating a structure of a heat exchanger according to still another example embodiment. Repeated description is omitted in describing the example embodiment of FIG. 22.

Referring to FIG. 22, the heat exchanger may include the heat exchange channel construction 100, the (1-1)-th link channel 212, the (1-2)-th link channel 214, the flow branch controller 218, the (2-1)-th link channel 222, and the (2-2)-th link channel 224.

The (1-3)-th port 113 may be provided not at an end but in the middle of the first heat exchange channel 110. Therefore, the heat transfer medium flowing into the (1-3)-th port 113 may be discharged to the (1-4)-th port 114 and the (1-1)-th port 111. The heat transfer medium flowing into the (1-2)-th port 112 may be discharged to the (1-4)-th port 114. The heat transfer medium may proceed in the second direction (to the left) between the (1-1)-th port 111 and the (1-3)-th port 113, the heat transfer medium may proceed in the first direction (to the right) between the (1-3)-th port 113 and the (1-4)-th port 114, and the heat transfer medium may proceed in the second direction between the (1-4)-th port 114 and the (1-2)-th port 112.

A (2-4)-th port 124 may be provided not at an end but in the middle of the second heat exchange channel 120. Therefore, the heat transfer medium flowing into the (2-4)-th port 124 may be discharged to the (2-3)-th port 123 and the (2-2)-th port 122. The heat transfer medium flowing into the (2-1)-th port 121 may be discharged to the (2-3)-th port 123. The heat transfer medium may proceed in the first direction (to the right) between the (2-2)-th port 122 and the (2-4)-th port 124, the heat transfer medium may proceed in the second direction between the (2-4)-th port 124 and the (2-3)-th port 123, and the heat transfer medium may proceed in the first direction between the (2-3)-th port 123 and the (2-1)-th port 121.

The (2-1)-th link channel 222 may be connected to the (1-4)-th port 114 and the (1-1)-th port 111 and may transfer the heat transfer medium discharged from the (1-4) port 114 and the (1-1)-th port 111 to the cover channel 312. The (2-2)-th link channel 224 may be connected to the (2-3)-th port 123 and the (2-2)-th port 122 and may transfer the heat transfer medium discharged from the (2-3)-th port 123 and the (2-2) port 122 to the cover channel 312.

The heat exchanger shown in FIG. 22 may further include a first radiation channel (not shown) and a second radiation channel. The first radiation channel (not shown) may connect between the area 1S and the cover channel 312 and the second radiation channel (not shown) may connect between the area 2S and the cover channel 312. A cross-sectional area of the first radiation channel (not shown) may be less than that of the first heat exchange channel 110. A cross-sectional area of the second radiation channel (not shown) may be less than that of the second heat exchange channel 120.

Figure 23:
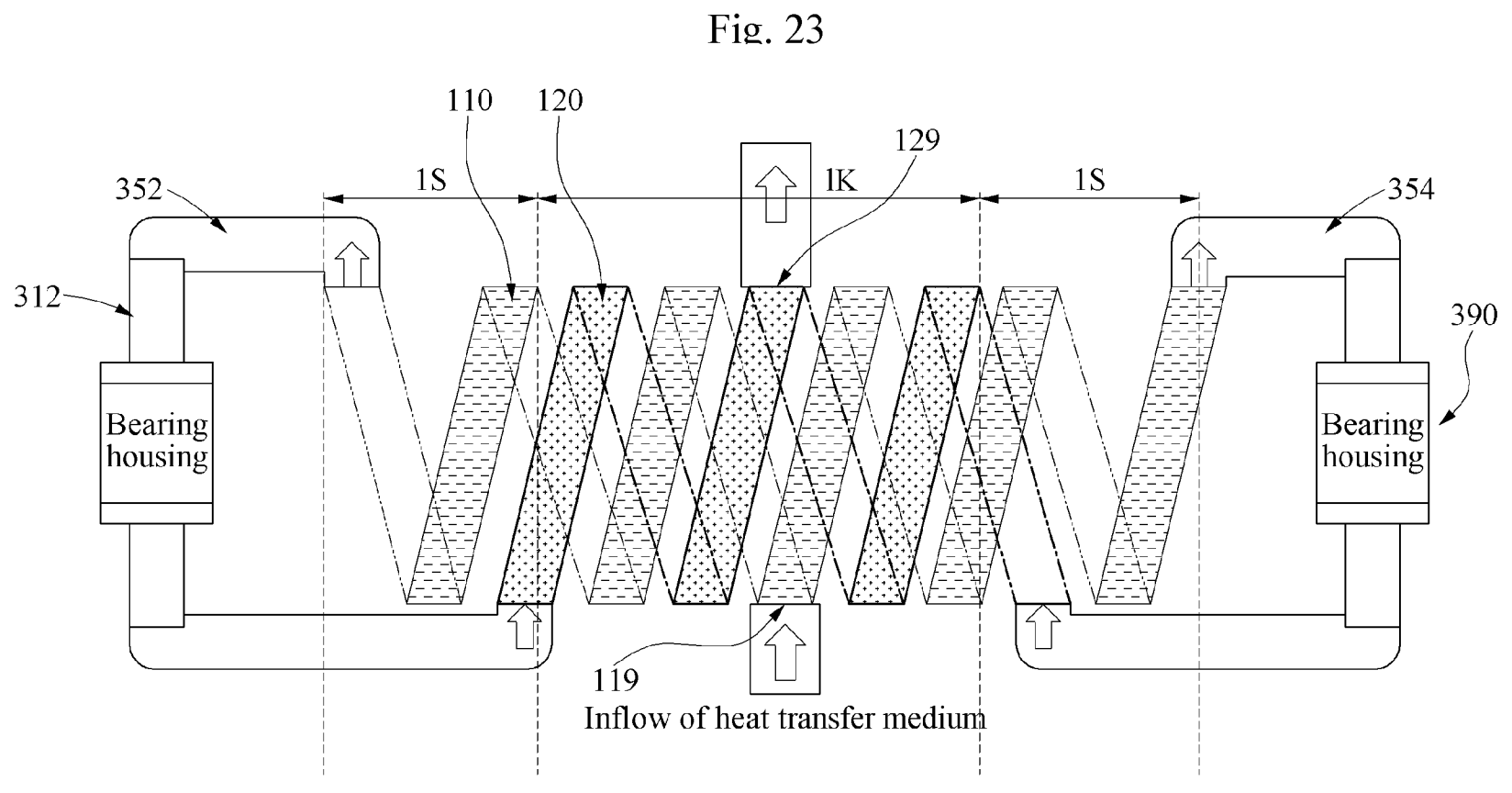

FIG. 23 illustrates a heat exchanger according to still another example embodiment.

Referring to FIG. 23, one end of the first heat exchange channel 110 and one end of the second heat exchange channel 120 may communicate through a first connection link channel 352. The other end of the first heat exchange channel 110 and the other end of the second heat exchange channel 120 may communicate through a second connection link channel 354. The heat transfer medium may flow into a port 119 formed at the center of the first heat exchange channel 110. The heat transfer medium flowing through the port 119 may be transferred to both ends of the first heat exchange channel 110. The heat transfer medium transferred to both ends of the first heat exchange channel 110 may flow into both ends of the second heat exchange channel 120 through the first and second connection link channels 352 and 354. In this process, the heat transfer medium may pass through the cover channel 312. The heat transfer medium flowing into both ends of the second heat exchange channel 120 may be discharged through a port 129 formed at the center of the second heat exchange channel 120. According to the example embodiment of FIG. 23, in the first heat exchange channel 110, the heat transfer medium may proceed from the port 119 present at the center of the first heat exchange channel 110 to both ends of the first heat exchange channel 110. In the second heat exchange channel 120, the heat transfer medium may proceed from both ends of the second heat exchange channel 120 to the port 129 present at the center of the second heat exchange channel 120. Therefore, in an interlocked heat exchange area IK, the heat transfer mediums of the first and second heat exchange channels 110 and 120 may flow in opposite directions.

Although FIG. 23 describes an example in which the heat transfer medium flows into the first heat exchange channel 110 and then is transferred to the second heat exchange channel 120 through the cover channel 312, it is provided as an example only. For example, the heat transfer medium may flow into the second heat exchange channel 120 and then flow into the first heat exchange channel 110 by going through the cover channel 312.

Figure 24:
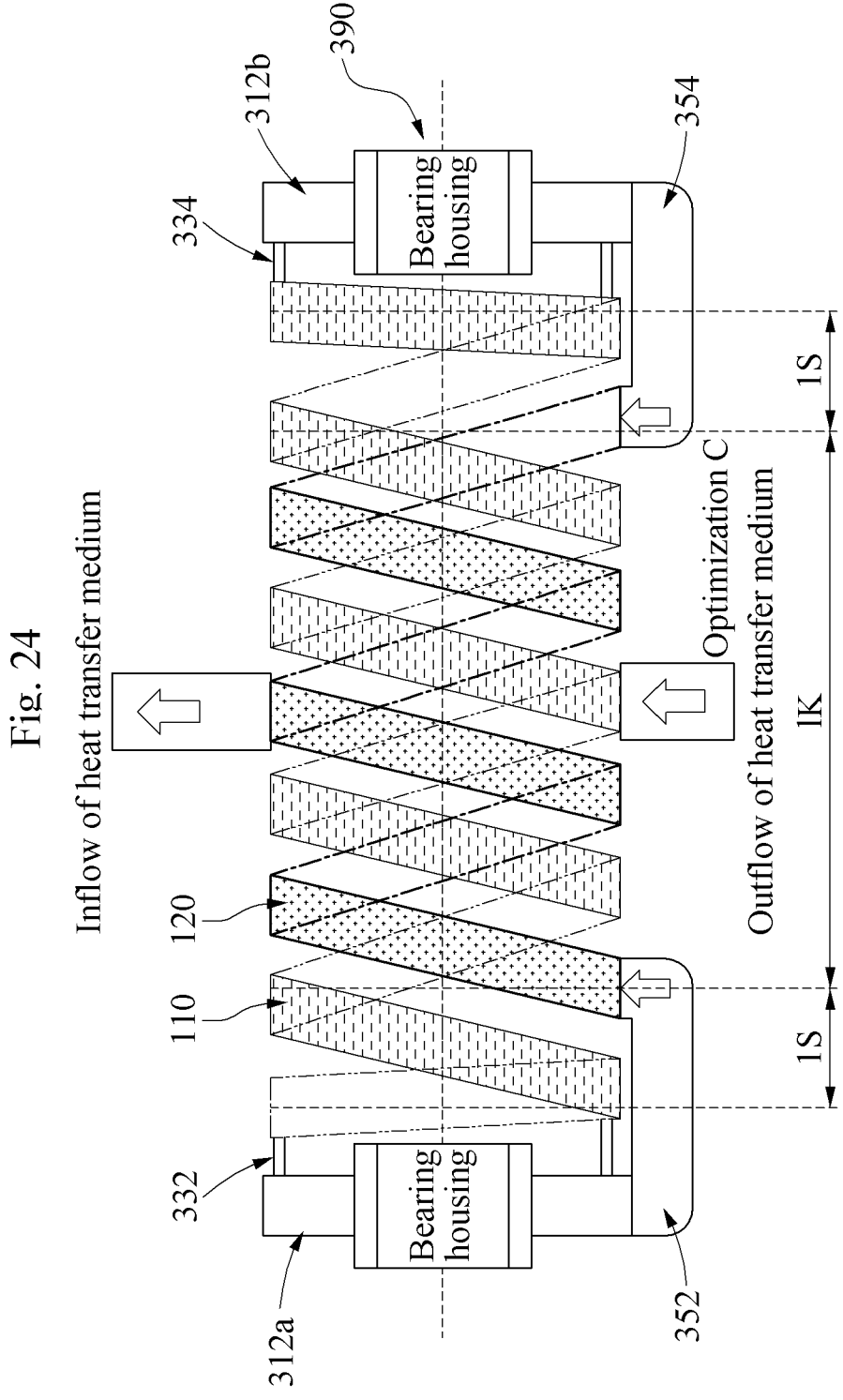
FIG. 24 is a schematic view illustrating a structure of a heat exchanger according to still another example embodiment.

FIG. 24 is a schematic view illustrating a structure of a heat exchanger according to still another example embodiment. Repeated description is omitted in describing the example embodiment of FIG. 24.

Referring to FIG. 24, the heat exchange channel construction 100 may include an area IK and areas 1S provided at both ends of the area IK. The areas 1S may be connected to the first and second cover channels 312a and 312b through the first radiation channel 332 and the second radiation channel 334, respectively. In the example embodiment of FIG. 24, the entire heat transfer medium flowing into the first heat exchange channel 110 needs to move to the first and second cover channels 312a and 312b. Therefore, a cross-sectional area of the first radiation channel 332 and a cross-sectional area of the second radiation channel 334 may be greater than or equal to that of the first heat exchange channel 110. Likewise, the cross-sectional area of the first radiation channel 332 and the cross-sectional area of the second radiation channel 334 may be greater than or equal to that of the second heat exchange channel 120.

Figure 25:
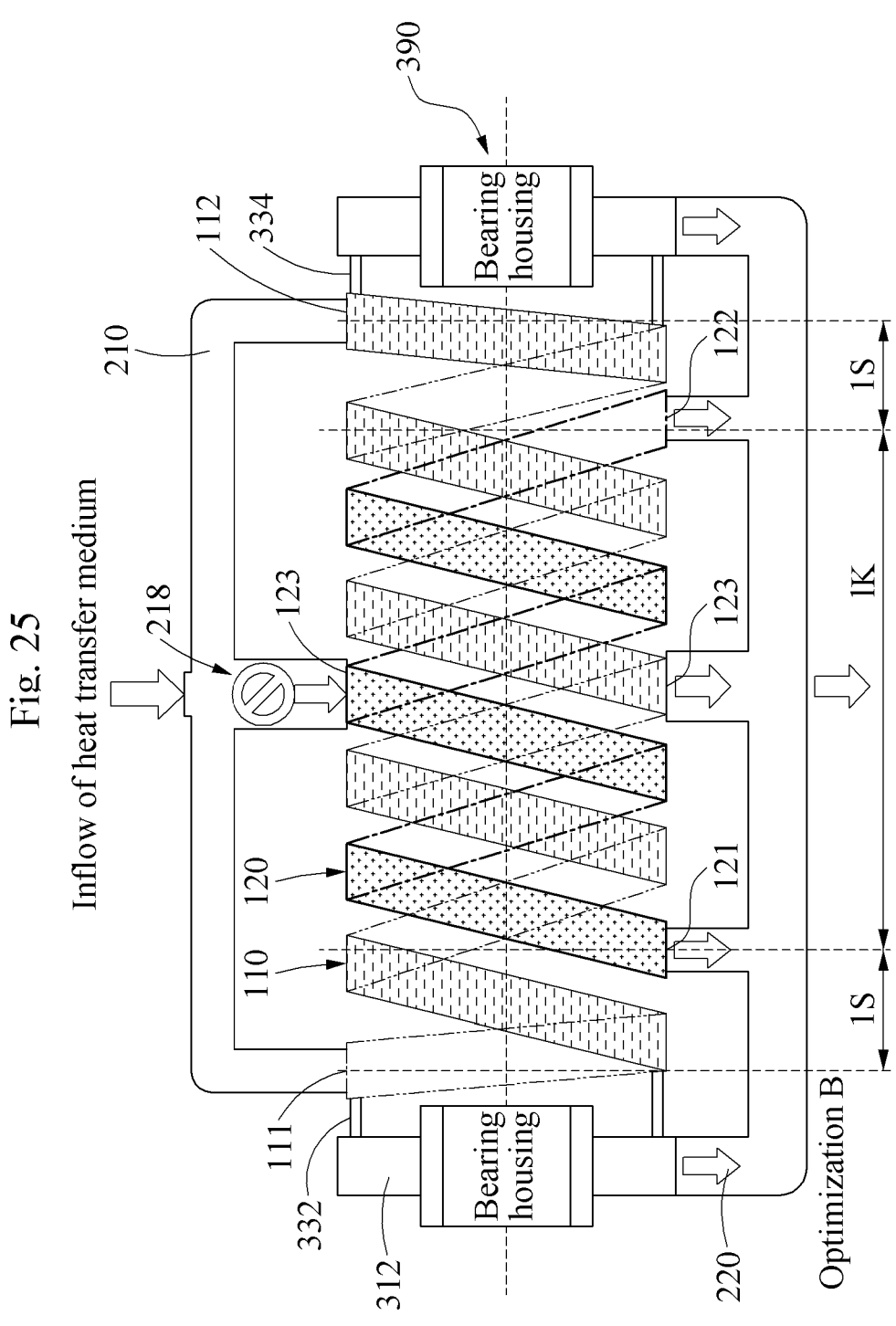
FIG. 25 is a schematic view illustrating a structure of a heat exchanger according to still another example embodiment.

FIG. 25 is a schematic view illustrating a structure of a heat exchanger according to still another example embodiment.

Referring to FIG. 25, the heat exchanger may include the first link channel 210, the flow branch controller 218, the second link channel 220, the first radiation channel 332, and the second radiation channel 334. Areas 1S may be connected to the cover channel 312 through the first radiation channel 332 and the second radiation channel 334, respectively. A portion of the heat transfer medium flowing into the first heat exchange channel 110 may flow into the cover channel 312 and another portion thereof may move to the second link channel 220. Therefore, each of a cross-sectional area of the first radiation channel 332 and a cross-sectional area of the second radiation channel 334 may be less than or equal to that of the first heat exchange channel 110.

An indirect cooling method in which the heat transfer medium is not in direct contact with the apparatus 20 that is a heat transfer target is described with reference to FIGS. 15 to 25. However, it is provided as an example only. Hereinafter, a direct cooling method in which the heat transfer medium is in direct contact with the apparatus 20 that is a heat transfer target in at least a portion of the heat exchanger is described.

Figure 26A:
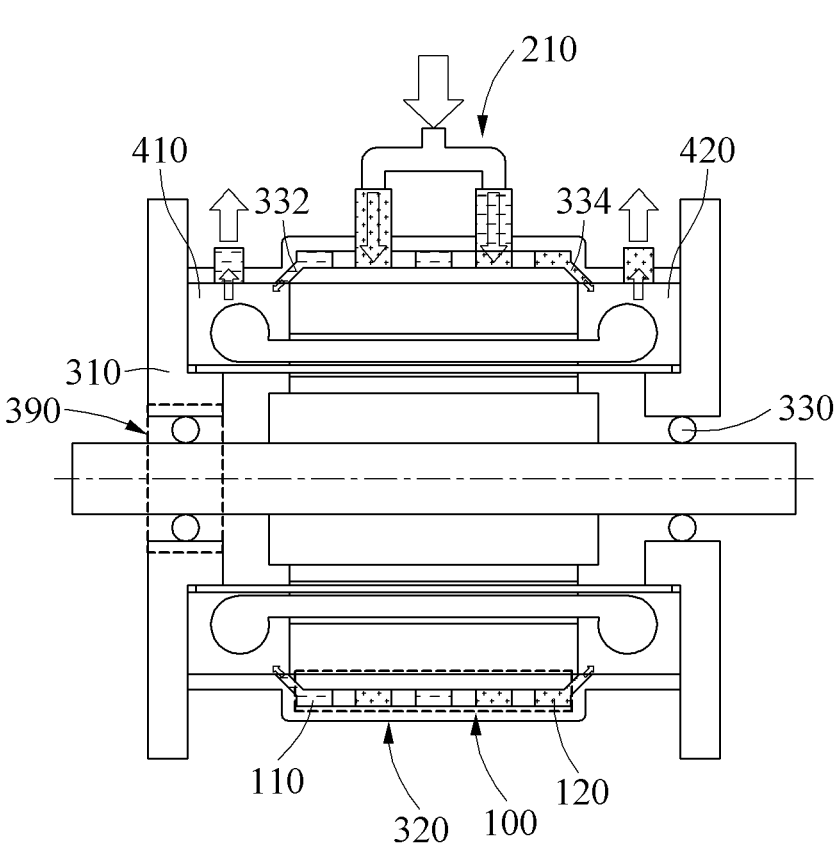
FIG. 26A is a cross-sectional view illustrating a configuration of a heat exchanger and FIG. 26B is an exploded cross-sectional view illustrating a configuration of a heat exchanger according to still another example embodiment.
Figure 26B:
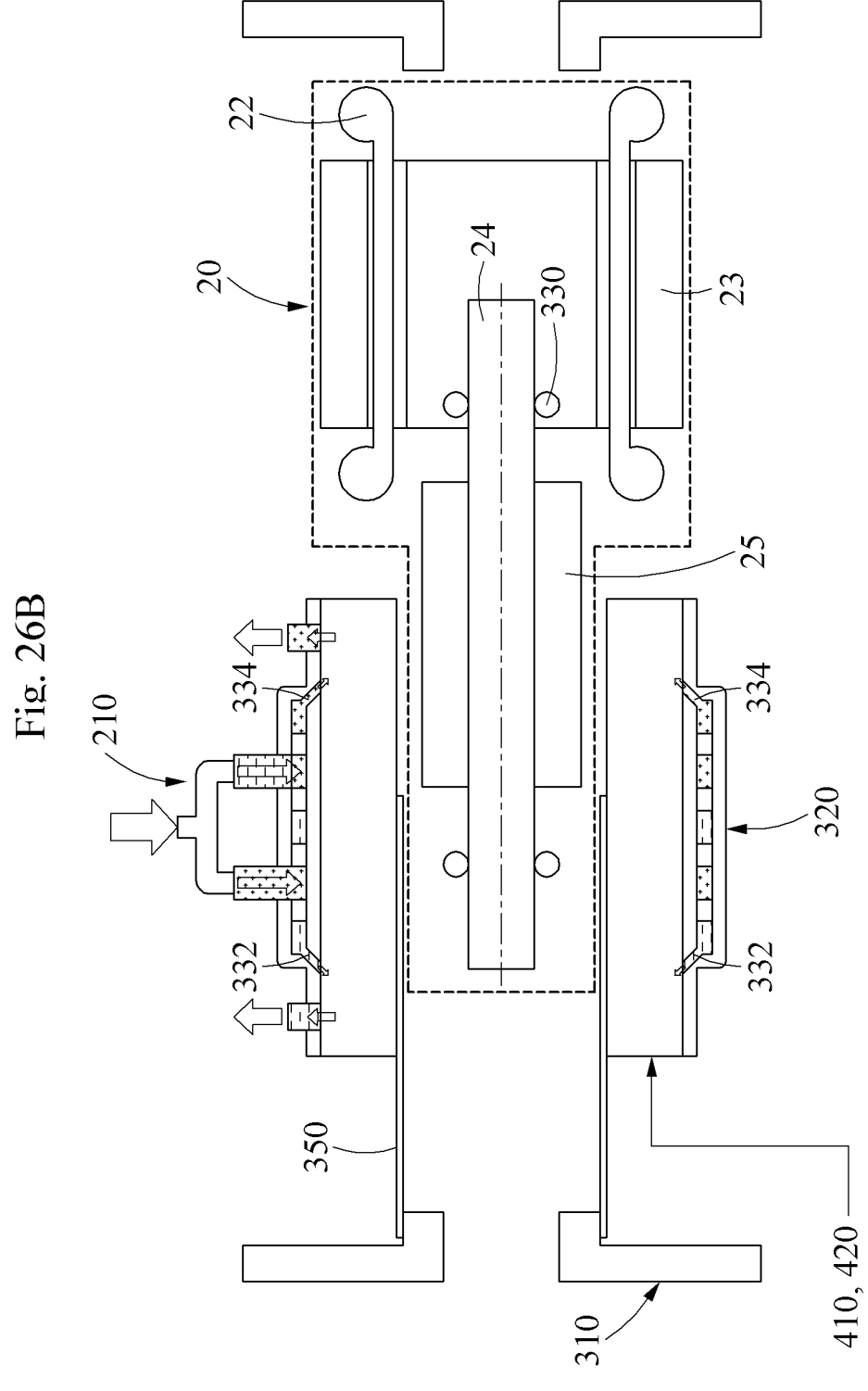

FIG. 26A is a cross-sectional view illustrating a configuration of a heat exchanger and FIG. 26B is an exploded cross-sectional view illustrating a configuration of a heat exchanger according to still another example embodiment.

Referring to FIGS. 26A and 26B, the heat exchanger may include the heat exchange channel construction 100 configured to form a heat exchange area and perform heat exchange with the apparatus 20 through flow of the heat transfer medium and immersion chambers 410 and 420 configured to directly perform heat exchange with the apparatus 20. The apparatus 20 may include the stator unit 23 and the rotator unit 25 as a heat exchange target. As described above, although the apparatus 20 may include a motor, a generator, and the like, it is provided as an example only. Any type of apparatuses that include a stator unit and a rotator unit may be applied.

The apparatus 20 that includes the stator unit 23 and the rotator unit 25 may be received in an internal space defined by the cover 310 and the housing 320.

The cover 310 may include a surface perpendicular to the rotation shaft 24 of the apparatus 20. The bearing housing 390 for installing the bearing 330 and the rotation shaft 24 may be formed at the center of the cover 310. When the rotation shaft 24 rotates, the bearing 330 may stably maintain a position of the rotation shaft 24 in the bearing housing 390 and may reduce friction loss occurring due to the rotation.

The housing 320 may include a surface parallel to the rotation shaft 24 of the apparatus 20. The heat exchange channel construction 100 may be installed in the housing 320. The heat exchange channel construction 100 may include channels, for example, the first and second heat exchange channels 110 and 120, each in a spiral structure. The channels, for example, the first and second heat exchange channels 110 and 120, in the spiral structure may be interlocked in at least a portion of the heat exchange area of the heat exchange channel construction 100. The heat exchange channel construction 100 is further described below.

An internal separation wall 350 may be provided between the stator unit 23 and the rotator unit 25. The stator unit 23 and the rotator unit 25 may be spatially separated by the internal separation wall 350. Although the internal separation wall 350 may be in a cylindrical shape, it is provided as an example only. As another example, the internal separation wall 350 may be in a polygonal column shape. A chamber may be implemented using the cover 310, the housing 320, and the internal separation wall 350. After the stator unit 23 is built in the chamber, spaces remaining at both ends of the chamber may be filled with the heat transfer medium. That is, the first immersion chamber 410 and the second immersion chamber 420 may be formed at both ends of the chamber. In a state in which at least a portion (e.g., an end wiring) of the apparatus 20 is immersed into the heat transfer medium in the first immersion chamber 410 and the second immersion chamber 420, heat exchange may be performed.

The first immersion chamber 410 may be connected to the heat exchange channel construction 100 through the first radiation channel 332. The second immersion chamber 420 may be connected to the heat exchange channel construction 100 through the second radiation channel 334. The first radiation channel 332 may include a plurality of nozzles. Although FIGS. 26A and 26B illustrate an example in which the first radiation channel 332 includes an upper nozzle and a lower nozzle, it is provided as an example only. The first radiation channel 332 may include at least three nozzles. Likewise, the second radiation channel 334 may include a plurality of nozzles. The heat transfer medium between the heat exchange channel construction 100 and the first immersion chamber 410 may flow through the first radiation channel 332. The heat transfer medium between the heat exchange channel construction 100 and the second immersion chamber 420 may flow through the first radiation channel 334.

The heat transfer medium may be contained in the first immersion chamber 410 and the second immersion chamber 420. The heat transfer medium may include a non-conductive fluid such as oil. However, it is provided as an example only. The heat transfer medium contained in the first immersion chamber 410 and the second immersion chamber 420 may directly perform heat exchange in contact with an area that includes end wiring of the coiler portion 22. The heat transfer medium contained in the first immersion chamber 410 and the second immersion chamber 420 may directly perform heat exchange in contact with at least a portion of the apparatus 20.

Figure 27:
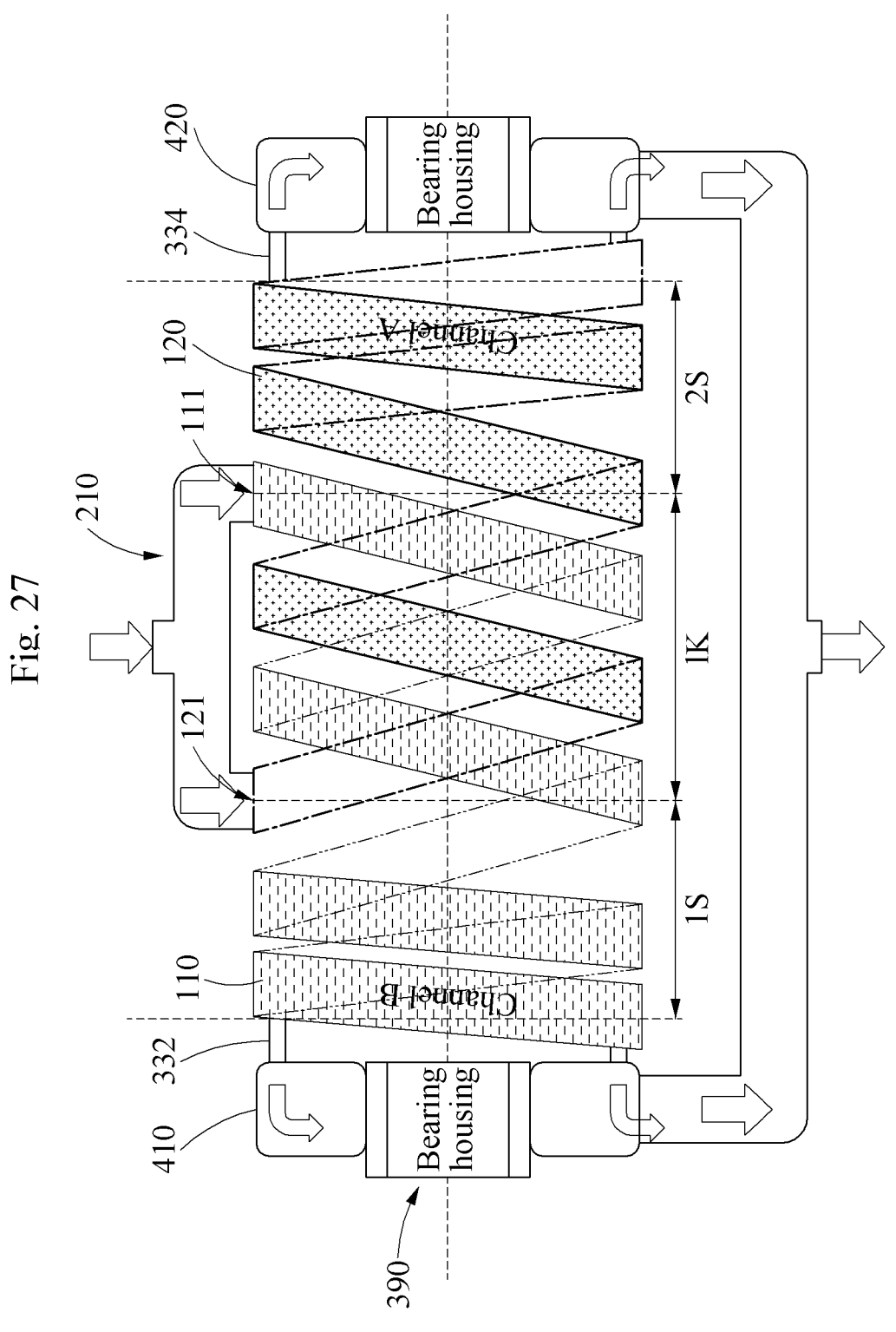
FIG. 27 is a cross-sectional view illustrating a structure of a heat exchanger according to still another example embodiment.

FIG. 27 is a cross-sectional view illustrating a structure of a heat exchanger according to still another example embodiment. For clarity of description, some components, such as the cover 310, the housing 320, and the bearing 330, etc., of FIGS. 26A and 26B, are omitted in FIG. 27.

Referring to FIG. 27, the heat exchanger may include the first heat exchange channel 110 and the second heat exchange channel 120. The first heat exchange channel 110 and the second heat exchange channel 120 may include an interlocked area IK, an area 1S in which the first heat exchange channel 110 independently performs heat exchange, and an area 2S in which the second heat exchange channel 120 independently performs heat exchange. The area 1S may be connected to the first immersion chamber 410 through the first radiation channel 332. The area 2S may be connected to the second immersion chamber 420 through the second radiation channel 334.

The entire heat transfer medium flowing into the first heat exchange channel 110 may move to the first immersion chamber 410. Therefore, a cross-sectional area of the first radiation channel 332 may be greater than or equal to that of the first heat exchange channel 110. Likewise, a cross-sectional area of the second radiation channel 334 may be greater than or equal to that of the second heat exchange channel 120. When the first radiation channel 332 includes a plurality of nozzles, the cross-sectional area of the first radiation channel 332 may represent a sum of cross-sectional areas of the plurality of nozzles. Also, a cross-sectional area of a channel may represent an area of a cross-section of a path through which the heat transfer medium moves in the corresponding channel.

The heat exchanger may include the first link channel 210. The first link channel 210 may be connected to the (1-1)-th port 111 of the first heat exchange channel 110 and the (2-1)-th port 121 of the second heat exchange channel 120. The heat transfer medium may flow into the (1-1)-th port 111 and the (2-1)-th port 121 through the first link channel 210. The heat transfer medium flowing into the (1-1)-th port 111 and the (2-1)-th port 121 may also flow through the first heat exchange channel 110 and the second heat exchange channel 120 and may pass through the first and second radiation channels 332 and 334. The heat transfer medium flowing into the first heat exchange channel 110 may move to the first immersion chamber 410 through the first radiation channel 332, and the heat transfer medium flowing into the second heat exchange channel 120 may move to the second immersion chamber 420 through the second radiation channel 334. The heat transfer medium contained in the first and second immersion chambers 410 and 420 may be discharged through the second link channel The heat transfer medium flowing into the first immersion chamber 410 and the second immersion chamber 420 may directly perform heat exchange in contact with at least a portion of the stator unit 23 and at least a portion of the coiler portion 22 of the apparatus 20. When the aforementioned heat exchange relates to cooling, a temperature of the heat transfer medium may gradually increase until the heat transfer medium passes through the first immersion chamber 410 and the second immersion chamber 420 after flowing into the first heat exchange channel 110 and the second heat exchange channel 120. When the temperature of the heat transfer medium is relatively low, the heat transfer medium may perform heat exchange while passing through the first and second heat exchange channels 110 and 120. When the temperature of the heat transfer medium is relatively high, the heat transfer medium may directly perform heat exchange in the first and second immersion chambers 410 and 420. The first and second immersion chambers 410 and 420 may also perform heat exchange even with the bearing housing 390 of the rotation shaft 24 of the apparatus 20. Through this, it is possible to suppress a temperature increase effect of the bearing housing 390 that occurs due to friction between the bearing 330 and the rotation shaft 24 during rotation of the rotator unit 25 and the rotation shaft 24.

The (1-1)-th port 111 and the (2-1)-th port 121 may be positioned at a boundary of the area IK, that is, both ends of the area IK. The heat transfer medium may enter at both ends of the area IK and then may flow into both ends of the heat exchange channel construction 100. Therefore, in the case of a cooling situation, the temperature of the heat transfer medium may be relatively low in the area IK and the heat exchange performance may be excellent in the area IK. Instead, the heat transfer medium may perform direct heat exchange in the first and second immersion chambers 410 and 420 provided at edges of the area 1S and the area 2S, respectively, thereby compensating for a degradation in the heat exchange performance occurring at the edge of the heat exchange channel construction 100.

Through this, the heat exchange may be performed almost evenly over the entire area of the apparatus 20, which may lead to improving heat exchange efficiency. Also, it is possible to prevent a degradation in the heat exchange performance according to progress of the heat transfer medium by directly performing heat exchange in an area in which the temperature of the heat transfer medium increases.

Figure 28:
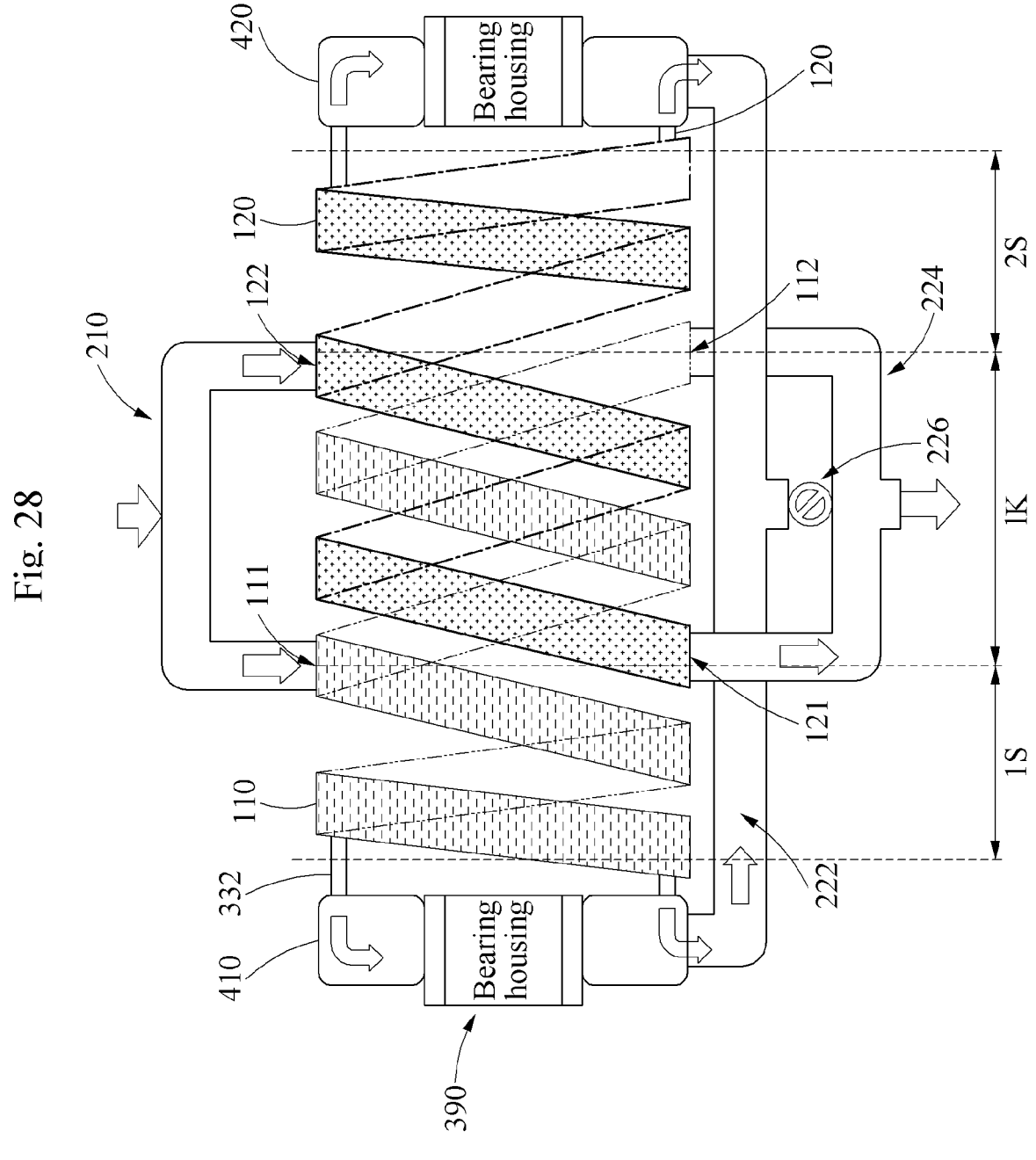
FIG. 28 is a cross-sectional view illustrating a structure of a heat exchanger according to still another example embodiment.

FIG. 28 is a cross-sectional view illustrating a structure of a heat exchanger according to still another example embodiment. Repeated description is omitted in describing the example embodiment of FIG. 28.

Referring to FIG. 28, the heat exchanger may include the (2-1)-th link channel 222 connected to the first and second immersion chambers 410 and 420 and the (2-2)-th link channel 224 connected to the (1-2)-th port 112 of the first heat exchange channel 110 and the (2-1)-th port 121 of the second heat exchange channel 120. The heat exchanger may include a flow branch controller 226 configured to control a flow rate of the heat transfer medium that moves between the (2-1)-th link channel 222 and the (2-2)-th link channel 224.

A portion of the heat transfer medium flowing into the first and second heat exchange channels 110 and 120 may be discharged to the (2-1)-th link channel 222 through the first and second immersion chambers 410 and 420, and another portion thereof may be discharged to the (2-2)-th link channel 224 through the (1-2)-th and (2-2)-th ports 112 and 122. Since only a portion of the heat transfer medium flowing into the first heat exchange channel 110 is transferred to the first immersion chamber 410, a cross-sectional area of the first radiation channel 332 may be less than or equal to that of the first heat exchange channel 110. Likewise, a cross-sectional area of the second radiation channel 334 may be less than or equal to that of the second heat exchange channel 120.

The flow branch controller 226 may control a flow rate of the heat transfer medium that passes between the (2-1)-th link channel 222 and the (2-2)-th link channel 224. For example, in the case of further improving the heat exchange performance in a central area, the heat exchanger may decrease a flow rate of the heat transfer medium discharged through the (2-1)-th link channel 222. In this case, an amount of the heat transfer medium discharged through the (1-2)-th port 112 and the (2-1)-th port 121 may increase, thereby improving the heat exchange performance in the area IK. In contrast, in the case of improving the heat exchange performance in the area 1S and the area 2S, the heat exchanger may increase a flow rate of the heat transfer medium discharged through the (2-1)-th link channel 222. In this case, the flow rate of the heat transfer medium that passes through the area 1S and the area 2S may increase and the heat exchange performance may be improved in the area 1S and the area 2S. As described above, the heat exchanger may make the temperature of the apparatus 20 to be in equilibrium by changing a heat exchange characteristic for each area using the flow branch controller 226 based on a position at which heat is biased in the apparatus 20.

In the first heat exchange channel 110, the heat transfer medium may proceed in the first direction (to the right) in an area on the right of the (1-1)-th port 111 and the heat transfer medium may proceed in the second direction (to the left) in an area on the left of the (1-1)-th port 111. That is, the heat transfer mediums flowing into a single heat exchange channel may be branched and proceed in opposite directions. When the heat transfer medium flowing into a single heat exchange channel proceeds in only a single direction, a relatively great temperature difference of the heat transfer medium may occur at both ends of the heat exchange channel. However, as described above, when the heat transfer medium is branched and proceeds in both directions in a single heat exchange channel, a section in which a temperature of the heat transfer medium varies may be shortened, thereby reducing a temperature deviation of the heat transfer medium in a single heat exchange channel.

Figure 29:
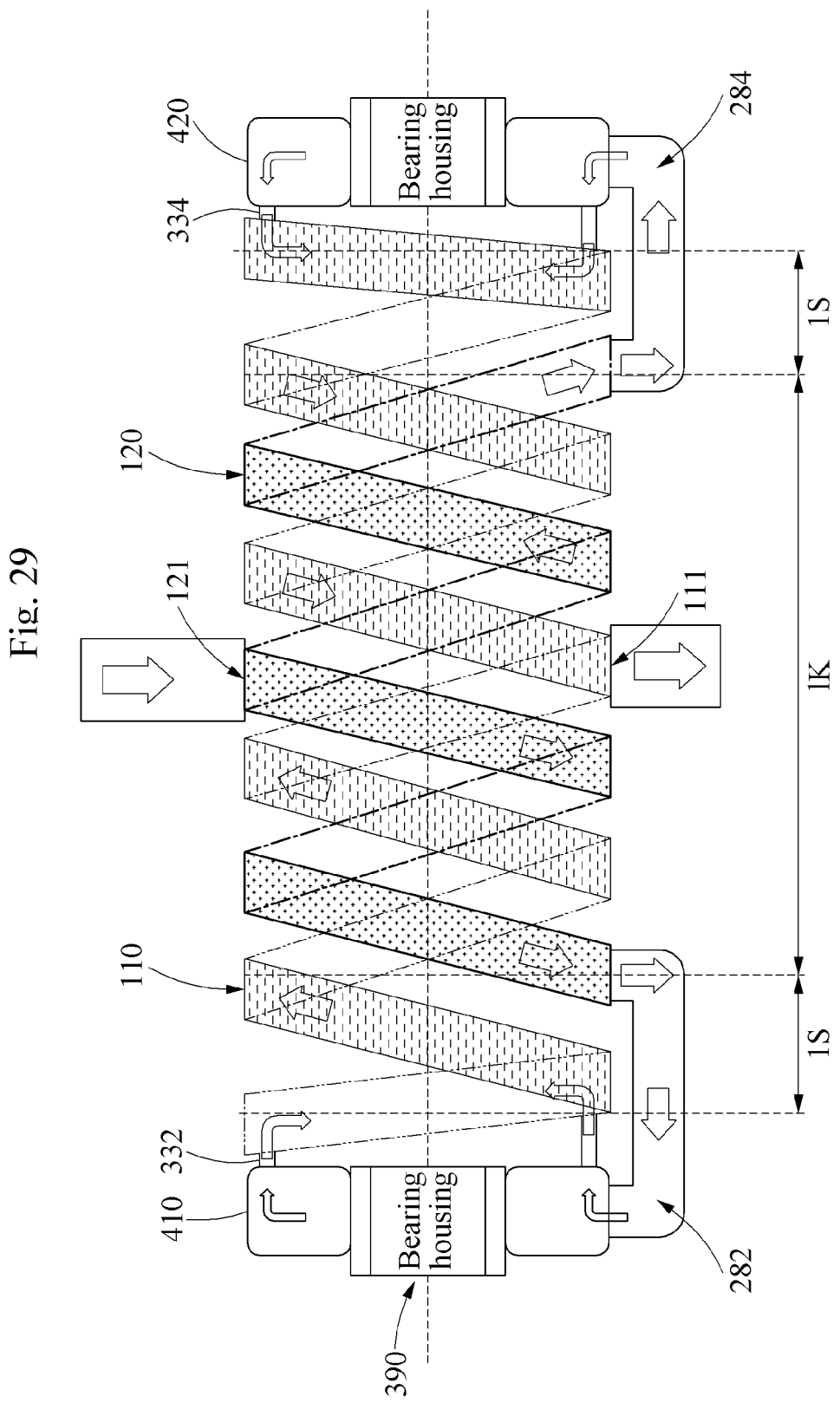
FIG. 29 is a cross-sectional view illustrating a structure of a heat exchanger according to still another example embodiment.

FIG. 29 is a cross-sectional view illustrating a structure of a heat exchanger according to still another example embodiment. Repeated description is omitted in describing the example embodiment of FIG. 29.

Referring to FIG. 29, the first heat exchange channel 110 and the second heat exchange channel 120 may form an area IK and areas 1S provided at both ends of the area IK. The heat transfer medium may flow into the (2-1)-th port 121 formed in the second heat exchange channel 120. The heat transfer medium flowing into the (2-1)-th port 121 may be branched and proceed in both directions. Both ends of the second heat exchange channel 120 may be connected to the first and second immersion chambers 410 and 420 through first and second connection link channels 282 and 284, respectively. The heat transfer medium flowing into the first and second immersion chambers 410 and 420 may flow into both ends of the first heat exchange channel 110. The heat transfer medium flowing into both ends of the first heat exchange channel 110 may proceed toward the (1-1)-th port 111 present at the center. In this case, after heat exchange is performed in the second heat exchange channel 120, direct heat exchange may be performed in the first and second immersion chambers 410 and 420 and the heat exchange may be performed again in the first heat exchange channel 110. Referring to FIGS. 27 and 28, after heat exchange is completed, direct heat exchange is completed and thus, a temperature of the heat transfer medium may increase at a point in time at which the direct heat exchange is performed. However, according to the example embodiment of FIG. 29, it is possible to differentiate a temperature of the heat transfer medium at a point in time at which direct heat exchange is performed by performing heat exchange in order of heat exchange with a spiral heat exchange channel->heat exchange by an immersion chamber->heat exchange with a spiral heat exchange channel, which differs from the example embodiment of FIGS. 27 and 28.

The flow of the heat transfer medium shown in FIG. 29 may be reversed. In that case, the heat transfer medium flowing into the second heat exchange channel 120 flows into the first heat exchange channel 110 through the first and second immersion chambers 410 and 420, it is provided as an example only. the heat transfer medium may initially flow into the first heat exchange channel 110 and then pass through the second heat exchange channel 120 by going through the first and second immersion chambers 410 and 420 and then be discharged.

Figure 30:
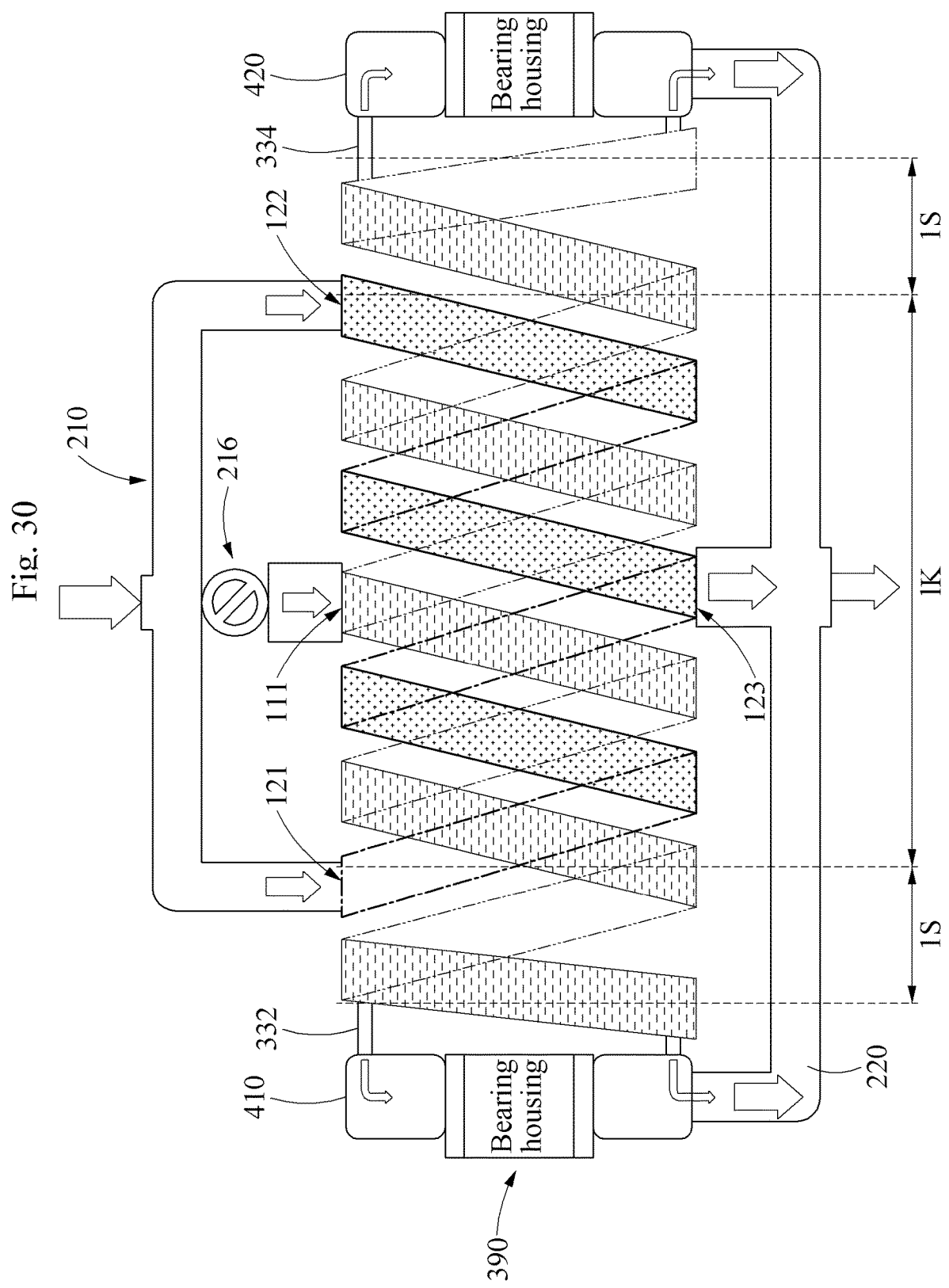
FIG. 30 is a cross-sectional view illustrating a structure of a heat exchanger according to still another example embodiment.

FIG. 30 is a cross-sectional view illustrating a structure of a heat exchanger according to still another example embodiment. Repeated description is omitted in describing the example embodiment of FIG. 30.

Referring to FIG. 30, the heat exchanger may include the first link channel 210 connected to the (1-1)-th port 111 formed in the first heat exchange channel 110 and the (2-1)-th port 121 and the (2-2)-th port 122 formed in the second heat exchange channel 120. The heat exchanger may include the first and second immersion chambers 410 and 420 and the second link channel 220 connected to the port 123 formed in the second heat exchange channel 120. The first link channel 210 may include the flow branch controller 216. The flow branch controller 216 may control a flow rate of the heat transfer medium that flows into the (1-1)-th port 111, the (2-1)-th port 121, and the (2-2)-th port 122. For example, when a heat bias phenomenon is present in a central area of the apparatus 20, the heat exchanger may improve the heat exchange performance in the area IK by increasing the flow rate of the heat transfer medium that flows into the (2-1)-th port 121 and the (2-2)-th port 122. As another example, when the heat bias phenomenon is present in an edge area of the apparatus 20, the heat exchanger may improve the heat exchange performance in the areas 1S and the first and second immersion chambers 410 and 420 by increasing the flow rate of the heat transfer medium that flows into the (1-1)-th port 111.

Figure 31A:
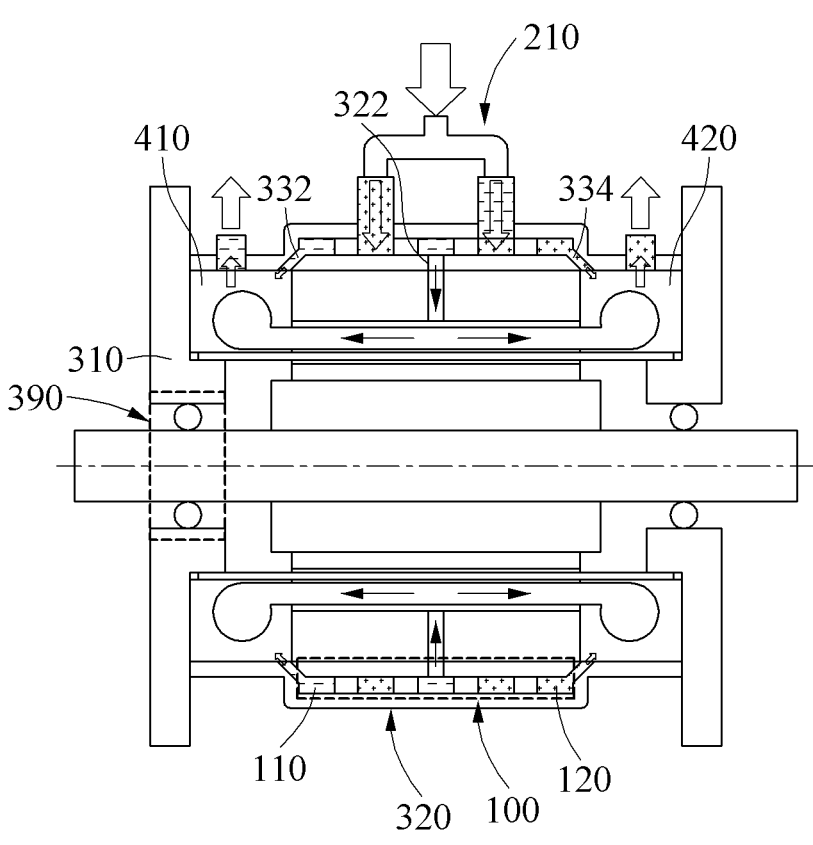
FIGS. 31A and 31B are cross-sectional views illustrating a structure of a heat exchanger according to still another example embodiment.
Figure 31B:
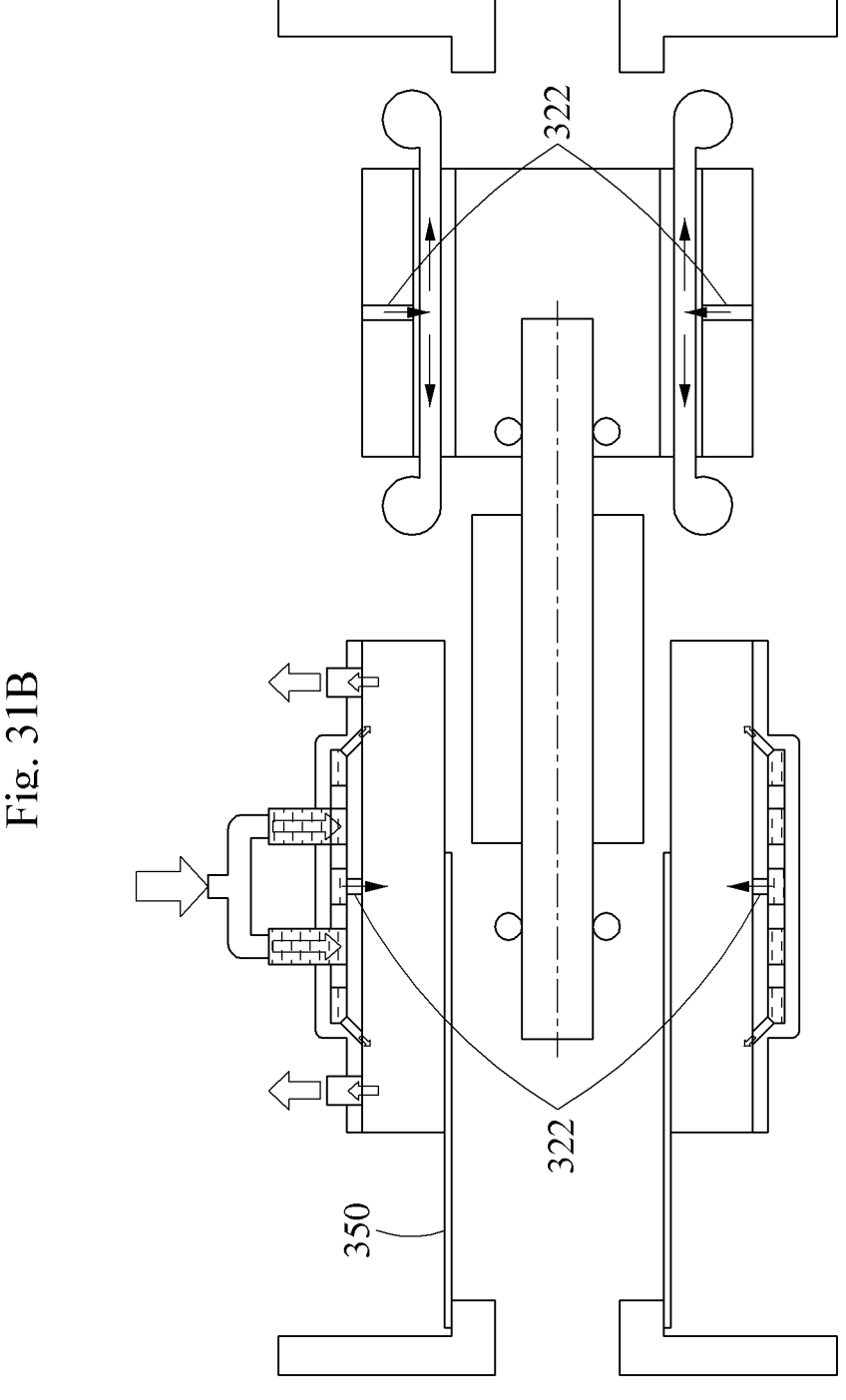

FIGS. 31A and 31B are cross-sectional views illustrating a structure of a heat exchanger according to still another example embodiment. Repeated description is omitted in describing the example embodiment of FIGS. 31A and 31B.

Referring to FIGS. 31A and 31B, the heat exchanger may include a yoke channel 322 configured to allow communication between at least one of the first heat exchange channel 110 and the second heat exchange channel 120 and a slot formed between teeth 26 of the yoke 21. Although FIGS. 31A and 31B illustrate that the yoke channel 322 is formed across the housing 320 and the yoke 21, it is provided as an example only. For example, when the first heat exchange channel 110 and the second heat exchange channel 120 are formed to make a direct contact with the yoke 21, the yoke channel 322 may be formed in only the yoke 21. The yoke channel 322 may be connected to at least one of the first heat exchange channel 110 and the second heat exchange channel 120. A portion of the heat transfer medium that passes through at least one of the first heat exchange channel 110 and the second heat exchange channel 120 may move to a slot formed between the teeth 26 of the yoke 21.

Figure 32:
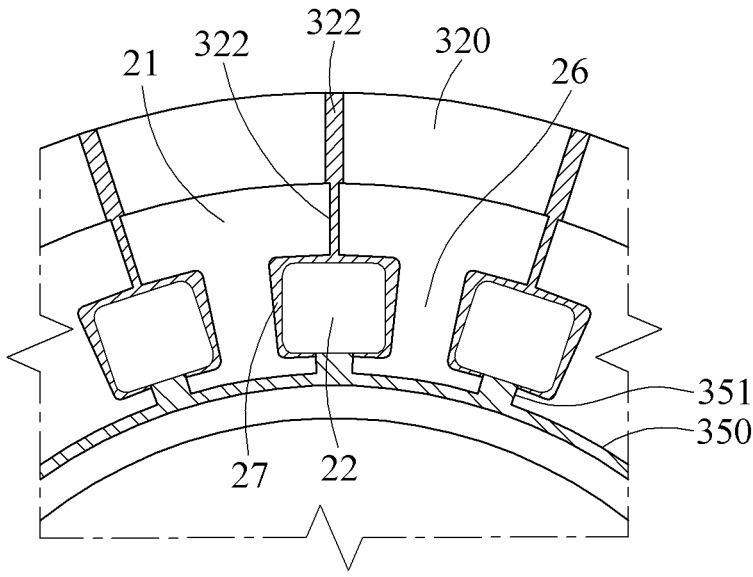
FIG. 32 illustrates an example in which a heat transfer medium flows through a yoke channel of FIGS. 31A and 31B.

FIG. 32 illustrates an example in which a heat transfer medium flows through the yoke channel 322 of FIGS. 31A and 31B.

Referring to FIG. 32, the yoke channel 322 may be formed in the housing 320. The yoke channel 322 may include a plurality of channels. The heat transfer medium flowing through the yoke channel 322 may reach a gap 27 that is formed between the teeth 26 of the yoke 21 and the coiler portion 22. The internal separation wall 350 in a cylindrical shape may be provided between the yoke 21 and the rotator unit. A plurality of protrusions 351 may be formed on the outer circumferential surface of the internal separation wall 350. The protrusion 351 may insert into an empty space between the teeth 26 of the yoke 21. Through this, the gap 27 may maintain a sealed state.

The heat transfer medium may move to the edge of the coiler portion 22 through the gap 27 and may move to one of the first and second immersion chambers 410 and 420. Since the heat transfer medium directly performs heat exchange with the coiler portion 22 and the yoke 21 while passing through the gap 27, the heat exchange performance of the heat exchanger may be improved.

Figure 33:
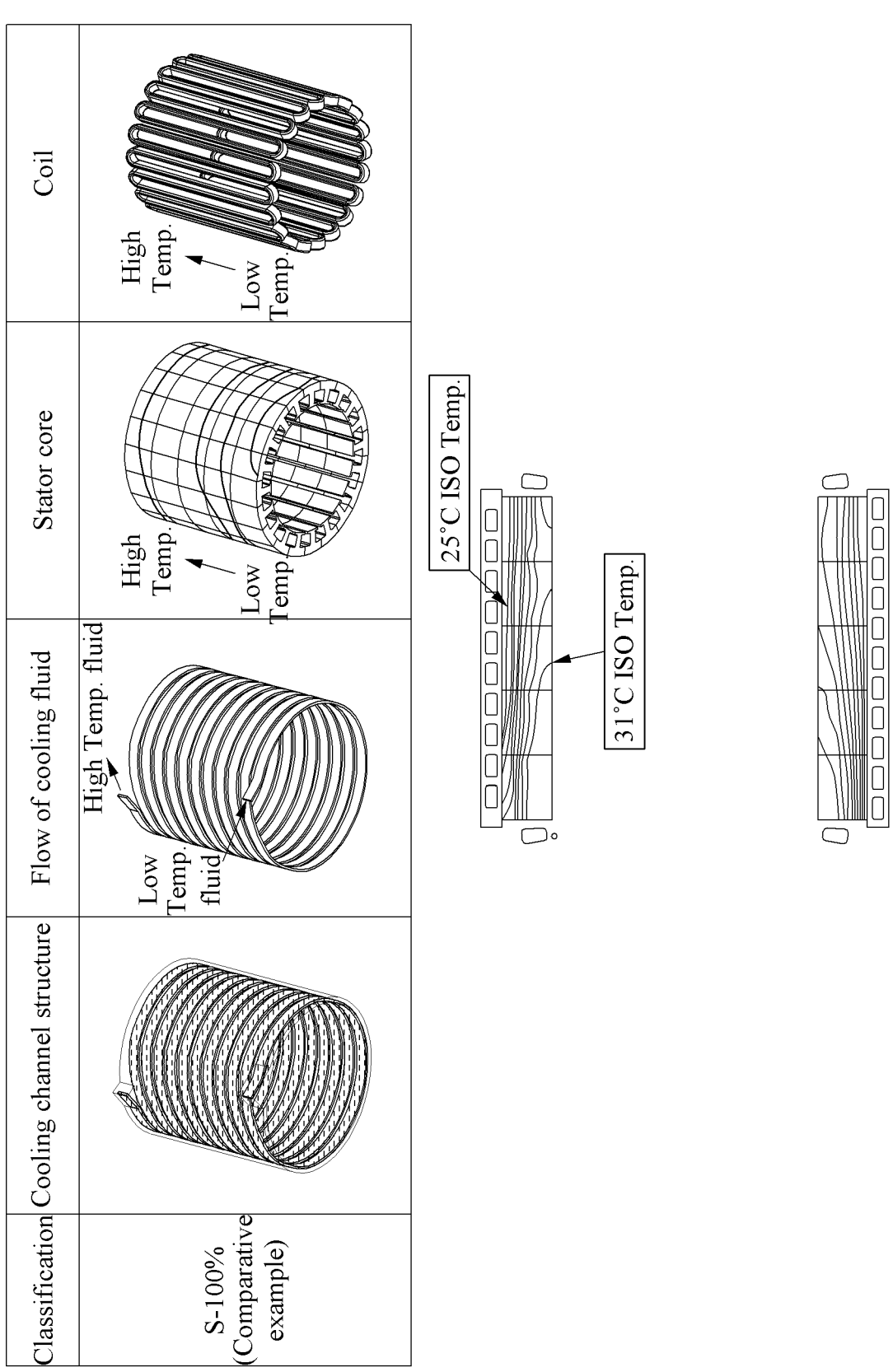
FIG. 33 illustrates a simulation result of evaluating a change in a temperature of a coil portion and a stator unit of an energy conversion device by operating of the heat exchanger when the heat exchanger according to the second comparative example of FIGS. 5A and 5B is applied to the energy conversion device.

FIG. 33 illustrates a simulation result of evaluating a change in a temperature of a coil portion and a stator unit (a stator core) of an energy conversion device by operating of the heat exchanger when the heat exchanger according to the second comparative example of FIGS. 5A and 5B is applied to the energy conversion device.

Referring to FIG. 33, the heat exchanger according to the second comparative example may have an S-100% configuration, that is, the heat exchange channel construction 100 that includes a single first heat exchange channel 110. In this case, in the heat exchange channel construction 100, the heat transfer medium has a single travel path. The heat transfer medium may be injected through the (1-1)-th port 111 of FIG. 5B of the first heat exchange channel 110 and may perform heat exchange while passing through the first heat exchange channel 110 and may be discharged through the (1-2)-th port 112 of FIG. 5B. Therefore, although a temperature of the heat transfer medium is relatively low in the (1-1)-th port 111 of FIG. 5, the temperature of the heat transfer medium gradually increases as going toward the (1-2)-th port 112 of FIG. 5B. Accordingly, the cooling performance may be degraded as going from one end to the other end of the energy conversion device, and the temperature may gradually increase. This phenomenon may similarly appear in a stator unit and a coiler portion.

Therefore, a large temperature difference may occur based on an area of the energy conversion device and an isothermal cooling (isothermal control) may not work. As described, when a temperature deviation is present in a heat exchange process, a difference may occur in an expansion ratio of an apparatus, which may result in damaging the apparatus, degrading an efficiency, or reducing a lifespan.

Also, referring to a lower portion of FIG. 33, it can be verified from the simulation result that a temperature of a left portion in a cross-section of the stator unit is significantly high. In the S-100% configuration, it can be verified that the isotherm of 31° C. (31° C. ISO Temp.) appears in a lower left area. That is, in the S-100% configuration, the temperature difference in the stator unit may be great and a high temperature area may be widely formed.

Figure 34:
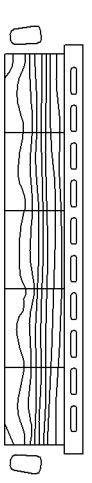
FIG. 34 illustrates a simulation result of evaluating a change in a temperature of a coil portion and a stator unit of an energy conversion device by operating of the heat exchanger when the heat exchanger according to the first comparative example of FIGS. 4A and 4B is applied to the energy conversion device.

FIG. 34 illustrates a simulation result of evaluating a change in a temperature of a coil portion and a stator unit (a stator core) of an energy conversion device by operating of the heat exchanger when the heat exchanger according to the first comparative example of FIGS. 4A and 4B is applied to the energy conversion device.

Referring to FIG. 34, the heat exchanger according to the first comparative example may have an IK-100% configuration, that is, a configuration in which the first and second heat exchange channels 110 and 120 are interlocked in the entire area of the heat exchange channel construction 100. In this case, a first heat transfer medium may be injected through the (1-1)-th port 111 of FIG. 4B of the first heat exchange channel 110 present at one end of the heat exchange channel construction 100 and may pass through the first heat exchange channel 110 and then be discharged through the other end of the heat exchange channel construction 100. Also, a second heat transfer medium may be injected through the (2-2)-th port 122 of FIG. 4B of the second heat exchange channel 120 present at the other end of the heat exchange channel construction 100 and may pass through the second heat exchange channel 120 and then be discharged through the one end of the heat exchange channel construction 100. Therefore, the first heat transfer medium and the second heat transfer medium may flow in opposite directions, thereby offsetting a temperature increase by heat exchange. Therefore, compared to a case of using the heat exchanger according to the S-100% configuration of FIG. 33, in the case of using the heat exchanger according to the IK-100% configuration of FIG. 34, it is possible to further greatly decrease a temperature deviation in a stator unit and a coil portion.

However, in the case of using the heat exchanger having the IK-100% configuration of FIG. 34, it may be difficult to precisely control a temperature of an apparatus having a heat bias phenomenon. Also, in the case of using the heat exchanger having the IK-100% configuration of FIG. 9, it may be difficult to easily and precisely control a temperature of a deep part of the apparatus.

Also, referring to a lower portion of FIG. 34, it can be verified from the simulation result that a temperature of a cross-section of the stator unit is relatively decreased compared to that of FIG. 33, but an area with a temperature higher than the isotherm of 31° C. (31° C. ISO Temp.) is still widely distributed. In particular, it can be verified that, at left and right ends of the stator unit that are near to an end wiring area, the isotherm rises high and the temperature is relatively high compared to the center.

Figure 35:
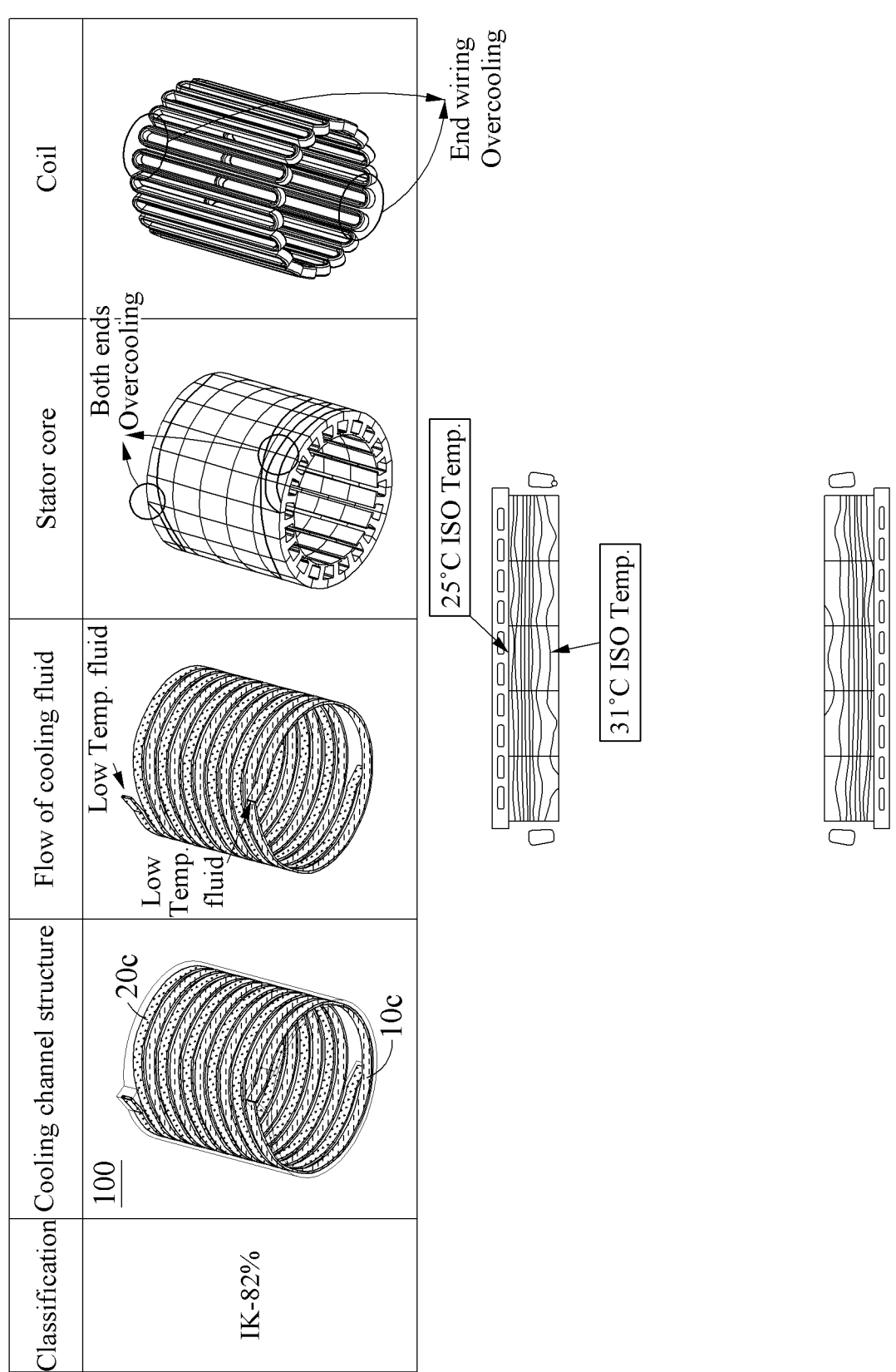
FIG. 35 illustrates a simulation result of evaluating a change in a temperature of a coil portion and a stator unit of an energy conversion device by operating of the heat exchanger when the heat exchanger according to the example embodiment of FIGS. 3A and 3B is applied to the energy conversion device.

FIG. 35 illustrates a simulation result of evaluating a change in a temperature of a coil portion and a stator unit (a stator core) of an energy conversion device by operating of the heat exchanger when the heat exchanger according to the example embodiment of FIGS. 3A and 3B is applied to the energy conversion device.

Referring to FIG. 35, the heat exchanger according to the example embodiment may have an IK-82% configuration, that is, a configuration in which the first and second heat exchange channels 110 and 120 are interlocked in about 82% area of the heat exchange channel construction 100. In this case, a first heat transfer medium may be injected through the (1-1)-th port 111 of FIG. 3B of the first heat exchange channel 110 present at one end of the heat exchange channel construction 100 and may pass through the first heat exchange channel 110 and then be discharged. Also, a second heat transfer medium may be injected through the (2-1)-th port 121 of FIG. 3B of the second heat exchange channel 120 present at the other end of the heat exchange channel construction 100 and may pass through the second heat exchange channel 120 and then be discharged. The first heat transfer medium and the second heat transfer medium may flow in opposite directions, thereby offsetting a temperature increase by heat exchange in an interlocked heat exchange area (area IK of FIG. 3B). Also, in general, in the area 1S of the heat exchange channel construction 100, cooling may be performed only by the first heat exchange channel 110 without intervention of the second heat exchange channel 120, and in the area 2S of the heat exchange channel construction 100, cooling may be performed only by the second heat exchange channel 120 without intervention of the first heat exchange channel 110.

Therefore, compared to a case of using the heat exchanger according to the second comparative example of FIG. 33, a temperature deviation may greatly decrease in the stator unit and the coil portion. Also, it is possible to further precisely control a temperature of an apparatus in which a heat bias phenomenon is present, and it is possible to easily and precisely control a temperature of a deep part of the apparatus. Accordingly, although the heat bias phenomenon occurs in the apparatus such as an electric motor (a motor) or a generator, it is possible to appropriately control the heat bias phenomenon and to efficiently perform heat exchange, that is, cooling, and to improve durability/lifespan, efficiency, and performance of the apparatus. Also, the heat exchanger according to the example embodiment may have a relatively simple structure and may perform heat exchange efficiently and at low cost using a water cooling method and thus, may be significantly advantageous in terms of an environmental issue, ease of manufacture, and convenience of applicability.

Also, referring to a lower portion of FIG. 35, it can be verified from the simulation result that a phenomenon that the isotherm of a temperature in a cross-section of the stator unit rises at left and right ends decreases. Therefore, it can be verified that an area with a temperature higher than the isotherm of 31° C. (31° C. ISO Temp.) is relatively reduced.

The heat exchanger according to the example embodiment may appropriately control a ratio of the interlocked heat exchange area based on a characteristic of an apparatus applied and may form a highly efficient cooling performance and temperature profile from an optimal interlocked heat exchange area ratio.

FIG. 36 illustrates a simulation result of evaluating a change in a temperature of a coil portion and a stator unit (a stator core) of an energy conversion device by operating of the heat exchanger when the heat exchanger according to the example embodiment of FIGS. 2A and 2B is applied to the energy conversion device. The heat exchanger according to the example embodiment may have an IK-64% configuration, that is, a configuration in which the first and second heat exchange channels 110 and 120 are interlocked in about 64% area of the heat exchange channel construction 100.

Referring to a lower portion of FIG. 36, it can be verified from the simulation result that a temperature of the stator unit is further lower than that of FIG. 35 and the isotherm of 31° C. (31° C. ISO Temp.) has moved downward compared to that of FIG. 35. Also, an area with a temperature higher than 31° C. may be limited to only a portion of the center.

Figure 37:
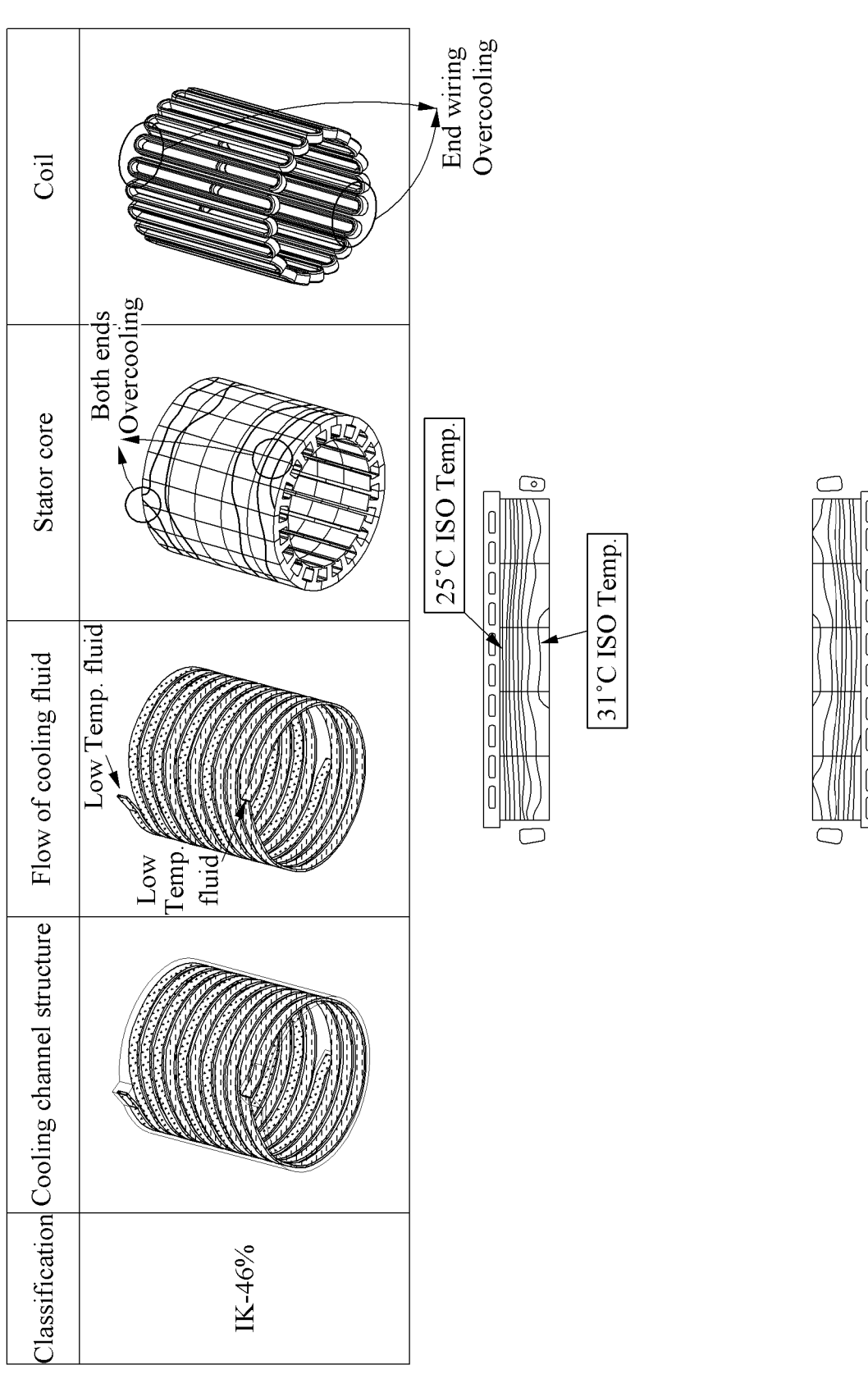
FIG. 37 illustrates a simulation result of evaluating a change in a temperature of a coil portion and a stator unit of an energy conversion device by operating of the heat exchanger when the heat exchanger according to the example embodiment of FIGS. 1A and 1B is applied to the energy conversion device.

FIG. 37 illustrates a simulation result of evaluating a change in a temperature of a coil portion and a stator unit (a stator core) of an energy conversion device by operating of the heat exchanger when the heat exchanger according to the example embodiment of FIGS. 1A and 1B is applied to the energy conversion device. The heat exchanger according to the example embodiment may have an IK-46% configuration, that is, a configuration in which the first and second heat exchange channels 110 and 120 are interlocked in about 46% area of the heat exchange channel construction 100.

Referring to a lower portion of FIG. 37, it can be verified that a temperature of the stator unit is further lower than that of FIG. 35 and the isotherm of 31° C. (31° C. ISO Temp.) has moved downward compared to that of FIG. 35. Also, an area with a temperature higher than 31° C. may be configured to only a portion of the center.

According to at least one example embodiment, it is possible to implement a heat exchanger that may appropriately control a heat bias phenomenon and efficiently perform heat exchange, that is, cooling, although the heat bias phenomenon occurs in a device, such as, for example, a motor (an electric motor) and a generator. Also, it is possible to implement a heat exchanger that may efficiently perform heat exchange with a relatively simple structure and may have a configuration and a driving scheme advantageous in terms of environmental issues, manufacturing convenience, and application convenience. By applying the heat exchanger according to such example embodiments, it is possible to implement a device assembly (e.g., an energy conversion device assembly) having excellent heat exchange performance. In this case, durability (lifespan), efficiency, and performance of the device assembly may be improved.

According to at least one example embodiments, while fundamentally overcoming disadvantages found in using a conventional sealing configuration of a cylinder to perform cooling by spraying an oil or to block oil inflow. Also, it is possible to implement a low-cost and high-efficiency heat exchange exchanger using a relatively simple heat exchange channel construction without using an auxiliary cooling device or a resin-type heat dissipation material, which is used to cool an existing apparatus having a heat bias.

Although example embodiments are described and specific terms are used herein, they are merely used in general meaning to easily explain the technical content of the disclosure and to help understanding of the disclosure and is not intended to limit the scope of the disclosure. In addition to the example embodiments disclosed herein, it is apparent to those skilled in the art that other modification examples may be implemented based on the technical spirit of the disclosure. For example, it will be apparent to those skilled in the art that the heat exchanger according to the example embodiments of FIGS. 1A and 1B to 38A and 38B and the energy conversion device assembly including the heat exchanger may be variously modified. In detail, for example, the heat exchanger according to the example embodiments may be applicable to other apparatuses aside from the energy conversion device such as an electric motor or a generator. Therefore, the scope of the disclosure should be defined based on the technical spirit of the claims instead of being defined based on the aforementioned example embodiments.

What is claimed is:

1. A heat exchanger to perform heat exchange with a predetermined apparatus, the heat exchanger comprising:

a heat exchange channel construction configured to form a heat exchange area for heat exchange with the apparatus and to perform heat exchange through a flow of a heat transfer medium, wherein the heat exchange channel construction comprises a plurality of heat exchange channels each in a spiral shape, and a first region where a first heat exchange channel and a second heat exchange channel are interlocked along their spiral paths to perform heat exchange together;

a second region where the first heat exchange channel and the second heat exchange channel are not interlocked, such that either the first heat exchange channel or the second heat exchange channel performs heat exchange independently, wherein, the second region is adjacent to the first region, wherein, within the first region, the first heat exchange channel and the second heat exchange channel are arranged in an alternating manner along an axis of the spiral shape, and wherein, within the second region, one of the first heat exchange channel or the second heat exchange channel forms at least one turn and is continuously arranged along the axis of the spiral shape.

2. The heat exchanger of claim 1, wherein the heat exchange channel construction comprises an area 1S in which the first heat exchange channel independently performs heat exchange and an IK area in which the first heat exchange channel and the second heat exchange channel perform heat exchange through interlocking.

3. The heat exchanger of claim 1, wherein the heat exchange channel construction comprises an IK area in which the first heat exchange channel and the second heat exchange channel perform heat exchange through interlocking, an area 1S formed at one end of the area IK and in which the first heat exchange channel independently performs heat exchange, and an area 2S formed at the other end of the area IK and in which the second heat exchange channel independently performs heat exchange.

4. The heat exchanger of claim 1, wherein the heat exchange channel construction comprises ports that are formed in at least one of the first heat exchange channel and the second heat exchange channel, and the heat exchange channel construction comprises an area in which a heat transfer medium flowing into one of the ports proceeds in a first direction and an area in which the heat transfer medium flowing into the other of the ports proceeds in a second direction opposite to the first direction.

5. The heat exchanger of claim 1, wherein the heat exchange channel construction comprises a plurality of ports, and the heat exchanger further comprises:

at least one link channel configured to enable communication of at least a portion of the plurality of ports; and a flow rate controller configured to control a flow rate of the heat transfer medium that passes through the plurality of ports through connection to the at least one link channel.

6. The heat exchanger of claim 1, wherein the heat exchange channel construction comprises an IK area in which the first heat exchange channel and the second heat exchange channel perform heat exchange through interlocking and an area 1S provided at each of both ends of the IK area and in which the first heat exchange channel independently performs heat exchange.

7. The heat exchange of claim 1, further comprising:

a cover channel provided inside a cover built with the apparatus, wherein the cover channel is configured to connect to the heat exchange channel construction through at least one of a link channel connected to a port formed in the heat exchange channel construction and a radiation channel formed between the cover channel and the heat exchange channel construction.

8. The heat exchanger of claim 1, further comprising:

an immersion chamber configured to enable heat exchange to be performed in a state in which at least a portion of the apparatus is immersed in the heat transfer medium, wherein the immersion chamber is configured to connect to the heat exchange channel construction through at least one of a link channel connected to a port formed in the heat exchange channel construction and a radiation channel formed between the immersion chamber and the heat exchange channel construction.

9. The heat exchanger of claim 1, further comprising:

a yoke channel configured to enable communication between at least one of the first heat exchange channel and the second heat exchange channel and a slot formed between teeth formed in a yoke of a stator unit comprised in the apparatus.

* * * * *